United States Patent [19]

Scullion et al.

[11] Patent Number: 4,734,865
[45] Date of Patent: Mar. 29, 1988

[54] INSERTION MACHINE WITH AUDIT TRAIL AND COMMAND PROTOCOL

[75] Inventors: Christopher K. Scullion; Bruce A. Muschlitz, both of Bethlehem, Pa.

[73] Assignee: Bell & Howell Company, Chicago, Ill.

[21] Appl. No.: 837,625

[22] Filed: Mar. 10, 1986

Related U.S. Application Data

[63] Continuation-in-part of Ser. No. 823,427, Jan. 28, 1986, abandoned.

[51] Int. Cl.[4] .................... G06F 15/20; B65H 39/02
[52] U.S. Cl. ................................. 364/478; 53/266 A; 53/500; 270/58; 364/131
[58] Field of Search ............... 364/478, 479, 464, 465, 364/466, 471, 131–136; 270/53–58; 53/495, 500, 502, 540, 266 A; 271/258, 259, 3.1, 4, 2, 3

[56] References Cited

U.S. PATENT DOCUMENTS

| | | | |
|---|---|---|---|
| 3,819,173 | 6/1974 | Anderson et al. | 270/54 |
| 4,497,040 | 1/1985 | Gomes et al. | 364/900 |
| 4,517,650 | 5/1985 | Gomes et al. | 364/478 |
| 4,525,788 | 6/1985 | Gottleib et al. | 364/478 |
| 4,527,468 | 7/1985 | Piotroski | 364/478 X |
| 4,527,790 | 7/1985 | Piotroski | 364/478 X |
| 4,547,856 | 10/1985 | Piotroski et al. | 364/478 |
| 4,568,072 | 2/1986 | Piotroski | 364/146 X |
| 4,571,925 | 2/1986 | Adams | 53/266 A X |
| 4,577,848 | 3/1986 | Hams | 53/266 A X |
| 4,639,873 | 1/1987 | Baggarly et al. | 364/466 |

*Primary Examiner*—Joseph Ruggiero

[57] ABSTRACT

Processing events of an insertion machine are managed by a first data processor (DPS1) 100'. The DPS 100' is connected to a second data processor (DPS2) 700 by a data transmission cable 703 whereby the DPS1 sends data formatted in accordance with a plurality of 95-TO-PC COMMANDS to the DPS2 700 and whereby the DPS2 700 sends data formatted in accordance with a plurality of PC-TO-95 COMMANDS to the DPS1 100'. Some of the PC-TO-95 COMMANDS are used for downloading values for insertion machine input parameters and are generated in response to user input via a keyboard 720 as prompted by appropriate displays on a monitor 718. Other PC-TO-95 COMMANDS are generated in response to user input for interrogating the DPS1 100' and prompt the DPS1 100' to generate an answering 95-TO-PC COMMAND which includes insertion machine-related operating output data.

59 Claims, 51 Drawing Figures

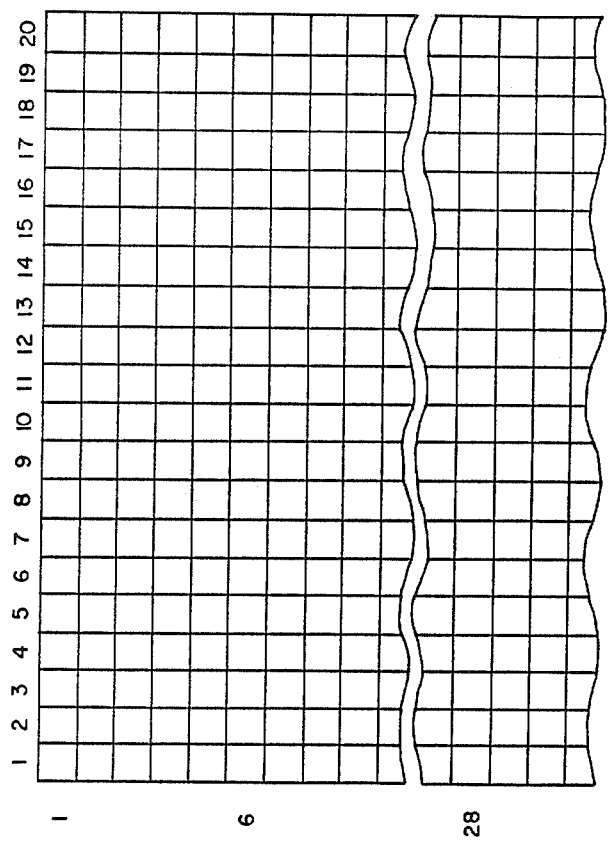
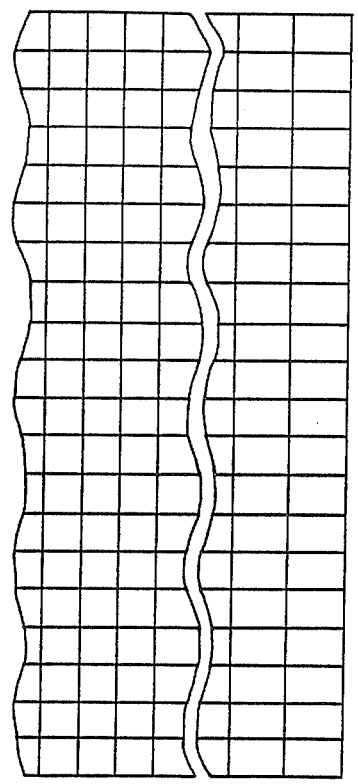

SELECT FROM 1ST DOWNSTREAM READING INSERT STATION
SELECT FROM 2ND DOWNSTREAM READING INSERT STATION
SELECT FROM 3RD DOWNSTREAM READING INSERT STATION
FIRST STANDARD INSERT STATION SELECT PER READ INDICIA
2ND STANDARD INSERT STATION SELECT PER READ INDICIA
3RD STANDARD INSERT STATION SELECT PER READ INDICIA
4TH STANDARD INSERT STATION SELECT PER READ INDICIA
5TH STANDARD INSERT STATION SELECT PER READ INDICIA
6TH STANDARD INSERT STATION SELECT PER READ INDICIA

STANDARD DIVERTER 1 ACTIVATION ENABLEMENT
STANDARD DIVERTER 2 ACTIVATION ENABLEMENT
STANDARD DIVERTER 3 ACTIVATION ENABLEMENT

POSTAGE METER 1 ACTIVATION ENABLEMENT
POSTAGE METER 2 ACTIVATION ENABLEMENT
POSTAGE METER 3 ACTIVATION ENABLEMENT

MATCH — TOTAL PIECE COUNT (BPCNT)

MATCH 4 — WEIGHT (BWGHT)

FIG. 4
SBUS

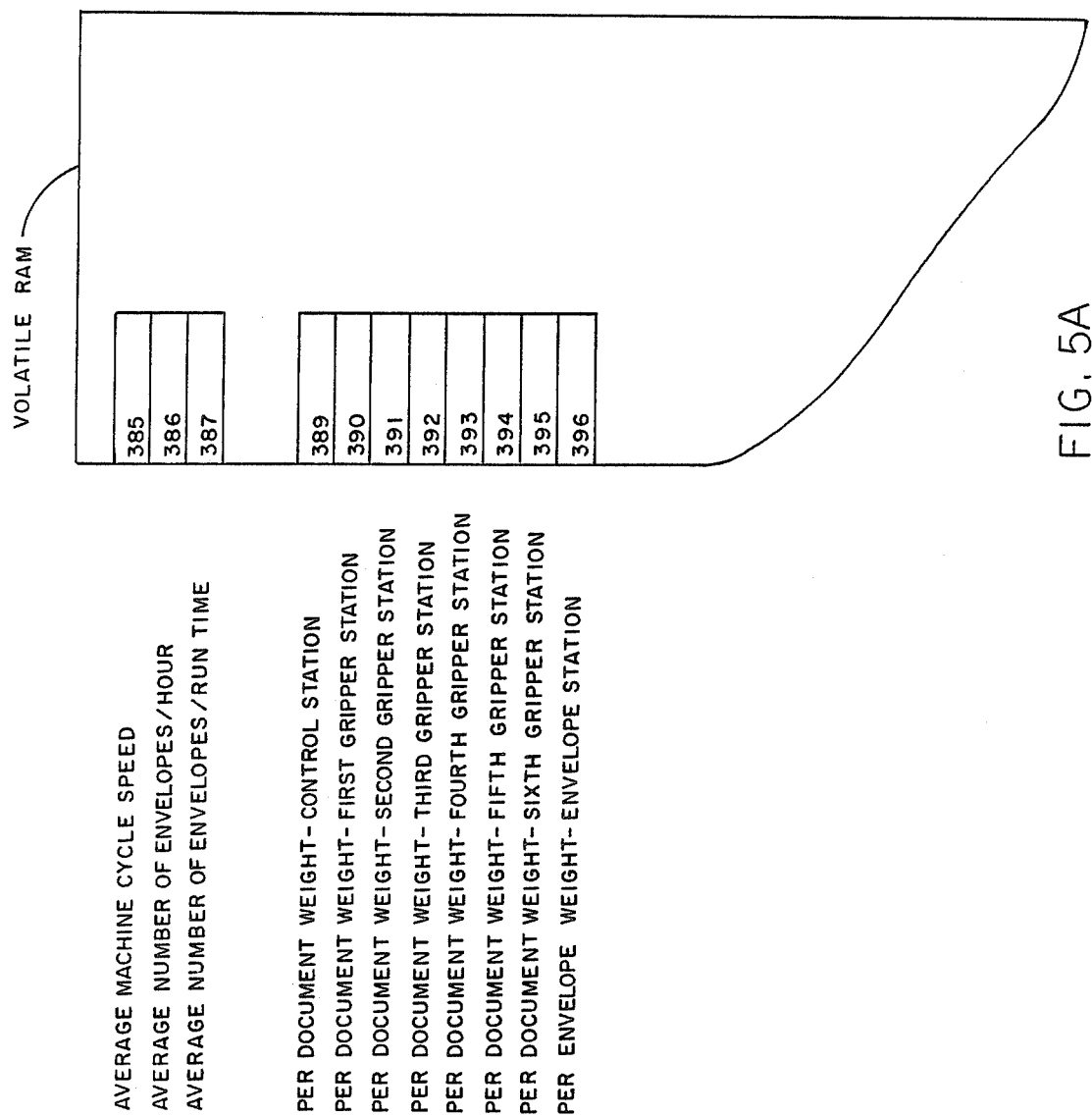

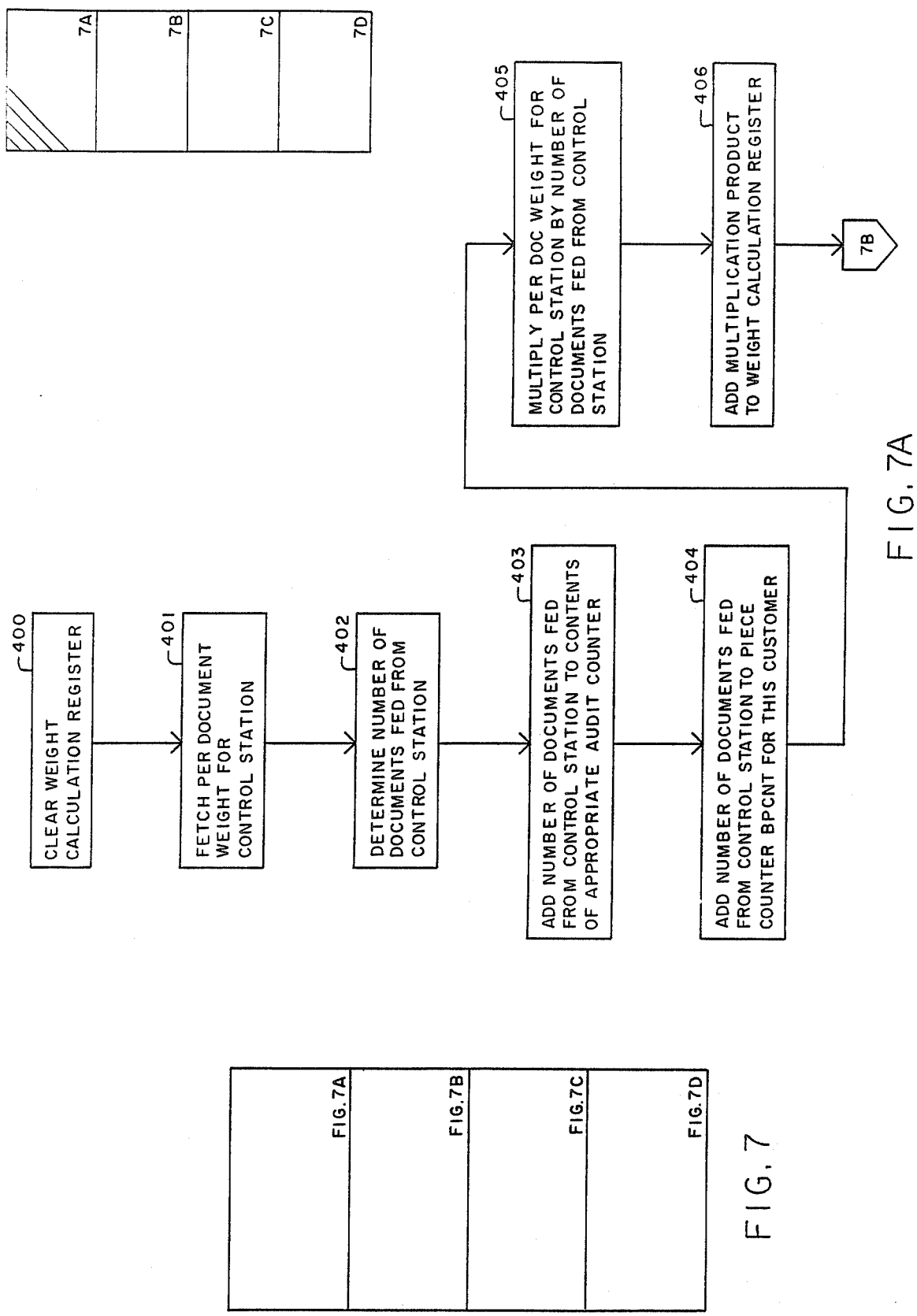

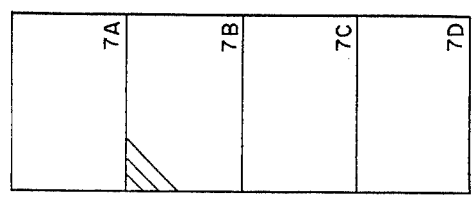
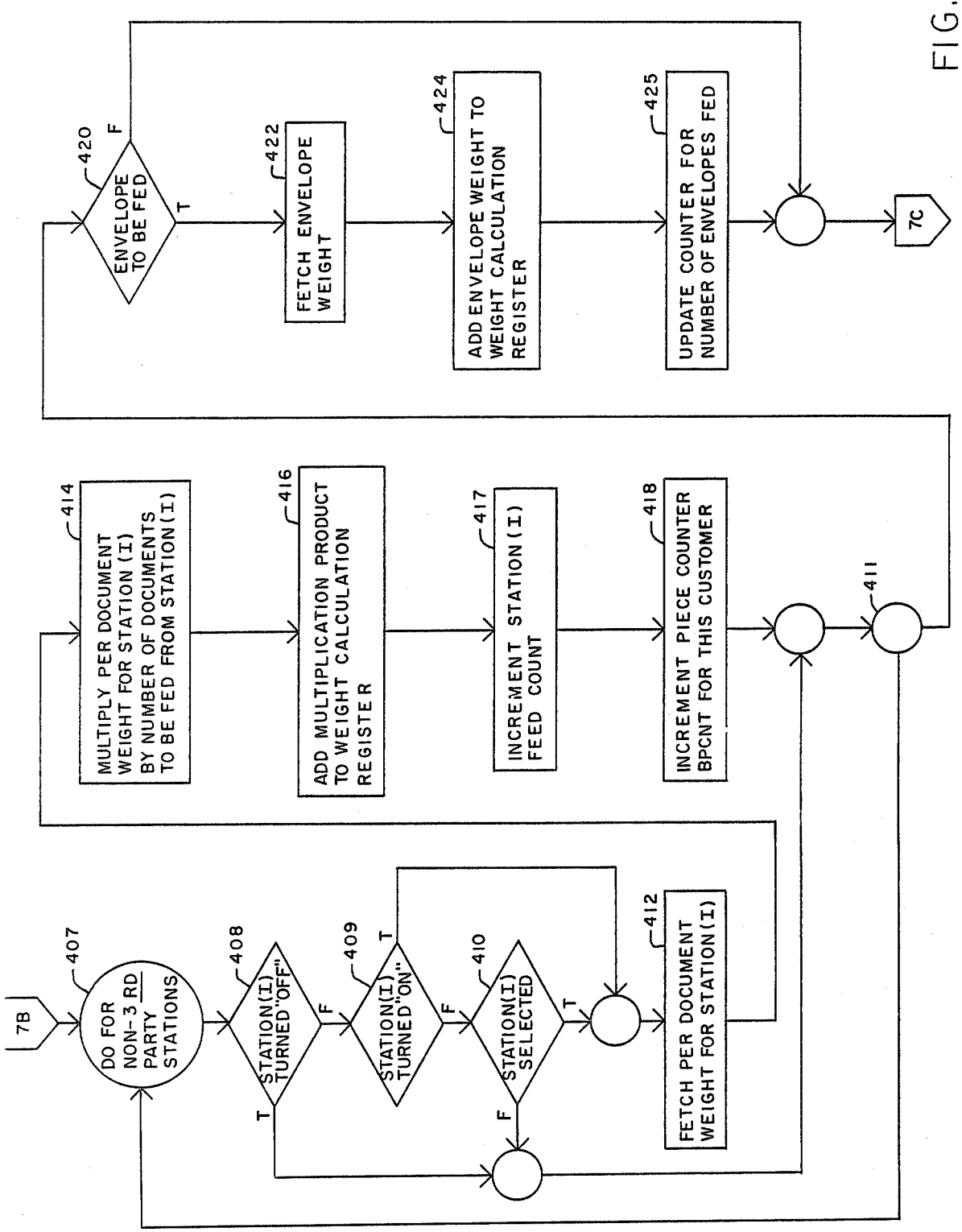
FIG. 7B

AUDIT TRIAL REPORT

| | SHIFT | WEEK | MONTH | QUARTER | YEAR |
|---|---|---|---|---|---|
| FEEDER 1 COUNT | —— | —— | —— | —— | —— |
| STANDARD STATION 1 COUNT | —— | —— | —— | —— | —— |
| STANDARD STATION 2 | —— | —— | —— | —— | —— |
| STANDARD STATION 3 | —— | —— | —— | —— | —— |
| STANDARD STATION 4 | —— | —— | —— | —— | —— |
| STANDARD STATION 5 | —— | —— | —— | —— | —— |
| STANDARD STATION 6 | —— | —— | —— | —— | —— |
| | | | | | |
| ENVELOPES FED | —— | —— | —— | —— | —— |
| | | | | | |
| DIVERT 1 COUNT | —— | —— | —— | —— | —— |
| DIVERT 2 COUNT | —— | —— | —— | —— | —— |
| | | | | | |
| METER 1 COUNT | —— | —— | —— | —— | —— |
| METER 2 COUNT | —— | —— | —— | —— | —— |
| | | | | | |
| CHARGEBACK COUNT | —— | —— | —— | —— | —— |

FEEDER 1 PER DOCUMENT WEIGHT ——
STANDARD STATION 1 PER DOCUMENT WEIGHT ——
STANDARD STATION 2 PER DOCUMENT WEIGHT ——
STANDARD STATION 3 PER DOCUMENT WEIGHT ——
STANDARD STATION 4 PER DOCUMENT WEIGHT ——
STANDARD STATION 5 PER DOCUMENT WEIGHT ——
STANDARD STATION 6 PER DOCUMENT WEIGHT ——

ENVELOPES PER HOUR ——
ENVELOPES PER ACTUAL RUNNING HOUR ——
AVERAGE MACHINE CYCLE SPEED ——

FIG. 11

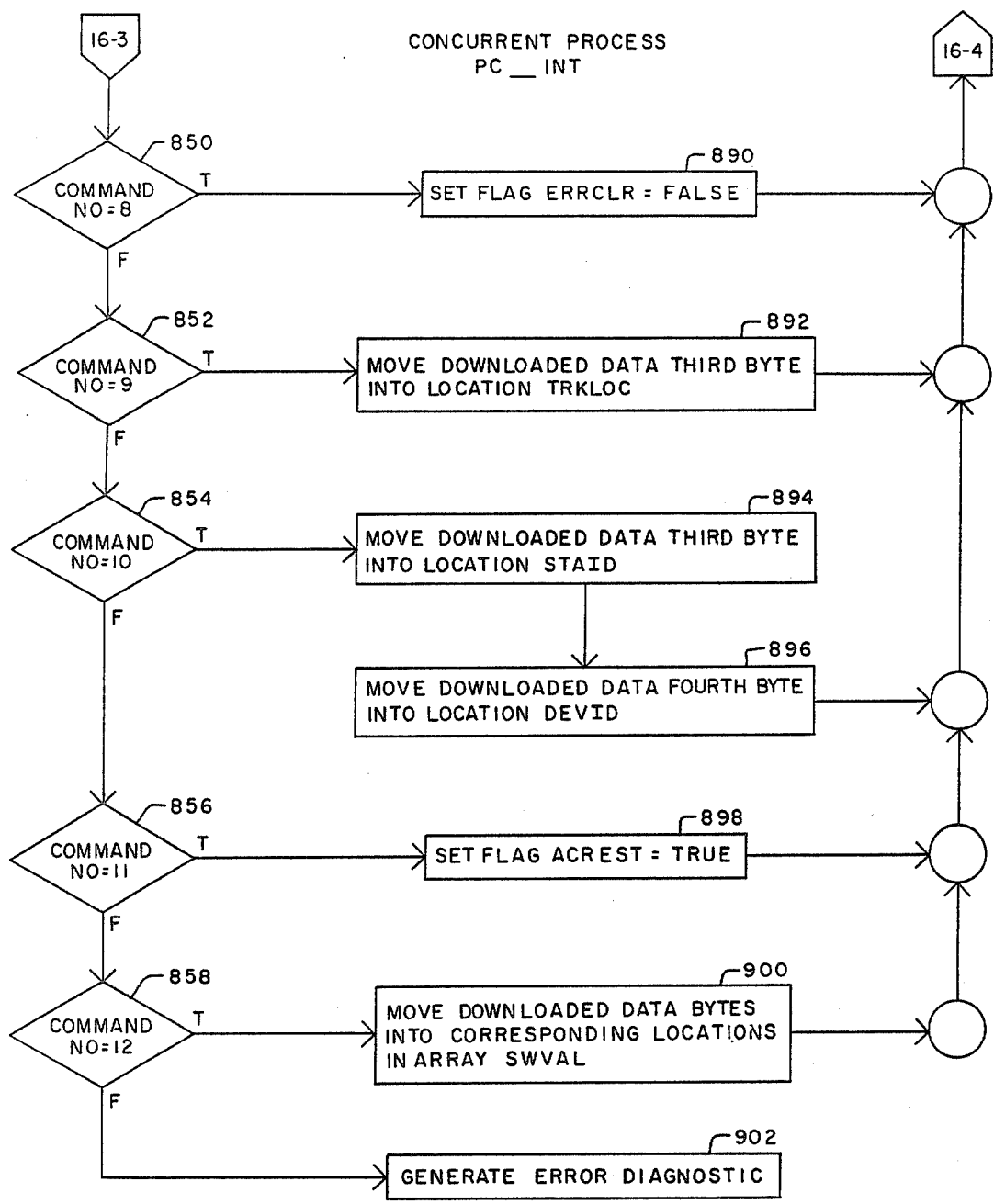
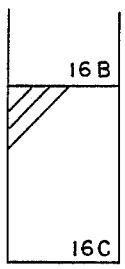
FIG. 16C

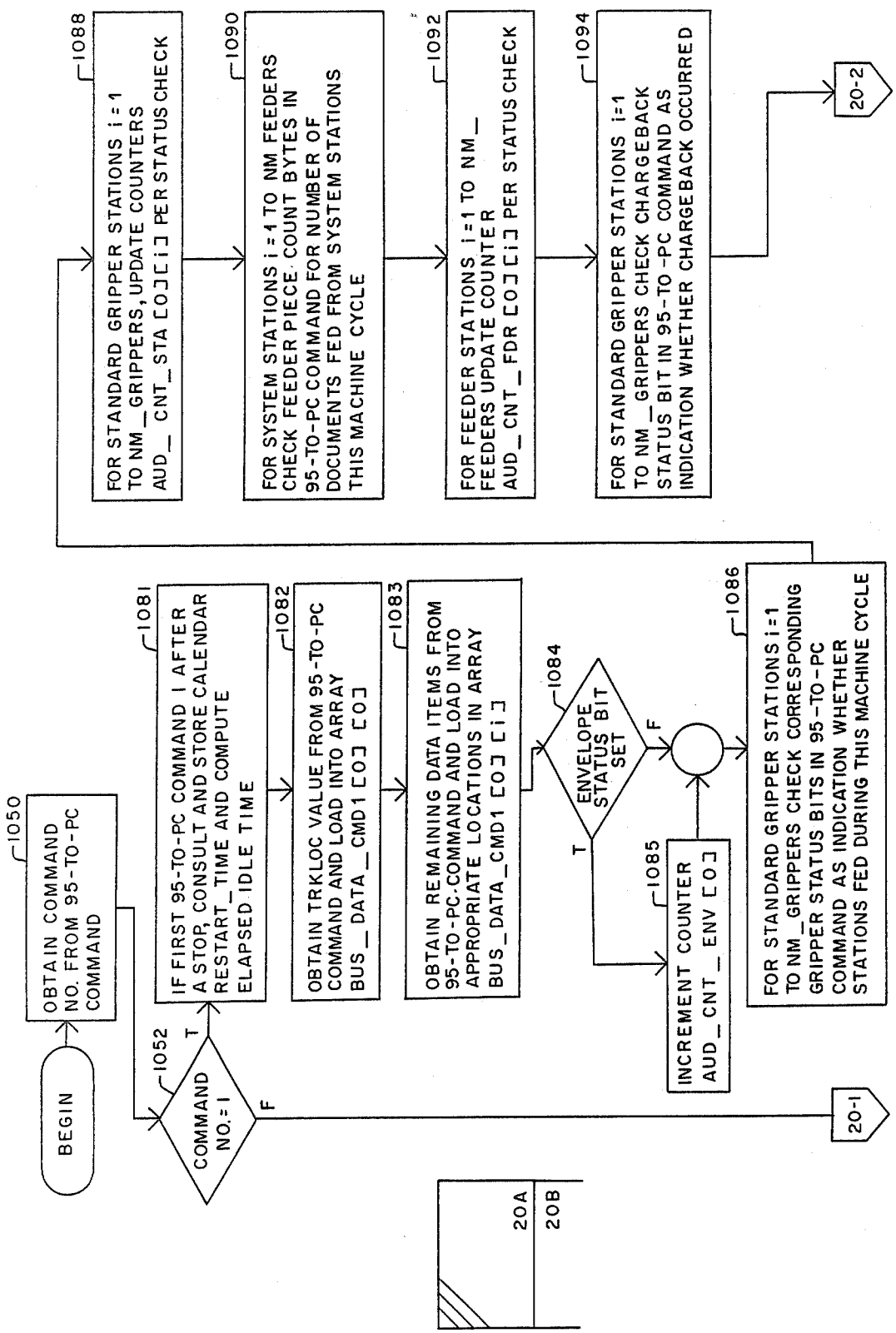
FIG. 20A SUBROUTINE CMDINTR

"MAINMENU"

"STASELCO"

"CHNGWGHT"

"CNTDISPL"

"DEVINFO"

"AUDIT"

SUBROUTINE AUDIT_TRIAL_PROCESSING

SUBROUTINE AUDIT_TRIAL_PROCESSING

INSERTION MACHINE WITH AUDIT TRAIL AND COMMAND PROTOCOL

This application is a continuation-in-part of U.S. patent application Ser. No. 823,427 filed Jan. 28, 1986 abandoned.

BACKGROUND OF THE INVENTION

I. Field of the Invention

This invention pertains to collating machines of the type which are operable as insertion machines, and particularly to methods and apparatus of monitoring the operation and performance of such machines.

II. Prior Art and Other Considerations

For several decades now collating machines have been utilized by commercial establishments for the preparation of printed matter for postal purposes. An early collating machine operated as an insertion machine is described in U.S. Pat. No. 2,325,455 to A. H. Williams.

In conventional collating machines, a plurality of processing stations perform processing events with respect to groups of documents being conveyed on an insert track in timed relation to a machine cycle. In most such machines the first such processing station positioned along the insert track is generally a first or control insert station which comprises feeder means for feeding inserts or documents onto the insert track. The insert track is generally indexed relative to further document feeding stations at a rate approximating one station or one track location position per machine cycle.

The document(s) deposited on the insert track from the first insert station is associated with a particular customer and typically bears a control indicia, such as a bar code printed thereon, which, when read, indicates with reference to the particular customer which further insert stations are to be actuated to feed one or more documents. As a particular customer's indicia-bearing document is indexed along the insert track, each insert station has an opportunity to feed (subject to operator control input and in accordance with the read control indicia) whatever document(s) stored thereat are applicable to the particular customer for inclusion with a group of documents related to the particular customer.

After all applicable inserts for a particular customer have been associated together as a group on the insert track, the associated documents are placed in an appropriate packaging medium at a packaging station. For collating machines which serve as insertion machines the packaging station is an inserting or stuffing station whereat the associated documents are stuffed into an awaiting envelope. Further operations such as envelope sealing, envelope diverting, and/or zip code grouping occur yet downstream in accordance with some embodiments of insertion machines. In some collating machines a wrapper or the like is formed about or envelopes the associated documents at the packaging station.

Some more recent collating machines are operated at least to some degree in conjunction with a computer or data processing system. In such machines the data processing system makes various decision relating to processing events, including decisions regarding the selective feeding of documents from various stations. In machines such as that described in U.S. Pat. No. 4,571,925 the data processing system even makes a determination relative to postal allocation for a group in accordance with a projected group weight which is calculated by the data processing system on the basis of the per document weights of documents stored at the feeding stations. Some document insertion machines have data processing systems wherein the central processing unit which manages the insertion machine also manages a display device such as cathode ray tubes whereupon textual indications of machine diagnostic information, such as machine jams, for example, are displayed.

Numerous collating machine operating parameters must be established prior to the processing of a job or batch. Some of the operating parameters have been established by manually setting certain mechanical switches; others of the operating parameters have been establishing by manually entering data related to the parameters into the data processing system through a plurality of electronic switches or keyboards. On some occasions human operators have overlooked the setting of one or more input parameters with the result that a portion of the batch or run may not be properly processed.

According to prior art practice, in order to prepare a collating machine to process a job or batch, an operator had to first provide (via both a system panel and a machine control panel) certain operating parameters indicative of which of the insert stations included in the particular collating machine configuration are to be turned OFF, which are to be turned ON; and, for some embodiments, which are in a SELECT mode. If an insert station were OFF, the insert station was not permitted to feed a document regardless of a customer's control indicia. If an insert station were ON, the insert station was required to feed a document regardless of a customer's control indicia. If an insert station were specified as being in a SELECT mode, the control indicia was used to determine whether the insert station was to feed.

The efficiency of an insertion machine depends upon several factors, including the machine cycle speed and the average number of documents per customer fed from the control station. In this respect, if the machine is operating at too fast a speed, for many customers feeder stations may not be able to feed and/or collect within a single machine cycle all the documents to be fed therefrom. For example, in an insertion machine which employs a burster with a collector, for a customer with many documents several machine cycles may be required before all the customer's documents are collected and ready for deposit on the insert track. As a result, several sections of the insert track are left empty during the delay. As another example, in an insertion machine which employs a fast feeder such (as a check feeder), for a customer with many documents the insert track will have to remain stationary for one or more machine cycles. In both cases the efficiency of the insertion machine is reduced. Thus, it would be helpful for an operator to know the average machine cycle speed, the average number of documents per customer being fed from a control station, and the relationship therebetween so that the machine cycle speed can be set at an optimum level.

In addition to the foregoing, it would be beneficial to provide a statistical report of other operations performed by an insertion machine. Accurate statistical reports would facilitate better stocking of hoppers associated with insert stations; would provide more detailed diagnostic information for maintenance and servicing purposes; and, would provide tangible records for management purposes of operator performance and machine production.

In view of the foregoing, it is an object of this invention to provide an insertion machine and operating method therefor in which machine operations are monitored and a statistical report thereof is provided.

An advantage of the present invention is the provision of an insertion machine and operating method therefor which monitors its own operations and reports statistical data which is useful for operating the machine more efficiently.

Another advantage of the present invention is the provision of an insertion machine and operating method therefor which monitors its own operation and reports statistical data which is useful for diagnosing potential machine problems.

Yet another advantage of the present invention is the provision of an insertion machine and operating method therefor which monitors its operation and reports useful accounting information.

Still another advantage of the present invention is the provision of an insertion machine and operating method therefor which facilitates a systematic and orderly establishment of machine operating parameters.

SUMMARY

Processing events of an insertion machine are managed by a first data processor (DPS1). The DPS is connected to a second data processor (DPS2) by a data transmission cable whereby the DPS1 sends data formatted in accordance with a plurality of 95-TO-PC COMMANDS to the DPS2 and whereby the DPS2 sends data formatted in accordance with a plurality of PC-TO-95 COMMANDS to the DPS1. The DPS2 has associated therewith data storage medium drive mechanisms and peripheral devices including a display monitor, a keyboard, and a printer.

Some of the PC-TO-95 COMMANDS are used for downloading values for insertion machine input parameters and are generated in response to user input via keyboard as prompted by appropriate displays on the monitor. Other PC-TO-95 COMMANDS are generated in response to user input for interrogating the DPS1 and prompt the DPS1 to generate an answering 95-TO-PC COMMAND which includes insertion machine-related operating output data. Other 95-TO-PC COMMANDS including insertion machine-related operating data are generated in dependence upon insertion machine activity, such as the reaching of a certain point in the machine cycle or the detection of a machine fault. As prompted by a display on the monitor the user can cause the DPS2 to generate a command which stops the insertion machine and to enter an AUDIT TRAIL mode. In the AUDIT TRAIL MODE the DPS2 generates a statistical report regarding monitored operations of the insertion machine in accordance with analysis by the DPS2 of the insertion machine-related operating output data which has been periodically sent to the DPS2.

Various operations associated with an insertion machine are monitored in connection with the statistical report over a plurality of time bases or time frames. Monitored operations include the number of inserts fed from each of a plurality of insert stations; the number of envelopes diverted by each of a plurality of stackers; the number of envelopes metered by each of a plurality of postage meters; the number of envelopes completed; the number and type of machine stops or faults; the actual machine run and idle times; and, the average machine cycle speed per hour.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 4 is a chart which illustrates the format of portions of a system global data bus SBUS according to the embodiments of FIGS. 1 and 1A;

FIG. 5A illustrates locations included in a memory associated with the data processing system according to the embodiment of FIG. 1 wherein average values are stored;

FIG. 11 is a chart showing an AUDIT TRAIL report generated format according to the embodiment of FIG. 1;

FIGS. 16A, 16B, and 16C are schematic diagrams illustrating execution operations associated with a concurrent process PC_INT;

DETAILED DESCRIPTION OF THE DRAWINGS

First Embodiment Structure

Figure 1:
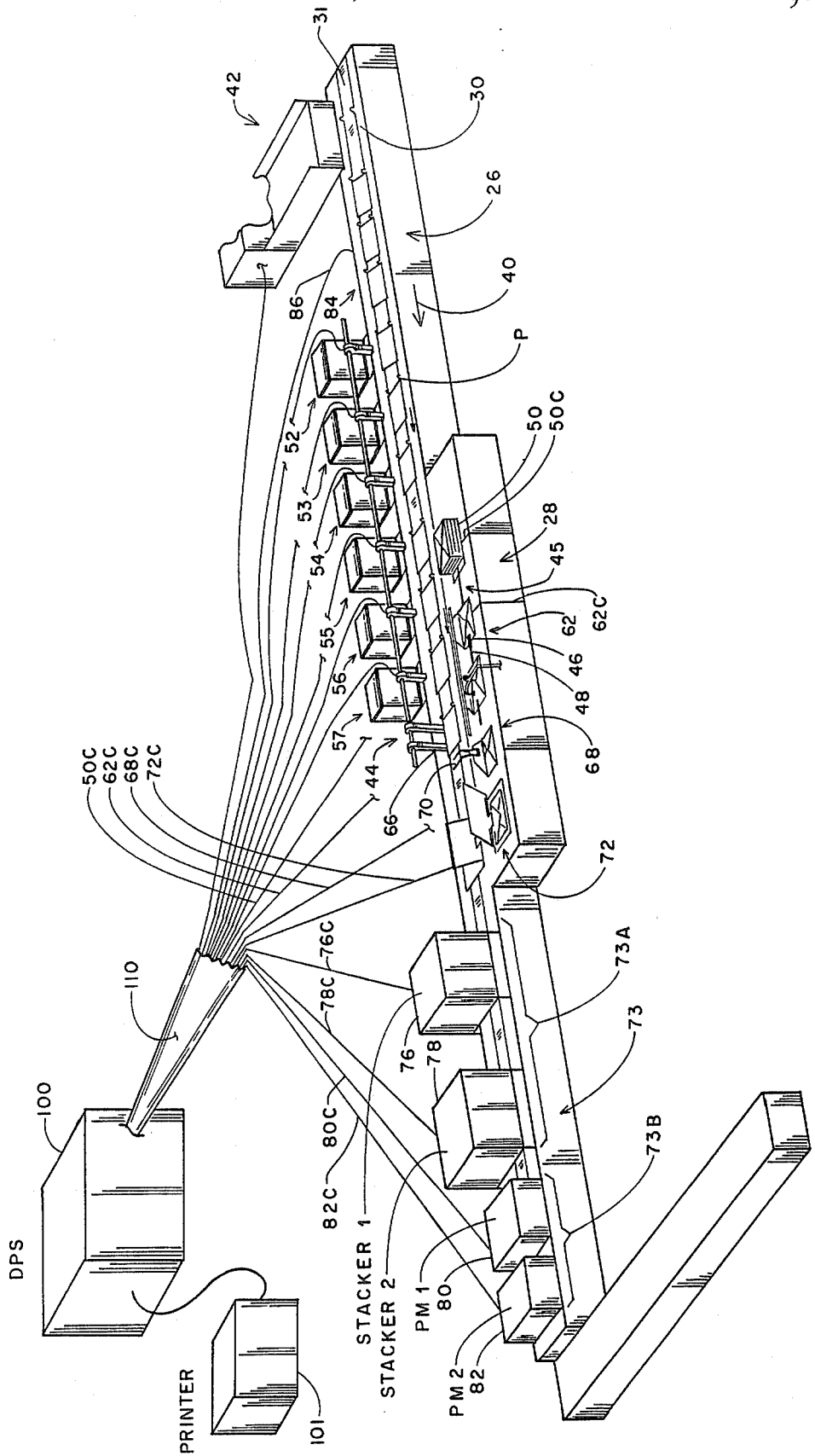
FIG. 1 is a perspective view of an insertion machine according to a first embodiment of the invention.

FIG. 1 illustrates an insertion machine according to a first embodiment of the invention. The embodiment of FIG. 1 comprises a back table portion 26 and a front table portion 28. The back table portion 26 includes an essentially linearly-extending insert track 30 which extends along a series of insert processing stations. The insert track 30 has sets of pusher pins P formed on an indexing chain 31 whereby the insert track 30 conveys groups of documents deposited thereon in the direction of arrow 40 from an upstream-most insert station 42 to an insertion or envelope stuffing station 44.

The insert track 30 is indexed once per machine cycle in a manner well known in the prior art. In this respect, it is understood that the entire insertion machine is driven by an unillustrated motor. The motor is coupled both to a continuously rotating main timing shaft and to an intermittently rotating shaft. One full rotation (i.e. 360°) of the continuously rotating main timing shaft is referred to as a machine cycle. The indexing chain 31 is suitably connected to the intermittently rotating shaft by means well known to those skilled in the art whereby the chain 31 is moved during a portion of the machine cycle. In the embodiment described herein, the chain is essentially stationary through 0 to 180 degrees of the machine cycle (DMC) and moves essentially from 180 DMC to 360 DMC for incrementally advancing documents. It should be understood, however, that the particular degree of machine cycle at which chain 31 moves differs in some embodiments in view of various acceleration and deacceleration factors.

An envelope track 45 extends on the front table portion 28 in parallel manner along-side at least a portion of the insert track 30. The envelope track 45 has gripping jaws 46 formed on an indexing chain 48 whereby the envelope track 45 pulls an envelope deposited thereon also in the direction of arrow 40 away from an envelope feed processing station 50 and toward the insertion station 44. The front table portion 28 has associated therewith a continuously rotating timing shaft and an intermittently rotating shaft. In differing embodiments these two shafts associated with the front table portion 28 are coupled directly to the machine motor as described above or are mechanically linked to the continuously rotating main timing shaft and to the intermittently rotating shaft described above which operates chain 31. The intermittently rotating shaft associated with the front table portion 28 is used to incrementally advance the envelope indexing chain 48.

The series of insert processing station includes the first or up-stream most insert station 42, as well as the second, third, fourth, fifth, sixth and seventh insert stations numbered 52 through 57, respectively. The first insert station 42 is a cutter-type insert station which includes a web cutter of the type marketed by the FIMA Corporation. The insert station 42 cuts documents from a web of documents; collects the cut documents in sub-groups in a collection stage; and, discharges sub-groups onto the insert track 30 generally at a rate of one sub-group per machine cycle. The first insert station 42 includes unillustrated reading means for reading indicia printed or otherwise formed on the customer's document. The indicia can be prepared to include indications of numerous types of information including, for example, whether the document is the first document in a sub-group; which of the remaining insert stations in the series 32 are to feed documents with respect to this customer; the number of documents to be fed from any of the insert stations included in the series 32 which are capable of feeding a plurality of documents per machine cycle; which of a possible plurality of downstream diversion mechanisms are to be actuated; which of a possible plurality of downstream envelope marker mechanisms are to be actuated (for such reasons as indicating the beginning of a new zip code set); and whether an envelope is to be sealed or unsealed.

A reading station such as insert station 42 of the embodiment of FIG. 1 can function in any of a plurality of modes. If the reading station is the upstream-most reading station in a particular insertion machine configuration, the insertion station is in a control mode and is known as a control station. At a control station various information indicated by the read indicia is stored in memory means for use in conjunction with downstream processing. If the station has the capability to perform a match operation (i.e. to match the number of a plurality of documents which the station actually fed per machine cycle with the number required by the read indicia, or to match a printed pattern or the like on its fed document with a pattern characterizing the particular customer whose group was positioned before the station) and the match capability is utilized, the insertion station is in a match mode and is also known as a "matching" station.

In the configuration of FIG. 1, the insert station 42, being the upstream-most reading station, serves as a control station. Therefore indicia read at the insert station 42 is stored in memory for downstream processing.

The insert stations 52 through 57 are each standard gripper-type insert stations having oscillating gripper arm structure. In a gripper insert station, a gripper arm mounted on an oscillating shaft extending above the insert track oscillates the gripper arms toward and away from a hopper associated with the first insert station. The gripper arm has two jaw members which selectively engage a vacuum-deflected document in the insert station hopper at an appropriate point in the machine cycle and which, after the gripper arm has oscillated away from the hopper, selectively disengage the document, thereby depositing the document on the insert track. Insert stations can be classified as a "standard" insert station-type as just described or can be classified as a "reading" insert station-type by virtue of the further inclusion in their structure of appropriate indicia reading electronics. These standard gripper-type insertion stations 52 through 57 do not have the capability to read indicia or patterns of documents fed therefrom, but merely feed documents in accordance with operator control input and the indicia read at the control station 42. Each standard gripper insert station 52-57 has associated therewith a mistake detector to determine whether the gripper arm has engaged a proper number of documents. For the embodiment shown in FIG. 1, gripper arms and the associated mistake detectors are of the type shown in U.S. patent application Ser. No. 06/648,399 filed on Sept. 7, 1984 by Zemke et al. and incorporated herein by reference.

Considering further the insertion machine of the embodiment of FIG. 1, it is seen that such a machine can be utilized inter alia by a client which is a credit card company. In this example the first insert station 42 feeds a "summary of account" document for each of a plurality of customers; the second insert station 52 has stored thereat a self-addressed envelope for each of the plurality of customers; the third insert station 53 has a plurality of general interest or "required" informational documents (such as a notice advising of a change in interest rates) which are to be mailed to all customers; the fourth and fifth insert stations 54,55 have stored in their respective hoppers "special" or conditional interest informational documents to be enclosed with the statements for selected or targeted customers (such as notices to delinquent customers in the hopper for the fourth insert station and notices to senior citizen customers in the hopper for the fifth insert station); and, the hoppers of the sixth and seventh insert stations 56,57 have stored therein third-party advertising documents which are includable in piggyback fashion with the customer's statement and enclosures.

In the example just described the third-party advertising station 56 is of a type known in the prior art and described in U.S. patent application Ser. No. 06/576,893 filed Feb. 3, 1984 by Baggarly et al. which includes third-party advertising documents with a customer's statement and enclosures if and only if inclusion of the third-party advertising documents will not increase the postage amount for the customer's group. The documents fed from station 56 are counted so that the third-party associated with station 56 can be charged for the inclusion at a specified per insert fee. The third-party associated with station 57, on the other hand, has specified that its third-party advertising documents are to be included in each customer's group regardless of the impact of inclusion upon the postage amount for the group. As seen hereinafter, if the extra weight of the third-party advertising documents fed from station 57 increases the total weight of a customer's group sufficiently for the group to be classified in the next greater postage weight category (thereby incurring an additional postage amount), the third-party associated with station 57 is charged for the additional postage amount thusly incurred.

The processing stations located along the envelope track 45 include the afore-mentioned envelope feed processing station (also known as the envelope hopper) 50 and an envelope flap opener processing station 62. The envelope feed processing station 50 can, in differing embodiments, include any one of a plurality of types of envelope feeding mechanisms. The envelope flap opener processing station 62 can also be one of several types, including either a rotating plough, butterfly-type opener illustrated for example in U.S. Pat. No. 3,583,124 to Morrison, or a traveling and rotating sucker cup-type opener as illustrated in U.S. Pat. No. 4,318,265 to Orsinger, for example.

The insertion station 44 serves to stuff a group of related documents into an awaiting, opened envelope. The insertion station 44 includes conventional mechanical structure such as that illustrated in U.S. Pat. No. 3,965,644 to Stocker, for example. At insertion station 44 the back pannel of an envelope is deflected slightly upwardly by one or more oscillating sucker cups positioned above the envelope. The group of documents is then ushered into the awaiting, thusly-opened envelope by oscillating pusher foot-type structure 66. The pusher foot 66 is mechanically linked to the main timing shaft of the insertion machine whereby the pusher foot 66 oscillates to usher documents at the rate of once per machine cycle.

A sealing processing station 68 is situated immediately after the insertion station 44. The sealing station 68 comprises a wettable brush 70 which moistens a gummy seal-portion of a moving envelope flap prior to the flap being rotated back to its closed position.

Downstream from the sealing station 68 is an envelope turnover processing station 72 which, in a manner well known in the prior art, during four sequential machine cycles flips an envelope from envelope track 45 into a front panel-up orientation on an exit conveyor 73. The mechanical mechanism which performs the turnover or flip operation is mechanically linked to the machine timing shaft.

The exit conveyor of the embodiment of FIG. 1 comprises a first segment 73A and a second segment 73B. Segment 73A, which extends beneath two diversion processing stations such as stackers 76 and 78, is a chain-indexed conveyer driven in the manner of the insert track 30. Examples of diversion stackers of the type shown in FIG. 1 are described in U.S. Pat. No. 3,652,828 to Sather et al. Segment 73A discharges stuffed envelopes onto segment 73B. Segment 73B is a continuously running conveyor which extends along two postage meter processing stations 80 and 82.

An intrack detector processing station 84 is positioned along the insert track 30 to monitor for the presence of groups of documents on the insert track 30. The intrack detector 84 includes a conventional presence-sensing detector, such as photocell 86.

A data processing system 100 comprises a processor means which, according to differing embodiments, can be either a (1) multiprocessor comprising a plurality of microprocessors or (2) a microcomputer which includes a microprocessor capable of using a multitasking operating system. One example of a suitable microprocessor for such a microcomputer is the 9900 family of microprocessors marketed by Texas Instruments. The configuration of the DPS 100 and the connection of pins associated with the microcomputer is understood with reference to U.S. patent application Ser. No. 707,124 entitled "Insertion Machine with Global Data Bus" filed Feb. 28, 1985 by David Taylor (incorporated herein by reference). It is understood by those skilled in the art that an appropriate timer chip or clock is connected to the microprocessor, such as a conventional calendar clock which keeps track not only of the time of day, but also of the day of the week, month, and so forth.

The DPS 100 comprises memory means which includes memory portions in EPROM for storing operating system program instructions; portions in RAM for storing common (or global) identifier values; portions in RAM which serve as workspaces for the operating system; portions in EPROM into which is loaded the customized software system which comprises a plurality of concurrent programs; and, portions in RAM which serve as workspaces for the customized software system as such portions are allocated and supervised by the operating system.

The DPS 100 also includes I/O means comprising interrupt logic chips, input logic chips, and output logic chips. Interrupt and input signals are generated by various devices including photocells, detectors, switches, buttons, and the like, including such devices which are included in electronic circuits associated with various processing stations. Output signals from the DPS 100 are applied to various devices such as solenoids, lamps, and the like, including such devices which are included in electronic circuits associated with processing stations. Thus, various output signals are applied to electronic circuits associated with various processing stations so that the electronic circuits can, in turn, operate the particular device which actually performs the characteristic processing event for the respective processing station.

A printer 101 is connected to the DPS 100 through a conventional serial interface port such as a UART. In the illustrated embodiment printer 101 is of a type marketed by Texas Instruments as model 703.

Various processing stations are connected by electrical leads to the interrupt chips, input chips, and output chips comprising the DPS 100. For illustration convenience the electrical leads connecting the various processing stations to the DPS 100 are shown as a series of cables labeled "XC" wherein X corresponds to the reference numerals designating the particular processing station. The cables are shown as merging into a larger conduit cable 110 as they enter the DPS 100.

Figure 2A:
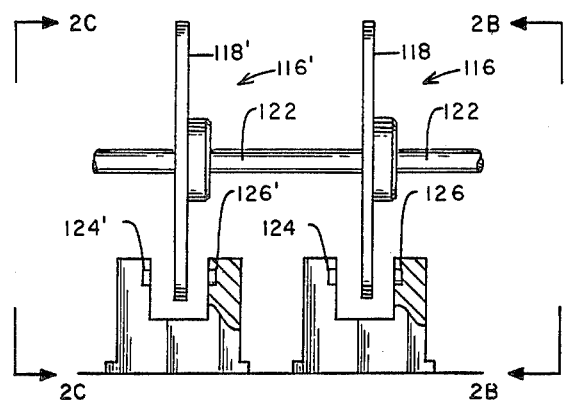
FIG. 2A is a side view of machine cycle detection means according to the embodiments of FIGS. 1 and 1A.
Figure 2B:
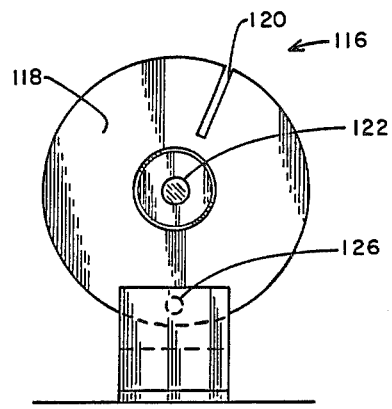
FIGS. 2B and 2C are front and rear views, respectively, of machine cycle detection means according to the embodiments of FIGS. 1 and 1A.
Figure 2C:
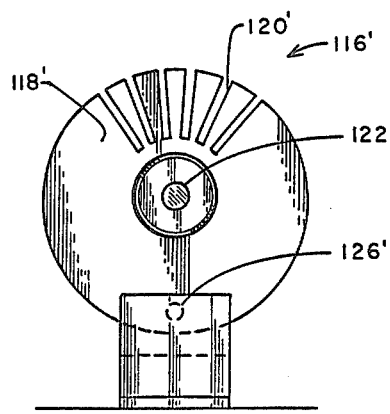
Figure 3:
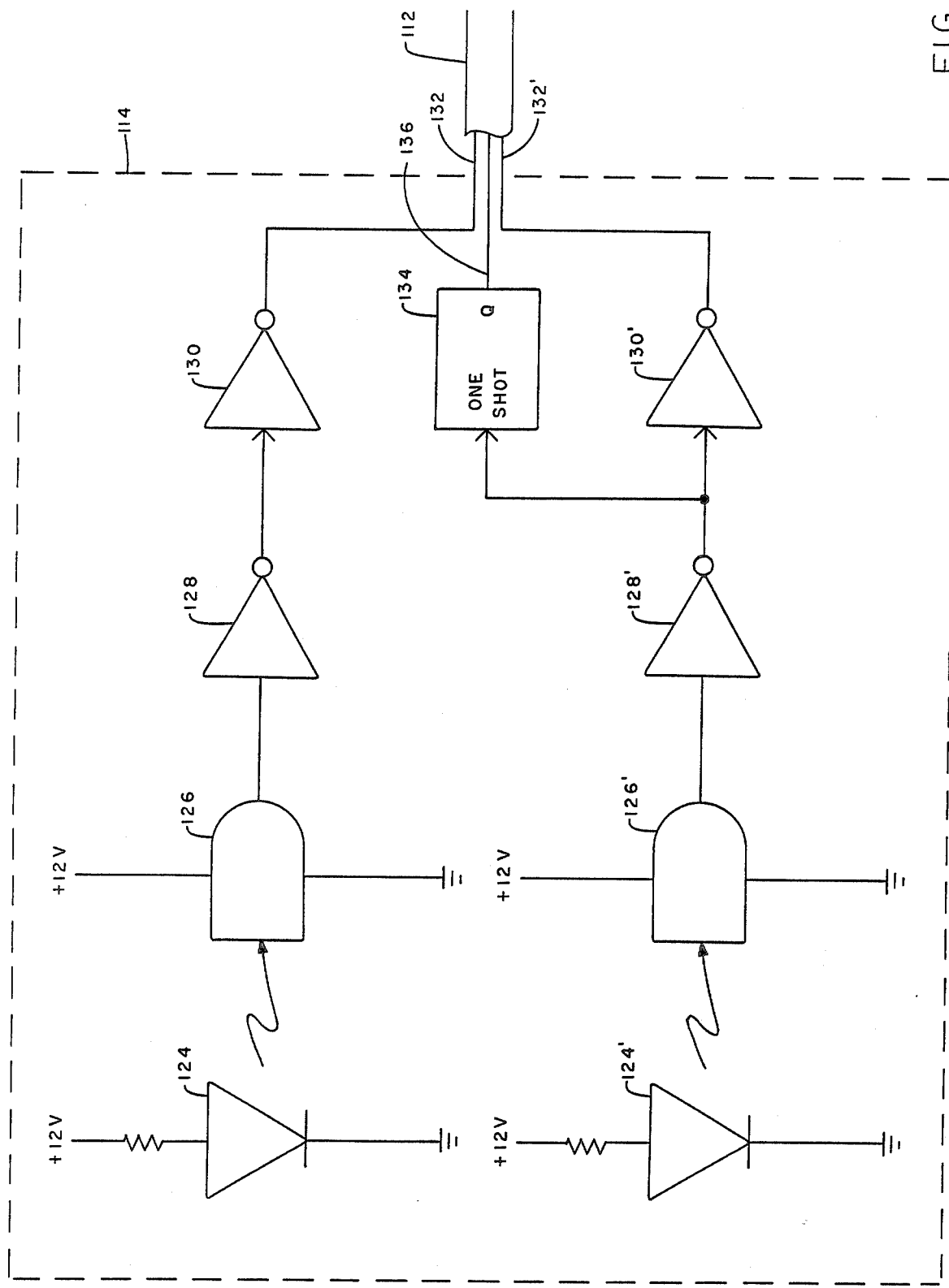
FIG. 3 is a schematic diagram of machine cycle detection circuitry according to embodiments of FIGS. 1 and 1A.

To obtain access to information relative to machine cycle execution events, a cable 112 is used to connect the interrupt logic means of DPS 100 to a conventional machine cycle detection circuit 114 such as that shown in FIG. 3. The detection circuit 114 functions in combination with two rotational position sensors 116 and 116'. As shown in FIGS. 2A and 2B, rotational position sensor 116 includes a rotatable disc 118 which has one circumferential slit 120 thereon. As shown in FIGS. 2A and 2C, rotational position sensor 116' includes a rotatable disc 118' which has thirty six circumferential slits 120' thereon. The rotatable disc 118 is mounted on the main timing shaft 122 of the collating machine so that slit 120 permits the passage of light from a source 124 to a detector 126 once per machine cycle in a manner to create a train of timing pulses on line 132. The rotatable disc 118' is likewise mounted on the main timing shaft 122 of the collating machine so that slits 120' periodically permit the passage of light from a source 124' to a detector 126' to create a train of timing pulses on line 132'. Two inverting drivers 128,130 are connected in series to the output terminal of detector 126, with the output of driver 128 being connected to a line 132 included in cable 112. Likewise, two inverting drivers 128' and 130' are connected in series to the output terminal of detector 126', with the output of driver 128' being connected to a line 132' included in cable 112. In the embodiment discussed herein, the machine cycle detector circuit 114 causes the application of an interrupt signal on line 132 once every machine cycle and an interrupt signal on line 132' every 10 degrees of machine cycle rotation. The output terminal of driver 128' is also connected to an input terminal of a one-shot 134. An output terminal of one-shot 134 is connected to a line 136 included in cable 112. The timing parameters of one-shot 134 are set so that output pulses on line 136 have a pulse width sufficiently large that a TRUE signal is continuously applied on line 136 as long as disc 118' is rotating (i.e. as long as the machine is running). The DPS periodically checks the status of the signal on line 136 to ensure that the insertion machine is running. Such checks are made as safety checks, for example, by various concurrent programs before processing is effected by the associated processing stations.

As described in U.S. patent application Ser. No. 707,124 entitled "Insertion Machine with Global Data Bus", filed on Feb. 28, 1985 by David Taylor, the DPS 100 has loaded therein a customized software system comprising a plurality of concurrent programs. Various ones of the concurrent programs are associated with a particular type of processing station and include one or more concurrent tasks. The tasks comprising such programs are executable sets of instructions configured for performing various processing event-related functions. In one embodiment the data processor 100 includes a multitasking operating system which facilitates independent execution of the plurality of concurrent programs.

A system global data bus SBUS is accessible by a plurality of concurrent programs. SBUS comprises a plurality of data records, each data record corresponding to one of a plurality of groups of documents being indexed along insert track 30 and having informational data elements relative to processing events performable with respect to that group of documents by various ones of the processing stations. By interfacing with SBUS the concurrent program associated with a particular processing station can, depending upon the nature of the characteristic processing event, perform logic required for the characteristic processing event either as early or as late as practical prior to the actual occurrence of the characteristic processing event.

SBUS is a system global (i.e. common) variable of the type TRACKREC. In fact, SBUS is defined as follows:

SBUS: ARRAY[0..BBUSLM1] OF TRACKREC
TRACKRFC is defined in the Pascal language as follows:

```
TRACKREC =   RECORD
             BITS:BITSTYPE;
             NUMBERS:ARRAY[1 ... BNUMMAX]
             OF INTEGER
             END;
``` wherein BITSTYPE is itself declared a type as follows:

BITSTYPE=PACKED ARRAY [0..BBITMAX]
OF BOOLEAN;

BBITMAX is an integer constant; and
BNUMMAX is an integer constant.

The global variable SBUS is conceptualized as an array of records, each record being of the type TRACKREC. As illustrated in FIG. 4, SBUS is a given a two-dimensional representation wherein each record of the array SBUS is described as a column. The column associated with each record of the array includes a number of rows equal to the sum of the value of the identifiers BBITMAX (representing BBITMAX number of packed Boolean elements) and BNUMMAX (representing BNUMMAX number of integer elements). In the example discussed herein the integer values of the identifiers BBITMAX and BNUMMAX are preset by the machine builder in a concurrent program GENESIS to the constant values 53 and 4, respectively. In accordance with this example, each record of the array SBUS includes 53 packed Boolean elements (representing Boolean information relative to the processing of the insertion machine system of a particular customer's documents) and 4 integer elements (representing integer information relative to the processing by the insertion machine of the same particular customer's documents).

Further in accordance with the example, the FIG. 4 illustration of SBUS shows BBUSLEN=20 number of records, the value of BBUSLEN being determined on the basis of a preset constant and equal to BBUSLMl+1. BPUSLEN represents the number of customers whose documents which can simultaneously undergo active processing (i.e. the number of customers whose documents are simultaneously being indexed in accordance with a machine cycle). It should be well understood by the man skilled in the art that the format of SBUS can be reconfigured as required to take into consideration inter alia a lengthening or contracting of the overall collating machine system (thus affecting the value BBUSLEN).

Bits 1 through 3 of the packed Boolean array portion of each record of SBUS are set to either a "True" or "False" value depending upon whether the control indicia requires the feeding of documents from a possible plurality of downstream (i.e. non-control station) reading-type insert stations corresponding to bits 1 through 3. For example, bit 1 set "True" indicates that a first downstream reading-type insert station is to feed; bit 2 set "True" indiciates that a second downstream reading-type insert station is to feed; and so forth. In differing embodiments a greater or smaller number of bits corresponding to bits 1 through 3 are included in SBUS in accordance with the number of reading-type insert stations requied by the user. In the example of FIG. 1 there are no downstream reading stations so that bits 1, 2, and 3 are all set "False".

Bits 4 through 19 of the packed Boolean array portion of each record of SBUS are each set to either a "True" or "False" value depending upon whether the control indicia requires that the respective standard gripper-type insert station feed a document. Bits 4 through 19 are associated on a one-to-one basis with as many as 16 corresponding standard gripper insert stations. The machine builder specifies which of the bits 4 through 19 correspond to each standard gripper insert station. For the example of FIG. 1 the builder has specified that bits 4 through 9 correspond with insert stations 52 through 57, respectively. After the indicia on the control document is read at the control station, and in accordance with the builder's specification, bits 4 through 19 are appropriately set in the record for the customer then at the control station.

Bits 28, 29, and 30 of the packed Boolean array portion of each record of SBUS are standard diversion status bits which are used in the control of as many as three respective diversion mechanisms (such as lifter fingers or diversion gates). Bits 28, 29, and 30 are generally set in accordance with the read indicia after reading occurs at the control station. Diversion based on a "True" setting of the standard diversion bits 28, 29, or 30 may be desired in situations, for example, where the corresponding customer's envelope has an overseas address or is internal corporate mail.

Bits 51, 52, and 53 of the packed Boolean array portion of each record of SBUS are postage meter status bits which are used for the control of as many as three respective postage meters. The postage meters are set whereby each meter applies a different postage amount. When the weight of a stuffed envelope is determined, either the concurrent program CW or the concurrent program corresponding to the particular control station being utilized, sets an appropriate one of the postage meter status bits 51, 52, or 53.

The four integer values included in each record of SBUS have the variable identifiers BMAT1, BMAT2, BPCNT, and BWGHT. BMAT1 expresses the read control indicia value in binary format. BMAT2 expresses the read control indicia value in binary coded decimal format. BPCNT is an integer count of the number of documents associated with a particular customer. BWGHT is the computed weight of the documents associated with a particular customer. The values of BMAT1 and BMAT2 are determined after the reading of the control indicia and are placed into SBUS under the control of the concurrent program associated with the control station. In general, the values of BPCNT and BWGHT are updated at each reading-type insert station concurrent program associated with the appropriate insert station and are ultimately calculated by the concurrent program CW when the computer weighing feature is utilized.

With further reference to FIG. 4, a pointer BINDEX points to the record in SBUS corresponding to the customer whose document(s) are at the upstream-most processing station of the insertion machine. The conceptualized position of pointer BINDEX corresponds to the current integer value of a system global variable BINDEX in the customized software system. The global variable BINDEX represents the record number of the upstream-most processing station. The contents of records are thus not shifted from record-to-record through SBUS; rather, BINDEX is decremented (by a function BUS & ROTBUS) with each machine cycle to specify which record currently corresponds to the upstream-most processing station. Upon decrementation of BINDEX the value of BINDEX is checked to determine whether it equals zero, in which case the value of BINDEX is set at the value of BBUSLEN-1.

Figure 6:
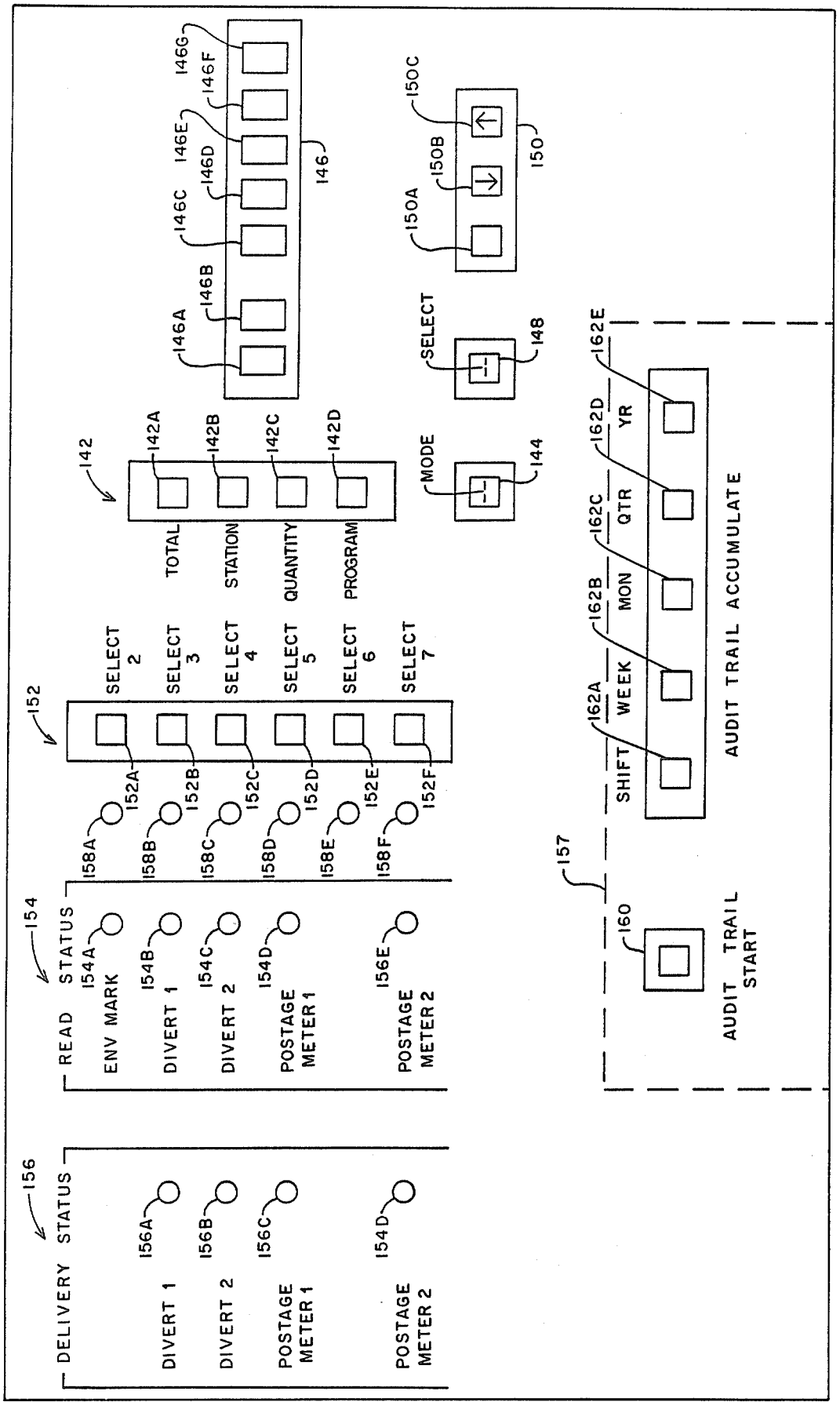
FIG. 6 is a front view of an operator console according to the embodiment of FIG. 1.

FIG. 6 shows a system panel 140 also known as an input and display console. Panel 140 includes thereon a mode display 142; a mode select pushbutton 144; an output display 146; a feeder/station select pushbutton 148; a data input keyboard 150; a station select mode keyboard 152; a read status display 154; a delivery status display 156; and, an audit trail keyboard 157.

Mode select pushbutton 144 is used in conjunction with a hereinafter-described concurrent program CW to switch program CW into one of four potential I/O modes. Three of the I/O modes—the TOTAL, STATION, and QUANTITY I/O modes—are enterable only when concurrent program CW is in an overall CALCULATION mode. The PROGRAM I/O mode is not enterable when concurrent program CW is in its CALCULATION mode.

Each I/O mode, described in more detail hereinafter, is associated with an illuminatable display element in display 142. In this respect, the TOTAL mode is associated with display element 142A; the STATION mode is associated with display element 142B; the QUANTITY mode is associated with display element 142C; and, the PROGRAM mode is associated with display element 142D. Assuming that the insertion machine is mechanically running, upon depressing the mode select button 144 a first time, concurrent program CW enters its TOTAL display mode and element 142A is lit. Upon depressing the mode select button 144 a second time, concurrent program CW enters its STATION display mode and element 142B is lit. Upon depressing the mode select button 144 a third time, concurrent program CW enters its QUANTITY display mode and element 142C is lit. If the insertion machine is not mechanically running, a fourth depression of mode select button 144 enables concurrent program CW to enter its PROGRAM mode and accordingly element 142D is lit. If the insertion machine insert track is being advanced upon the fourth depression of the mode select button 144, the concurrent program CW again enters its TOTAL mode and element 142A is again lit. Thus, repeated depressing of mode select button 144 causes the concurrent program CW to cycle through its modes. When the insertion machine is not physically running, depressing mode select button 144 allows concurrent program CW to cycle through all of its I/O modes including the PROGRAM mode. Otherwise the mode select button enables the operator to cycle through the TOTAL, STATION, and QUANTITY modes.

The output display 146 has two sets of LED—type display elements provided thereon—a first set comprising elements 146A and 146B and a second set comprising elements 146C through 146G. Display elements 146A and 146B are coordinated with the feeder/station select pushbutton 148. In certain I/O modes of the concurrent program CW the feeder/station select pushbutton 148 is employed to specify for which of the feeder or gripper stations (e.g., stations 42, 52, 53, 54, 55, 56 or 57) the numerical display depicted in elements 146C-146G pertains. For example, when in PROGRAM mode the specification is indicated by display elements 146A and 146B which together display a "F1" for feeder station 42, a "1" for first gripper station 52, a "2" for second gripper station 53 (and so forth up to "6" for the sixth gripper station 57), and an "E" for the envelope station 50.

Display elements 146C-146G are used for the display of a five digit number. In this connection, as the concurrent program CW is in a CALCULATION mode, the five digit number displayed by elements 146C-146G can be (1) the calculated projected total weight of a customer's stuffed envelope (during the TOTAL I/O mode); (2) the per-document weight at the station currently displayed by elements 146A and 146B (during the STATION I/O mode); or (3) the cummulative number of inserts fed during the lowest order time frame from the station currently displayed by elements 146A and 146B (during the QUANTITY I/O mode).

During the PROGRAM mode, the five digit number displayed by elements 146C-146G is the per-document weight of the station currently displayed by elements 146A and 146B. The data input keyboard 150 can be used to change the value displayed by elements 146C-146G, and hence the per-document weight of the station currently displayed by elements 146A and 146B, when the concurrent program is in the PROGRAM mode. In this regard, pushbutton 150A is used to cycle a pointer through the digits corresponding to display elements 146C-146G; pushbutton 150B is used to decrement the digit corresponding to the display element indicated by the pointer; and, pushbutton 150C is used to increment the digit corresponding to the display element indicated by the pointer.

With respect to the display elements 146C-146G, in the TOTAL, PROGRAM, and STATION modes a decimal point is provided so that the values displayed in display elements 146E-146G are right of the decimal point. In the QUANTITY mode no decimal is provided inasmuch as a positive integer is displayed.

The station select mode keyboard 152 is used to confirm that an insert station is operating in a SELECT mode (as opposed to an ON or OFF mode). It will be recalled that in the SELECT mode that the determination whether the insert station will feed a document for a customer is based on the indicia on the customer's control document. Buttons 152A-152F are provided for insert stations 52-57, respectively. When a button 152 is pressed for an insert station on panel 140, and when a similar button is pressed for that station on the unillustrated machine control panel, the station is placed in the SELECT mode. Display LEDs 158A-158F, associated with respective buttons 152A-152F, are illuminated when the corresponding button 152 has been depressed to place the station indicated thereby in the SELECT mode.

The read status display 154 includes LEDs 154A-154E. Appropriate ones of the LEDs 154A-154E are illuminated with respect to each customer at approximately the point in time at which indicia-read and calculated data for the customer is loaded into SBUS. For example, if it is determined that the customer whose data is being loaded into SBUS will eventually have his envelope diverted, LED 154B is illuminated. On the other hand, if it is determined that postage meter 80 will eventually be activated to apply postage to the envelope for the customer whose data is being loaded into SBUS, LED 154D will be illuminated.

The delivery status display 156 includes LEDs 156A–156D. The LEDs 156A–156D are illuminated when the processing stations associated therewith are actually activated. For example, when the divert stacker 76 is actually activated the LED 156A is illuminated. When the postage meter 80 is actually activated the LED 156C is illuminated.

The audit trail keyboard 157 has an audit trail start pushbutton 160 and a series of audit trail accumulate pushbuttons 162A–162E. As seen hereinafter, each accumulate pushbutton 162 is associated with a particular time base or time frame and serves to initiate the addition of contents of audit counter memory location of that particular time frame to the contents of corresponding audit counter memory locations for a higher order time frame.

Figure 5:
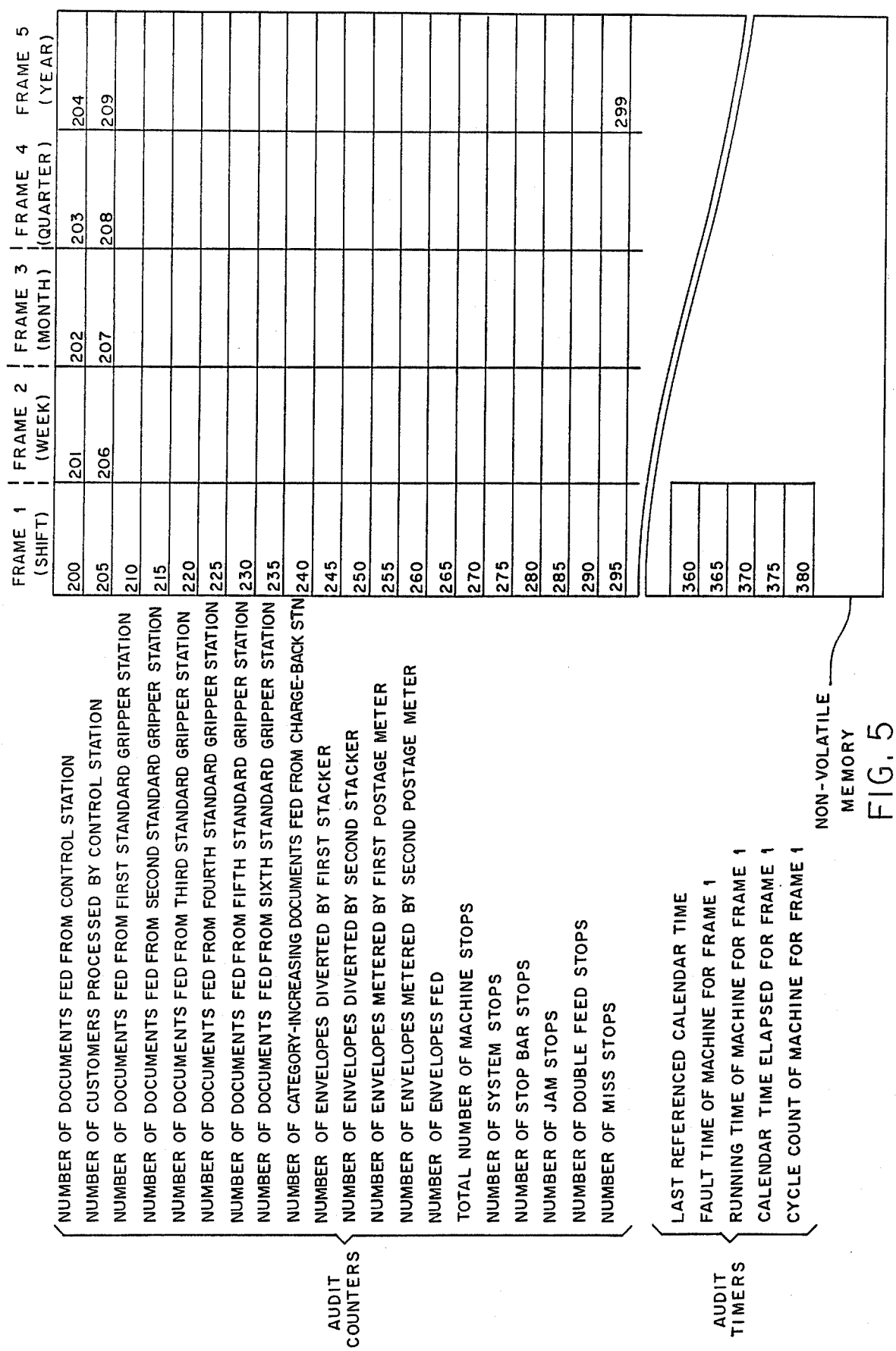
FIG. 5 illustrates a plurality of audit counters and timers included in a non-volatile memory associated with a data processing system according to the embodiments of FIG. 1.

FIG. 5 is a table depicting various memory locations in a non-volatile portion (i.e. battery backed-up RAM) of the memory means of the DPS 100, including memory locations associated with a plurality of audit counters having addresses represented by reference numerals 200–299 and memory locations associated with a plurality of audit timers having beginning addresses represented by reference numerals 360, 365, 370, 375, and 380. Each of the audit counters have five memory locations associated therewith, each of the five memory locations for an audit counter being associated with a particular time frame or time base. For example, the audit counter which pertains to the number of documents fed from the control station has memory locations represented by reference numerals 200–204 associated therewith. For this particular audit counter, the memory location 200 is used to store a count kept for a time base labeled FRAME1; the memory location 201 is used to store a count kept for a time base labeled FRAME2; and so on up to memory location 204 used to store a count kept for a time base labeled FRAME5. Thus, it is seen that each of the audit counters shown in FIG. 5 has five non-volatile memory locations associated therewith, the five memory locations being employed to store counts kept over five corresponding time bases.

The five time frames or time bases for which audit counts are user determined but have a hierarchial arrangement. In this respect, whenever audit counters associated with FRAME1 are accumulated such as by the pressing of button 162A) the contents of those counters are automatically added to the contents of the respective audit counters maintained for FRAME2 (after which the audit counters associated with FRAME1 are cleared). Whenever the audit counters associated with FRAME2 are accumulated (such as by the pressing of button 162B) the contents of those counters are automatically added to the contents of the respective audit counters maintained for FRAME3, and so forth.

In the embodiment described herein, FRAME1 corresponds to a current shift or batch; FRAME2 corresponds to the current week; FRAME3 corresponds to the current month; FRAME4 corresponds to the current calendar quarter; and, FRAME5 corresponds to the current year. Thus, at the end of a shift or run an operator hits the pushbutton 162A, at which time the contents of the memory locations 200, 205, 210, 215 . . . 295 are added to the contents of respective memory locations 201, 206, 211, 216, . . . 296. Likewise, at the end of a week the operator hits the pushbutton 162B, at which time the contents of the memory locations 201, 206, 211, 216, . . . 296 are added to the contents of the memory locations 202, 207, 212, 217, . . . 297. It is understood that other user-determined conventions for the five frames can be employed.

The audit counters shown in FIG. 5 include counters 200–204 which count for respective time bases the number of documents fed from the control station (such as station 42); counters 205–209 which count for respective time bases the number of customers processed by the control station; counters 210 through 249 which count for respective time bases and respective insert stations the number of documents fed from the standard insert stations (such as stations 52 through 57); counters 245–249 which count for respective time bases the number of envelopes diverted by the first stacker (stacker 76); counters 250–254 which count for respective time bases the number of envelopes diverted by the second stacker (stacker 78); counters 255–259 which count for respective time bases the number of envelopes metered by the first postage meter (meter 80); counters 260–264 which count for respective time bases the number of envelopes metered by the second postage meter (meter 82); counters 265–269 which count for respective time bases the number of envelopes fed; counters 270–274 which count for respective time bases the total number of machine stops; and, counters 275 through 299 which count for respective time bases and by type the number of machine stops (e.g., the number of system stops, the number of stop bar stops, the number of jam stops, and the number of double feed stops; and the number of miss stops). In addition, charge-back counters 240–244 count for respective time bases the number of documents fed from the charge back third party advertising station which cause the groups with which the documents become associated to increase in weight sufficiently to jump into a greater postage amount category.

Elaborating on the types of machine stops mentioned above, a system stop occurs as a result of a real time operating command of DPS 100. In this respect, a system stop can occur for example when the DPS 100 detects a misread, when a read indicia indicates that the system is to be stopped in connection with an alert and clear, or when it is determined that an unusually large number of documents are being fed from a station for a customer.

A "stop bar" stop occurs when an operator pushes one of the "stop" bars conveniently located for operator intervention of the machine operation. Such operator intervention can occur, for example, when the operator visually detects an irregularity or between operator shift changes or operator breaks.

An insertion machine such as that depicted in FIG. 1 has a jam detection device at each insert station for detecting document jams. The jam detection devices are connected to DPS 100 but are also interconnected in a manner whereby the detection of a jam at one of the insert stations can stop the insertion machine, resulting in a jam stop.

An insertion machine such as that depicted in FIG. 1 also has a mistake detector device at each gripper-type insert station to detect whether a proper number of documents have been vacuum-deflected and engaged between jaws of the gripper arm. One embodiment of such a mistake detector used for detecting the occurrence of "misses" or "doubles" is disclosed in U.S. patent application Ser. No. 06/648,399 filed on Sept. 7, 1984 by Zemke et. Signals indicative of mistakes resulting from a miss or double are noted by the DPS 100 and cause the DPS 100 to stop the insertion machine.

The audit timers commencing at locations 360, 365, 370, 375, and 380 are used to keep track of various time-related values. Audit timer 360 is used to store therein the last referenced calendar time (i.e., the time indicated by the calendar chip when the chip was last consulted in connection with either a machine start or machine stop). Audit timer 365 has stored therein the total machine fault or idle time for time base FRAME1. Audit timer 370 has stored therein the total actual machine run time for time base FRAME1. Audit timer 375 has stored therein the calendar time elapsed since the beginning of the time base FRAME1 (i.e. the sum of machine run time and machine fault time since the commencement of FRAME1). Upon starting and stopping of the insertion machine the calendar chip included in the DPS 100 is consulted; arithmetic operations are performed on the obtained time readings to derive a value representative of a time interval during which the machine has been either running or idle; and, the representative time interval value is added to the audit timer 375 and to the appropriate one of the audit timers 365 or 370.

FIG. 5A illustrates various locations included in the RAM memory of the DPS 100 which are used as temporary storage locations for statistics indicative of machine performance averages. In particular, a memory location having an address represented by reference numeral 385 is used to store a calculation of the average machine cycle speed for time FRAME1; a memory location having an address represented by reference numeral 386 is used to store a calculation of the average number of envelopes completed per hour for FRAME1 (based on the calendar time elapsed since the beginning of FRAME1); and, a memory location having an address represented by reference numeral 387 is used ot store a calculation of the average number of envelopes completed per actual run hour for FRAME1 (based on the amount of time the machine has actually run since the commencement of FRAME1). As seen hereinafter the calculation for the values stored in locations 385, 386, and 387 are made when an audit report is requested by the pressing of pushbutton 160. Upon such request, the values stored in locations 385, 386, and 387, being indicative of machine performance averages, are transmitted to the printer 101 for preparation of the audit report.

First Embodiment Operation

In operation an operator turns on the DPS 100 which initially executes a GENESIS program included in the custoxized software system stored in EPROM. The GENESIS program is configured to (1) define system "constants" for the customized software system; (2) define various Microprocessor Pascal TM -language "types"; (3) define a set of system "common" (also known as system "global") parameters which are universally accessible; (4) list a series of external standard operating system procedures and functions which the custoxized software system will require during its execution; (5) list external procedures and functions which the custoxized software system will require during its execution; (6) define various bus-interfacing procedures and functions which facilitate the accessing and operation upon a system global variable herein referred to as SBUS; and, (7) define an initial execution sequence of procedure calls and start commands to initiate independent execution of a plurality of concurrent programs.

In the embodiment described herein each concurrent program can comprise one or more concurrent tasks, with each concurrent task comprising instructions coded in the Microprocessor Pascal TM language. Various ones of the concurrent tasks may suspend their own execution and be posted on an appropriate one of a plurality of semaphores. For example, if a concurrent task desires to suspend its execution until the machine cycle reaches a particular point, that concurrent task is placed on a semaphore which will be signaled in accordance with the machine cycle detection. Signaling of such a semaphcre is facilitated by a concurrent program MMONITOR which updates appropriate ones of the semaphores with indications of the machine cycle position status. When indications of the machine cycle position status. When the semaphore on which the suspended concurrent task is notified by the program MMONITOR that the particular point in the machine cycle has been reached, the selfsuspended task resumes its execution.

One of the concurrent programs which is independently executable by the DPS 100 is the concurrent program CW. Current program CW includes four I/O modes: (1) a PROGRAM mode wherein input information is associated with the processing stations; (2) a QUANTITY mode wherein the number of documents feed from a particular selected insert station is displayable; (3) a STATION mode wherein the per document weight at an input-requested insert station is displayable; and, (4) a TOTAL mode wherein the projected weight for a customer's stuffed envelope is calculated.

The concurrent program CW can enter its PROGRAM mode after the DPS has been turned (but prior to the start of the physical running of the insertion machine) by hitting the mode select key 144 on panel 140 a sufficient number of times to light up the "PROGRAM" LED mode display light 142D. Execution of the PROGRAM mode enables the operator to store in RAM memory in the data processing means 100 data pertinent to the per document weight at selected insert and envelope stations and to display indications of the same on the panel 140. The operator uses the feeder/station select pushbutton 148 to specify for which of the processing stations data is to be entered. Upon each depression of the pushbutton 148 a different station code is displayed on elements 146A and 146B. For example, upon hitting button 148 a first time the code "F1" is displayed in elements 146A and 146B. Code "F1" corresponds to the first feeder station (i.e. control station 42). Upon hitting button 148 a second time the code "1" is displayed in elements 146A and 146B. Code "1" corresponds to the first standard gripper station (i.e. insert station 52). Upon repeated hitting of button 148, the codes "2" (for station 53), "3" (for station 54), "4" (for station 55), "5" (for station 56), "6" (for station 57), "E" (for envelope station 50), "F1" (for station 42), "1" (for station 52), etc., are sequentially displayed.

While a station has its station code displayed on display elements 146A,146B during the PROGRAM mode of concurrent program CW, the per document weights for that station can be entered into RAM memory (and displayed on display elements 146C–146G) using the data entry keyboard 150. The key 150A is used to specify for which of the display digits 146C–146G data is being entered, e.g. the tenths ounce digit (corresponding to display element 146E), the hundredths ounce digits (corresponding to display element 146F), or the thousandths ounce digit (corresponding to display element 146G). Each display element 146 has included therein a special digit select indicator which is illuminated to indicate that the particular element has been selected by pushbutton 150. For example, upon the first depression of button 150 the digit select indicator associated with display element 146E indicates that element 146E is specified, upon the second depression of button 150 the digit select indicator associated with display element 146F indicates that element 146F is specified, and so on. Once one of the display digits 146E-146G is specified for a station, the contents of that digit can be decremented (using pushbutton 150B) or incremented (using pushbutton 150C) until the desired data value 0-9 is displayed for that station.

It is understood that inputting of data through keyboard 150 in this manner affects not only the values displayed on the elements 146C-146G but also determines the per document weight values stored in appropriate storage locations in RAM for the selected station. For example, with reference to FIG. 5A, the memory location at which the per document weight value for the control station 42 is stored is an address represented by reference numeral 389; the memory location at which the per document weight value for the insert station 52 is stored is an address represented by reference numeral 390; the memory location at which the per document weight value for the insert station 53 is stored is an address represented by reference numeral 391; the memory location at which the per document weight value for the insert station 54 is stored is an address represented by reference numeral 392; the memory location at which the per document weight value for the insert station 55 is stored is an address represented by reference numeral 393; the memory location at which the per document weight value for the insert station 56 is stored is an address represented by reference numeral 394; the memory location at which the per document weight value for the insert station 57 is stored is an address represented by reference numeral 395.

Thus, from the foregoing it is seen that during the PROGRAM mode of the concurrent program CW the operator can input or change the per document weight values for any or all of the stations 42, 52-57 and 50.

When the concurrent program CW is taken out of the PROGRAM mode by a further depression of the mode key 144, and before the operator is ready to begin the insert feeding, inserting (i.e. envelope stuffing), and exit stage processing operations, the operator has an opportunity if desired to accumulate the audit counters and timers for FRAME1. Accumulation of the audit counters for FRAME1 is generally desired upon the commencement of a new job or new batch of documents for which the operator desires to have a statistical report. Upon the pressing of the pushbutton 162A the audit counters and audit counters 365, 370, 375 and 380 for FRAME1 are added to corresponding audit counters and audit timers for FRAME2. After the accumulation the FRAME1 audit counters and audit timers for addresses 360, 365, 370, 375, and 380 are set to zero. If button 162A is not pressed upon machine start up, the audit counters will continue to have stored therein the values that were current at the point in time at which the last machine stop occurred.

When the operator is ready to commence the feeding of inserts, envelope stuffing, and envelope exit stage processing, the operator commences start up by pressing an unillustrated START button on the machine control panel. Upon pressing of the START button the drive motor of the insertion machine is actively coupled to the rotating shafts discussed above, including the incrementing rotating shafts which serve to advance the insert track indexing chain 30 and the envelope track indexing chain 48. Moreover, upon the pressing of the START button a determination is made whether FRAME1 accumulate pushbutton 162A has just been pressed. If accumulate pushbutton 162A has been pressed in connection with this machine start, the current calendar time expressed by the calendar timer chip is loaded into the address 360 and becomes the last referenced calendar time (the audit timers for addresses 365, 370, 375, and 380 having already been zeroed). If the accumulate pushbutton 162A has not been pressed in connection with this machine start, the last referenced calendar time stored at address 360 is subtracted from the current calendar time expressed by the calendar timer chip. The subtraction results are added to the contents of address 365 (the fault or idle time for FRAME1). After the subtraction the current calendar time is loaded into the address 360 and becomes the last referenced calendar time.

Upon physical start up of the insertion machine the control station 42 advances a web of documents; reads indicia on documents; cuts documents from the web; collects a related group of documents belonging to a customer; and, discharges the customer's related group onto the insert track 30. In this regard, the operation of control station 42 is understood from the already-incorporated U.S. patent application Ser. No. 707,124 filed Feb. 28, 1985 by David Taylor. Program instructions included in the concurrent tasks associated with the control station 42 supervise the counting of the number of customers processed by the control station 42 and of the number of documents cut from the web for each customer (i.e. the number of documents that will be fed from the control station for each customer) and, upon feeding of a customer's documents, stores the counts in respective global memory locations.

As a customer's documents are discharged onto insert track 30 by the control station 42, a record of information is loaded into SBUS for that customer. The loaded information for the customer is conceptualized as corresponding to a column in the FIG. 4 representation of SBUS. The loaded information is based at least partially upon indicia read with respect to that customer's documents, including read indicia indicative of which downstream insert stations are to feed if the respective stations are in a SELECT mode. In this regard, record elements (i.e. bit positions) 5 through 10 correspond to information indicative of whether the first through sixth standard insert stations (i.e. stations 52 through 57) are to feed inserts for the customer.

After a customer's documents are discharged onto insert track 30 and after a record corresponding to the customer has been loaded into an appropriate record position in SBUS, the concurrent program CW is signalled to begin execution of its CALCULATION mode for that customer. In particular, for the embodiment of FIG. 1, the CALCULATION mode portion of concurrent program is signalled for a customer at a relatively late point in the same machine cycle in which the customer's documents are discharged from control station 42 onto insert track 30. As a general rule the CALCULATION mode portion of the concurrent program CW is signalled for a customer at a late stage of the same machine cycle in which documents for that customer are fed onto the insert track 30 from the downstreammost reading insert station.

Figure 7C:
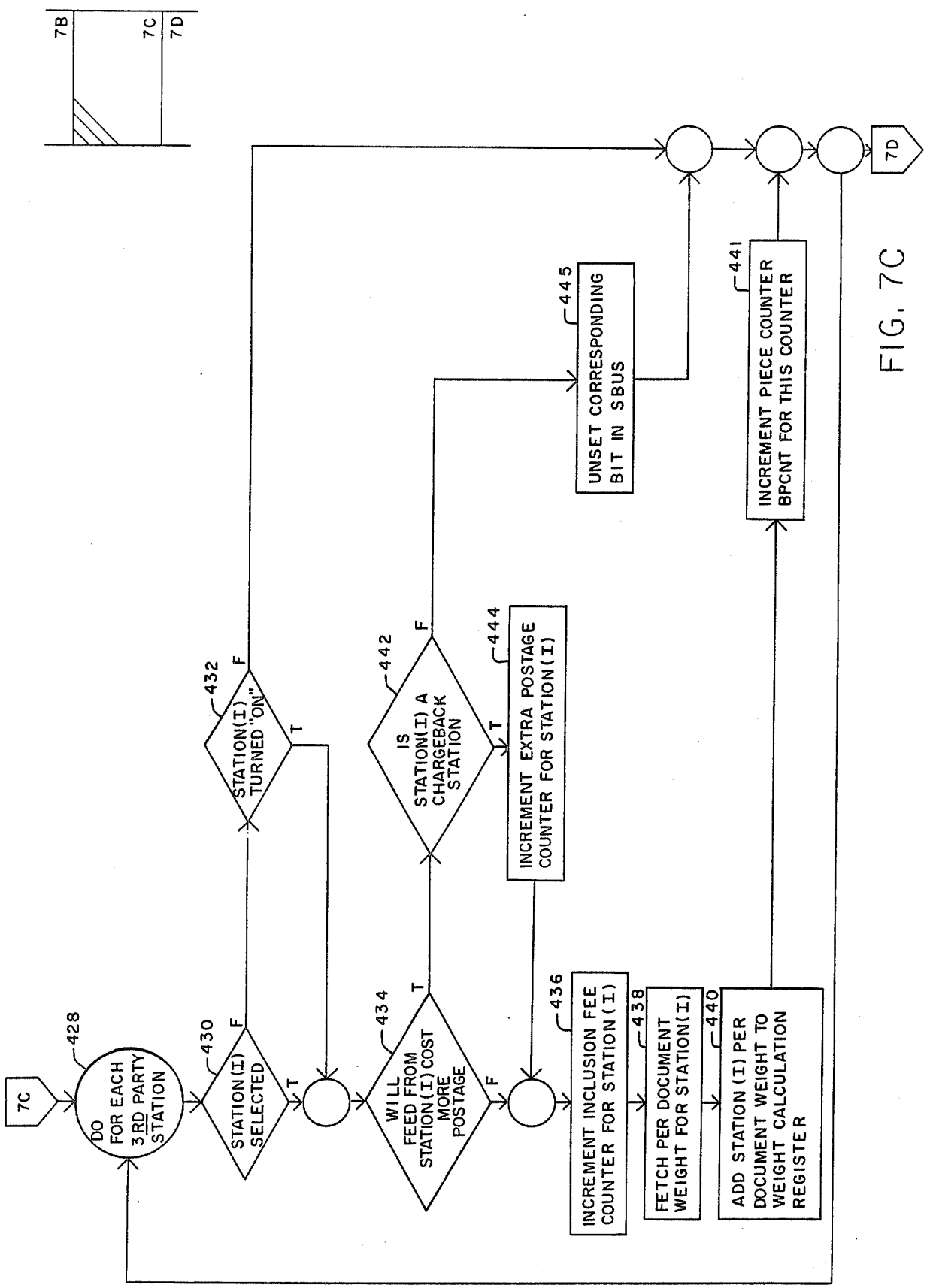
FIG. 7 is a schematic diagram showing the relationship of FIGS. 7A, 7B, 7C, and 7D FIGS. 7A, 7B, 7C, and 7D are schematic diagrams illustrating processing operations involved in a calculation made of a concurrent program CW for the embodiment of FIG. 1.
Figure 7D:
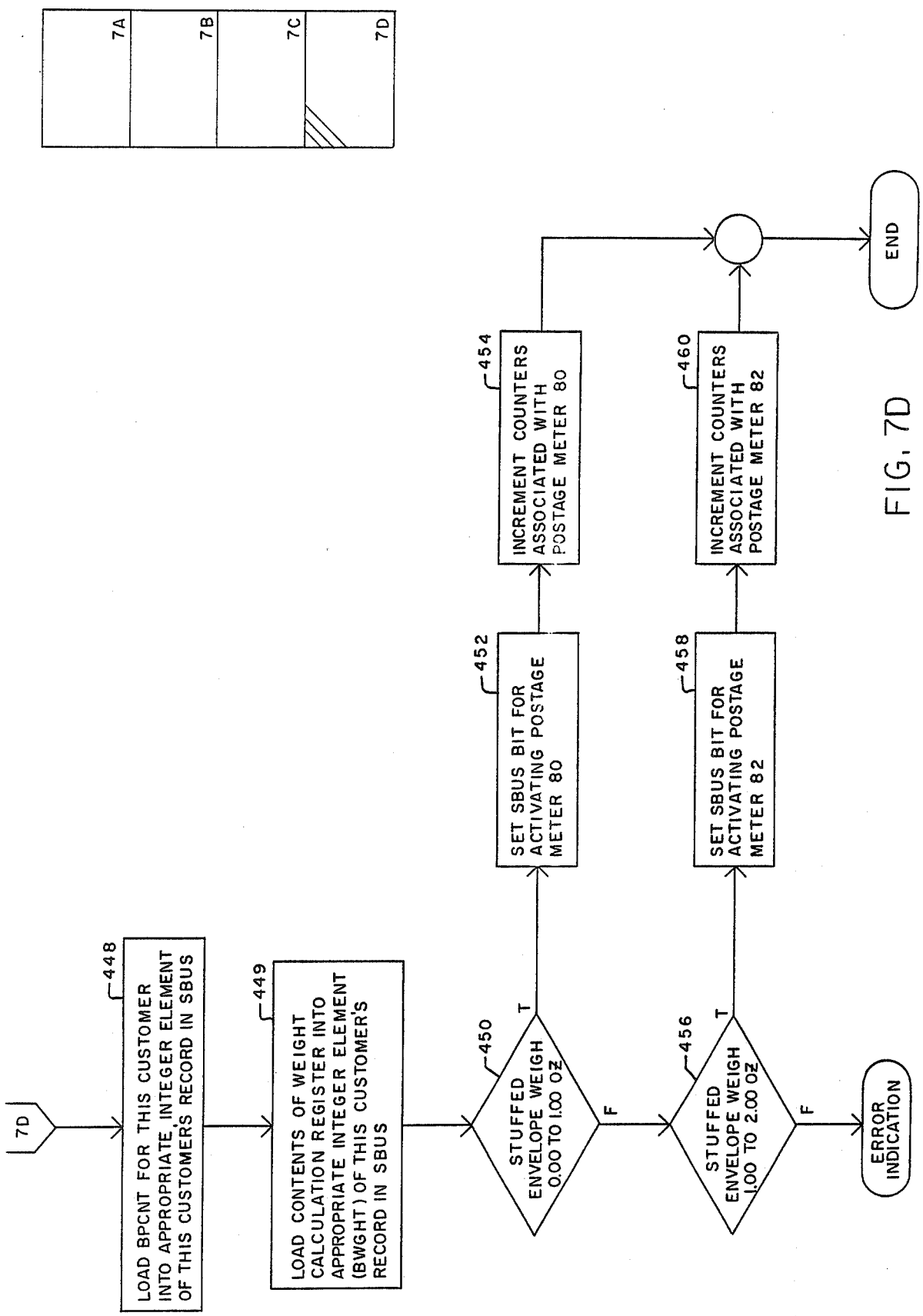

A portion of the processing conducted by the CALCULATION mode of concurrent program CW is shown in FIG. 7. In particular, the processing steps shown in FIG. 7 are executed for each customer at the appropriate time as described above. Processing begins for each customer by clearing a weight calculation register (step 400) which will be used to calculate a projected weight for the customer's stuffed envelope.

After the weight calculation register is clear, steps 401-406 are executed for a customer in connection with the control station 42. At step 401 the concurrent program CW fetches the per document weight for the control station 42 from location 389 in volatile RAM memory (see FIG. 5A). At step 402 concurrent program CW determines the number of documents fed for the customer from control station 42. In this respect, the number of documents fed for the customer is obtained from a global counter which is maintained by a concurrent task associated with the control station 42 (as, for example, concurrent task COUNT described in U.S. patent application Ser. No. 06/707,124 to Dave Taylor already incorporated herein). The number of documents fed for the customer from the control station 42 is added at step 403 to the audit counter which has address location 200 in the non-volatile memory (see FIG. 5) and at step 404 to a global piece counter BPCNT. Upon completion of concurrent program CW's CALCULATION mode for this customer the counter BPCNT will be used as a tally for the number of inserts which will ultimately be included in the customer's stuffed envelop.

Knowing the number of documents fed for this customer from the control station 42 and the per document weight, at step 405 the concurrent program CW multiples these two factors to obtain the total weight of the sub-group of documents fed from the control station 42. At step 406 the multiplication product is added to the weight calculation register.

A loop commencing at symbol 407 of FIG. 7 is executed a number of times corresponding to the number of non-third party advertising stations included in the insertion machine. In this regard, for the embodiment of FIG. 1 the loop commencing at symbol 407 is executed four times, each execution corresponding to one of the four insert stations 52 through 55.

During the loop which commences at symbol 407 a determination is first made (step 408) whether the station of interest for this execution of the loop (represented by the identifier STATION(1) in FIG. 7) was designated to be in a "OFF" mode during the program mode of the current program CW. If the station is "OFF", the station cannot feed under any circumstance and thus the processing jumps to the end of the loop (represented by symbol 411). If the station is not in the "OFF" mode, a determination is then made (step 409) whether the station is in the "ON" mode and thus required to feed regardless of indicia. If a station is not determined to be in the "ON" mode at step 409, the station is in the "SFLECT" mode and the particular indicia read for this customer at the control station 42 becomes important. When a station is in the "SELECT" mode the concurrent program CW at step 410 accesses SBUS to determine whether or not the "select" bit corresponding to the station of interest for this execution of the loop has been set (indicating that this station is selected to feed). For example, with reference to the execution of the loop for insert station 52 the fifth bit of the customer's record in SBUS is consulted as an indication of indicia select determination; with reference to the execution of the loop for insert station 53 the sixth bit of the customer's record in SBUS is consulted as an indication of indicia select determination; and so forth. If the indicia indicates that the station has not been selected to feed, processing jumps to the end of the loop (represented by symbol 411).

Steps 412 through 416 are executed when the station of interest for this particular execution of loop 402 is either (1) in the "ON" mode, or (2) if the station is in the "SELECT" mode and the read indicia indicates that the station is to feed. In this regard, at step 412 the per document weight for the station is fetched from the appropriate memory location in which it was stored during the program mode of concurrent program CW. For example, in the execution of the loop for insert station 52 the contents of memory location 390 is fetched as the per document weight for station 52; in the execution of the loop for insert station 53 the contents of memory location 391 is fetched as the per document weight for station 53; and so on. After the per document weight for inserts at this station is so obtained, it is multiplied by the number of documents fed from the station (which in most cases will simply be one) (step 414). At step 416 the multiplication product is added to the weight calculation register to reflect the increase in the projected weight of the customer's stuffed envelope in anticipation of the station of interest for this execution of the loop feeding an insert document.

At step 417 a counter which counts the number of documents fed for the station of interest for this execution of the loop is incremented in accordance with the number of documents so fed. For the embodiment of FIG. 1, this particular counter corresponds to the appropriate one of the audit counters represented by addresses 210, 215, 220, or 225, depending upon which respective insert station 52, 53, 54, 55 is associated with this execution of the loop. At step 418 a global piece counter BPCNT is incremented for this customer in accordance with the number of feeds from the station of interest is used as a tally for the number of inserts which ultimately will be included in each customer's stuffed envelope.

Thus the loop bearing symbols 407 through 411 as shown in FIG. 7 is executed for each of the non-third party advertising stations (in the embodiment shown for stations 52, 53, 54, and 55). At the end of the last execution of this loop the weight calculation register will contain a value indicative of the sum of the weights of the documents expected to be fed from the control station 42 and from the non-third party advertising stations for this customer.

Steps 420, 422, and 424 as depicted in FIG. 7 involve the addition to the weight calculation register of a value representative of the weight of the envelope. In particular, at step 420 it is determined whether or not an envelope is to be fed for the customer. In this regard, if an envelope is to be fed, at step 422 the concurrent program CW fetches the envelope weight from the memory address 396 whereat a value indicative thereof was stored during the PROGRAM mode. The fetched envelope weight is (at step 424) added to the weight calculation register. In addition, at step 425 the contents of memory address 265 is incremented to update the counting of the number of envelopes fed.

Thus far the weight calculation register includes a sum representing the weight of the envelope and the weight of inserts fed from the control station 42 and from the non-third party advertising insert stations. In a loop commencing at symbol 428 the concurrent program CW determines which of the third party advertising stations are permitted to feed an insert and adds to the weight calculation register the weight of those inserts. The loop commencing at symbol 428 is executed for each of the third party advertising stations included in the overall insertion machine configuration. For the particular embodiment shown in FIG. 1, the loop commencing at symbol 428 is executed twice—once for third party advertising station 56 and once for third party advertising station 57.

Processing for the loop commencing at symbol 428 begins by determining whether the indicia for the customer indicates that the third party advertising station of interest for this execution of the loop has been selected (step 430). Whether the customer's indicia indicates that the station was selected is determined by accessing the appropriate bit in SBUS which corresponds to the station of interest for this execution of the loop. In this respect, for the execution of the loop for station 56 the ninth bit of the customer's record in SBUS is examined. For the execution of the loop for station 57 the tenth bit of the customer's record in SBUS is examined. If SBUS indicates that the station has been selected, or if it is determined (at step 432) that the station is in the "ON" mode, a determination is made (at step 434) whether the feeding of a third party advertising document from the station would increase the weight of the customer's stuffed envelope sufficiently to require additional postage.

If it is determined that a document can be fed from the third party station of interest for this execution of the loop without increasing the weight of the customer's stuffed envelope sufficiently to require greater postage, an inclusion fee counter for the station is incremented at step 436 to anticipate the permitted feed of the station and to provide a bookkeeping indication of the permitted feed so that the third party advertiser can appropriately be billed. If the feed from the station is permitted, the per document for documents fed from the station is fetched from the appropriate memory location such as address 394 or 395 (step 438) and the fetched weight for a document fed from this station is added to the weight calculation register (at step 440). Moreover, at step 441 the piece counter BPCNT for this customer is incremented to reflect the inclusion of the document fed from this station of interest.

If it is determined at step 434 that the feed of a third party advertising document from the station of interest for this execution of the loop would result in additional postage for the customer, a determination is made at step 442 whether the station of interest is a "charge back" station. In the situation where the "charge back" determination is affirmative, the third party advertiser has instructed that his insert be included despite the additional postage cost and has agreed to assume the additional postage cost occasioned by the inclusion of his insert. In the illustrated embodiment, only station 57 is designated a charge-back station. Accordingly, when the feeding of an insert from station 57 causes a customer's stuffed envelope to jump into a higher postage category, at step 444 an extra postage counter (the audit counter having address 240) is incremented for the charge back station. Thereafter steps 436, 438, 440, and 441 are executed for the charge back station.

If during the execution of the loop commencing at symbol 428 the determinations of steps 430 and 432 are both negative, the loop is concluded for that station. If the determination at step 442 is negative (i.e. the station is not a charge-back station), the bit in SBUS corresponding to the station of interest for that execution of the loop, having previously been set, is unset (step 445) inasmuch as it has been determined that the station cannot be permitted to feed.

Thus, at the end of the last execution of the loop commencing at symbol 428 the weight calculation register for the customer contains the projected calculated weight of the customer's stuffed envelope, including the weight of the envelope, the weight of the inserts added at the control station and the non-third party advertising stations, and the weight of the inserts added at the third-party advertising stations.

After execution of the loop commencing at symbol 428, steps 448 and 449 are performed in order to load appropriate information into SBUS. In particular, at step 448 the value in location BPCNT reflecting the total number of inserts fed with respect to this customer is loaded into the third integer element of the integer portion of the customer's record in SBUS. An integer value related to the value contained in the weight calculation register for this customer is loaded into the fourth integer element (element BWGHT) in the integer portion of this customer's record in SBUS (step 449).

Various other steps shown in the portion of the CALCULATION mode of concurrent program CW illustrated in FIG. 7 concern the setting of postage meter bits in SBUS and the incrementation of counters associated with the postage meters (such as postage meters 80 and 82 of FIG. 1). In this regard, at step 450 it is determined whether the value in the weight calculation register for this customer qualifies for the 0 to 1.00 ounce postage weight classification. If the value in the weight calculation register so qualifies, the appropriate bit in SBUS (i.e. bit 51) corresponding to the postage meter 80 is set (step 452), assuming postage meter 80 to be preset to apply the correct amount of postage for this weight classification. Further, the audit counter (at address 255) indicative of the number of envelopes metered by the first postage meter 80 is incremented (step 454). If the value in the weight calculation does not qualify the envelope for the 0 to 1.00 ounce postage weight classification, a check is made to determine (at step 456) whether the value in the weight calculation register corresponds to the 1.00+ to 2.00 ounce postage weight classification. If the determination is affirmative, the bit in SBUS corresponding to the second postage meter 78 (i.e., bit 52 of SBUS) is set (step 458). Also, the audit counter (at address 260) for the number of envelopes and metered by the second postage meter 82 is incremented (step 460), assuming the second postage meter 82 to be preset to apply the correct postage for this classification range. If the determination at step 456 is negative, depending upon the embodiment utilized the operator is either apprised of an error or the stuffed envelope will eventually be diverted.

With each revolution of disc 118 a pulse is created by virtue of the transmission of light through the slit 120 in disc 118. For each pulse an interrupt is applied to DPS 100 on line 132. Upon receipt of the machine cycle interrupt the concurrent program MMONITOR increments the memory location 380 whereat the machine cycle count for FRAME1 is maintained.

Figure 8:
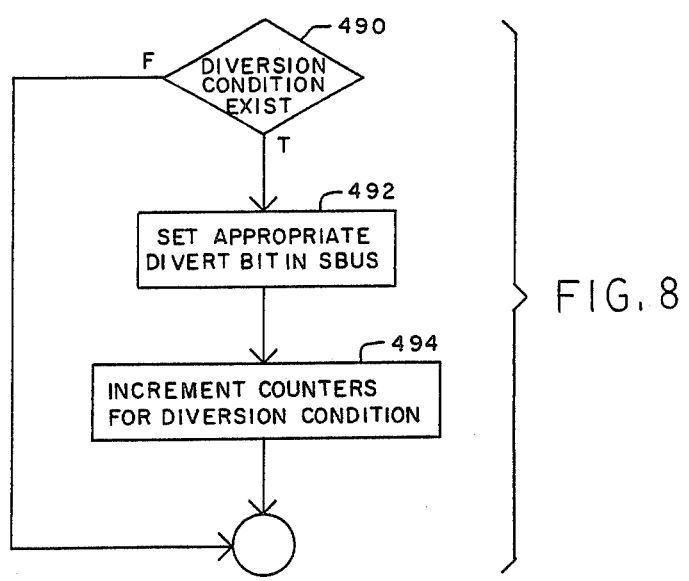
FIG. 8 is a schematic diagram showing logic steps involved in a diversion determination and report according to the embodiment of FIG. 1.

At various points in the processing it may be determined that a customer's envelope should be diverted (for any one of a plurality of operator predetermined reasons) rather than be metered. A determination to divert a customer's envelope can be made at several points in the overall process; hence, several concurrent programs include logic steps which can be executed in the event that a diversion is necessary. Logic steps involved in the diversion determination are shown in FIG. 8. Whenever it is determined at one of the processing stations that a customer's stuffed envelope should be diverted due to the occurrence of a specified condition (such as at step 490), a bit corresponding to the diversion gate associated with the specified condition is set in SBUS (step 492). In connection with the setting of the diversion bit in SBUS, an audit counter associated with that particular diversion gate is also incremented (step 494). For example, for diverter 76 the audit counter at address location 245 in non-volatile memory (see FIG. 5) is incremented.

Figure 9:
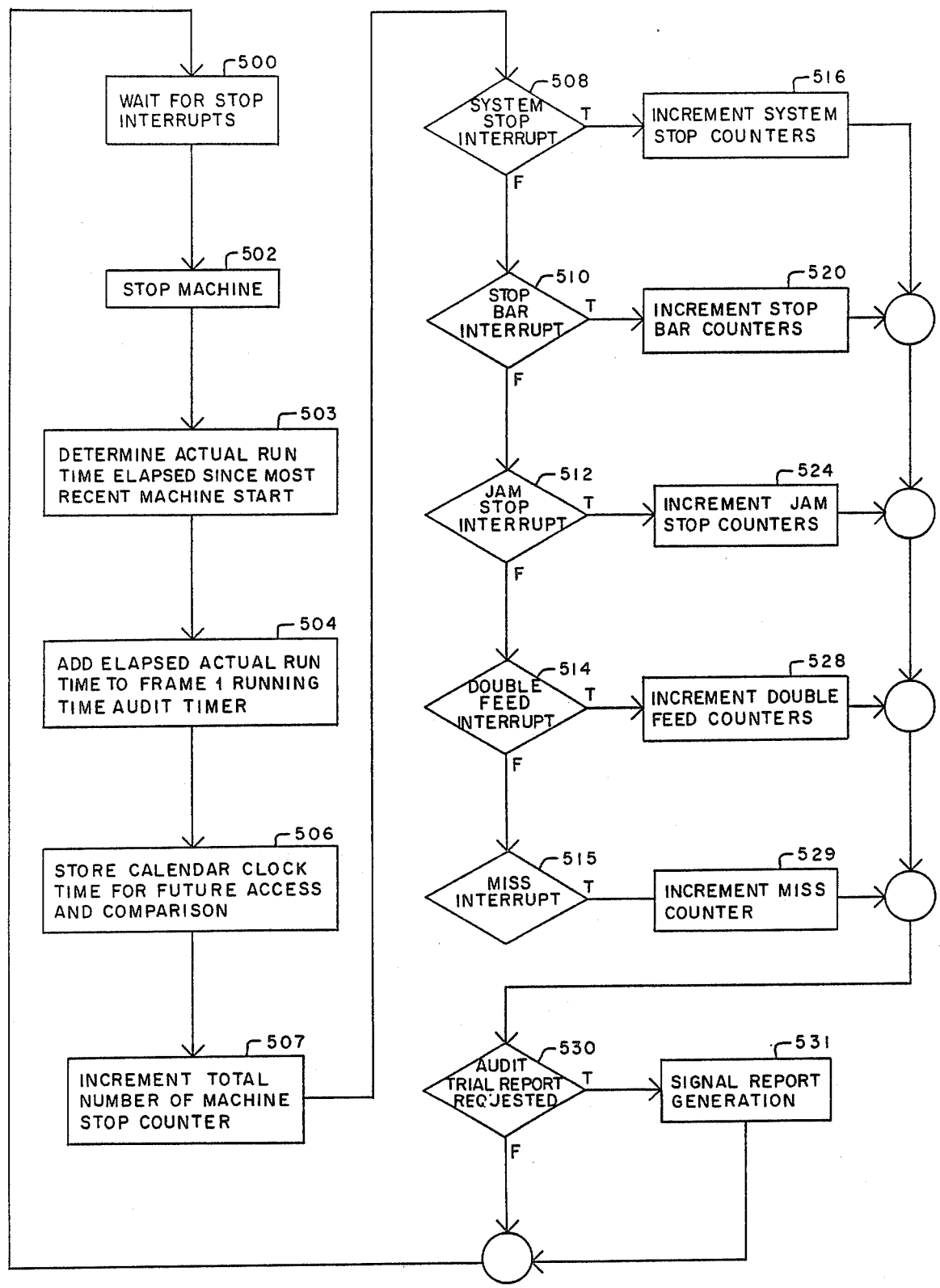
FIG. 9 is a schematic diagram illustrating processing operations involved in a concurrent program STOP INTERRUPT for the embodiment of FIG. 2.

Concurrent program STOP INTERRUPT is poised to be signalled when a stop interrupt is communicated to DPS 100. Five possible types of stops have been described hereinbefore: (1) the system stop; (2) the stop bar stop; (3) the jam stop; and, (4) the miss stop; and, (5) the double feed stop. Processing operations executed upon the occurrence of a stop interrupt are shown in FIG. 9. The receipt of a stop interrupt stops the insertion machine by disengaging the rotating shafts from the machine motor (step 502). Further, the concurrent program STOP INTERRUPT determines (at step 503) how long the machine has actually been running since its most recent start up by subtracting the value in location 360 from the value had by the calendar clock chip when the machine stopped) and adds the determined value to memory location 370 (step 504). Moreover, the calendar clock time at which the stop occurred is stored (step 506) in non-volatile location 360 as the last referenced calendar time for access and subsequent comparison upon subsequent start up.

At step 507 the concurrent program STOP INTERRUPT increments the total number of machine stops audit counter (i.e. memory location 270). The concurrent program STOP INTERRUPT also counts the occurrences of the various types of stops. The type of interrupt which occasioned the stop is determined (steps 508, 510, 512, 514, and 515) and appropriate counters are accordingly incremented (steps 516, 520, 524, 528, and 529).

Upon each stopping of the insertion machine the concurrent program STOP INTERRUPT checks (at step 530) to determine whether the operator has requested an audit trail printout. As described hereinbefore, an operator can request an audit trail printout by pressing the audit trail start button 160 located on the audit trail keyboard 157. If an audit trail printout has been requested, the concurrent program STOP INTERRUPT initiates (at step 531) the production of the printout by signalling the concurrent program REPORT GENERATION.

Figure 10:
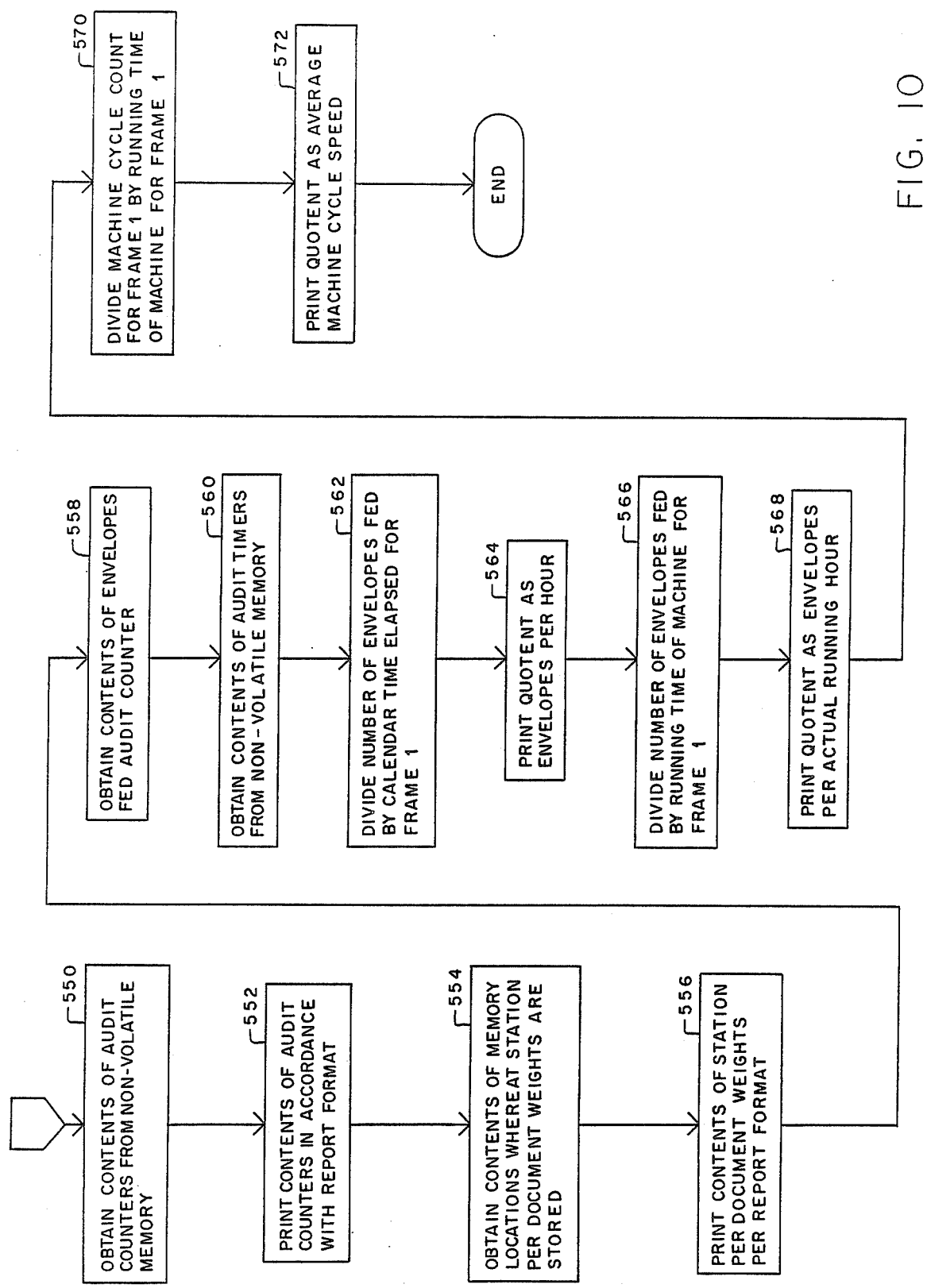
FIG. 10 is a schematic diagram showing processing operations involved in a concurrent program REPORT GENERATION for the embodiment of FIG. 1.

FIG. 10 shows processing steps conducted by the concurrent program REPORT GENERATION in the generation of an audit trail report such as that depicted in FIG. 11. At step 550 the concurrent program REPORT GENERATION obtains from non-volatile memory the contents of the audit counters in address locations 200-299 (see FIG. 5). At step 552 the contents of selected ones of these audit counters are printed in accordance with the desired format. For the report format shown in FIG. 11, five columns of data are provided—one column for each of the time frames FRAME1-FRAME5.

At step 554 the concurrent program REPORT GENERATION obtains from volatile RAM memory addresses 389-396 (see FIG. 5A) the per document weights for the stations 42, 52-57. At step 556 the per document weights for the stations are printed in accordance with the desired format.

At step 558 the contents of the envelopes fed audit counter (i.e. the audit counter having address location 365) is loaded into a register for subsequent use as a dividend. At step 560 the contents of the audit timers are obtained from address locations 370, 375, and 380 for use in subsequent division steps.

At step 562 the contents of the register containing the number of envelopes fed (from address 365) is divided by the calendar time elapsed for FRAME1 (from address 375), and the quotient is stored in location 386 (see FIG. 5A). At step 564 the contents of location 386 is printed as the average number of envelopes per hour.

At step 566 the contents of the register containing the number of envelopes fed (from address 365) is divided by the actual run time of the machine for FRAME1 (from address 370), and the quotient is stored in location 387. At step 568 the contents of location 387 is printed as the average number of envelopes per actual machine run hour.

At step 570 the contents of address location 380 (the machine cycle count for FRAME1) is divided by the contents of address location 370 (the actual run time of the machine for FRAME1), and the quotient is stored in location 385. At step 572 the contents of location 385 is printed as the average machine cycle speed.

Figure 12:
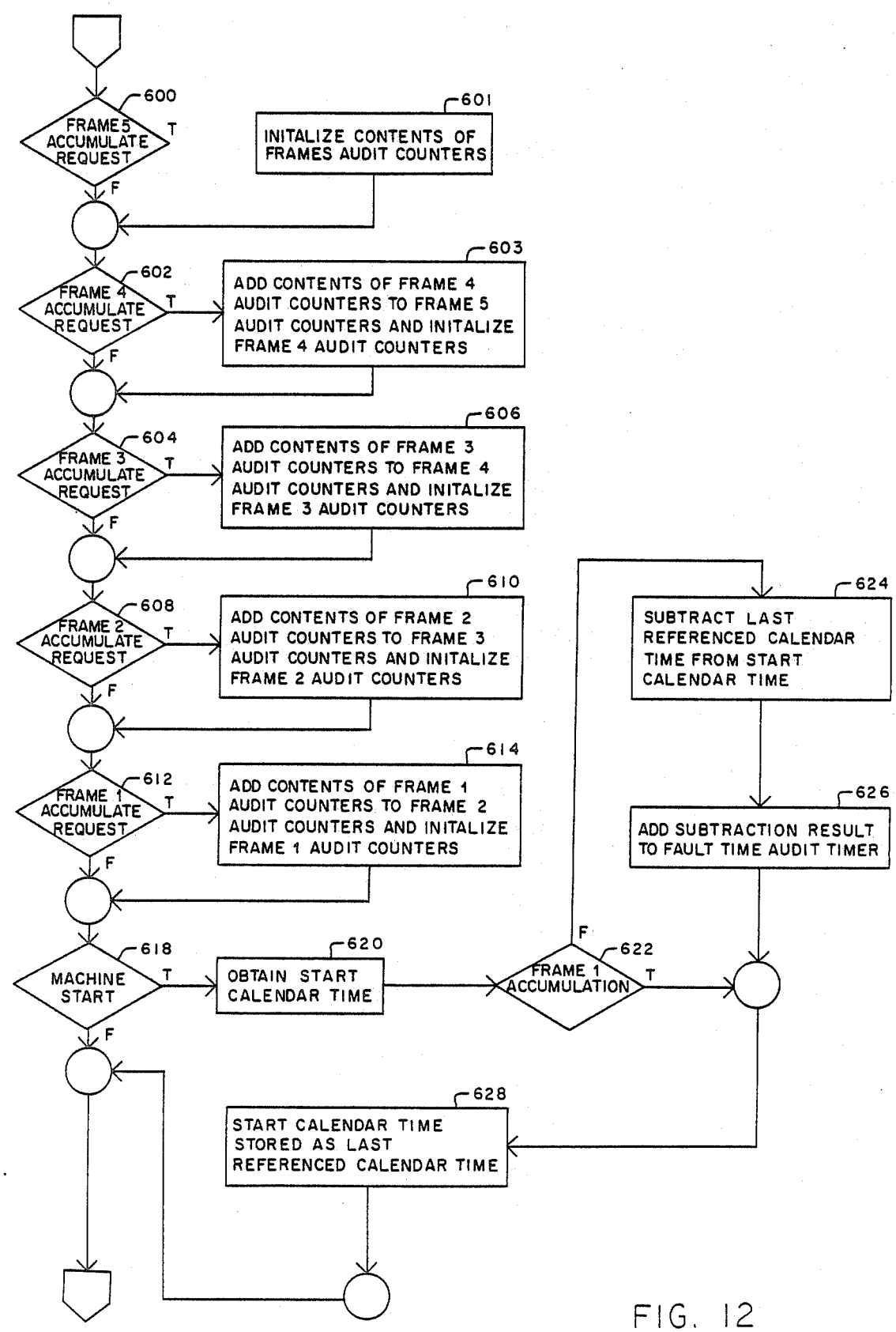
FIG. 12 is a schematic diagram illustrating processing steps involved in accumulating and updating audit counters and audit timers for the embodiment of FIG. 1.

When an operator desires to accumulate audit counters associated with a particular time base, steps such as those depicted in FIG. 12 are executed. Upon receipt of an interrupt from one of the accumulate request keys 162 on the audit trail keyboard 157, a determination is made (steps 600, 602, 604, 608, and 612) as to which accumulation request key 162 was pressed. If it is determined at step 600 that accumulation request key 162E was pressed for FRAME5, the audit counters for FRAME5 (see FIG. 5) are initialized (step 601). If it is determined at steps 602, 604, 608, or 612 that an accumulation request key was pressed with respect to respective time frames FRAME4, FRAME3, FRAME2, or FRAME1, the contents of the audit counters associated with the selected time frame are added to the contents of the corresponding audit counters for the next higher order time frame (see steps 603, 606, 610, and 614). Also the audit counter associated with the selected time frame is initialized.

When it is determined (at step 618) that the insertion machine has been instructed to start running, the calendar timer chip is consulted (step 620) and a start calendar time is accordingly obtained. A determination is also made (at step 622) whether an accumulation has just been requested for FRAME1. If a FRAME1 accumulation was requested, the last referenced calendar time (currently stored at address 360) is subtracted at step 624 from the newly-obtained start calendar time. The result of the subtraction is added at step 626 to the fault time audit timer (address 365). Thereafter, at step 628 the newly-acquired start calendar time is stored as the last referenced calendar time (i.e., in address 360). If a FRAME1 accumulation was not requested, step 628 is executed before further processing continues.

As described hereinbefore, an operator can request an audit printout by pressing the AUDIT TRAIL start button 160. Upon receipt of the AUDIT TRAIL printout the operator can use indications of various operating parameters in order to establish a preferred operating speed. In this respect, using the AUDIT TRAIL printout the operator can obtain the number of documents fed from the control station 42 (the "Feeder 1 Count") and the number of envelopes fed and thereby determine (by dividing the former by the latter) the average number of documents fed from the control station per customer (i.e., per group). Inasmuch as the AUDIT TRAIL printout also provides an indication of the average machine cycle speed, the operator can determine whether the average machine cycle speed is optimal in view of the average number of documents fed from the control station per customer and, if not, accordingly adjust the machine cycle speed (i.e. increase or decrease the machine cycle speed).

SECOND EMBODIMENT STRUCTURE

Figure 1A:
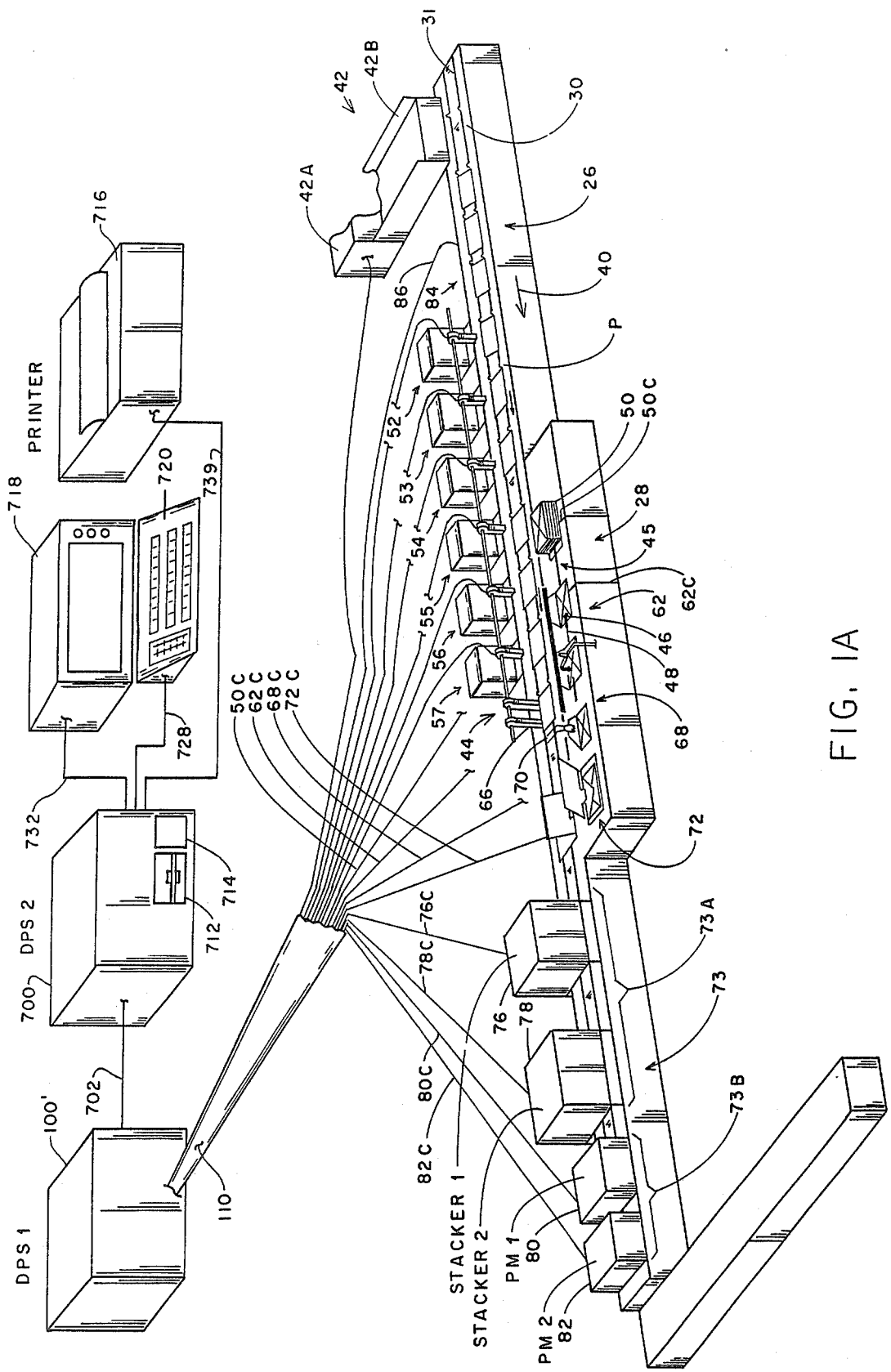
FIG. 1A is a perspective view of an insertion machine according to a second embodiment of the invention.

FIG. 1A illustrates an insertion machine according to a second embodiment of the invention. Except as may otherwise be noted herein, non-data processing structural aspects of the embodiment of FIG. 1A basically resemble and bear the same reference numerals as corresponding structures of the FIG. 1 embodiment. In the embodiment of FIG. 1A, a first data processing system (DPS1) 100', which corresponds to the DPS 100 of the embodiment of FIG. 1, is connected to a second data processing system (DPS2) 700 by a shielded, 37-conductor cable 702. It is hereinafter understood that the embodiment of FIG. 1A primarily differs from the embodiment of FIG. 1 by the addition of the DPS2 700 and various peripheral devices associated therewith; by the modification of the collection of concurrent programs executed by the DPS1 100' to reflect the addition of the DPS2 700; and, by the particular program and subroutines executed by the DPS2 700.

The DPS2 700 comprises a computer such as that marketed by International Business Machines, Inc. as model PCXT. It should be understood that other models, such as the PCAT, for example, are used in other embodiments, and that other types of computers can be used to carry out the functions of the DPS2 700.

Figure 13:
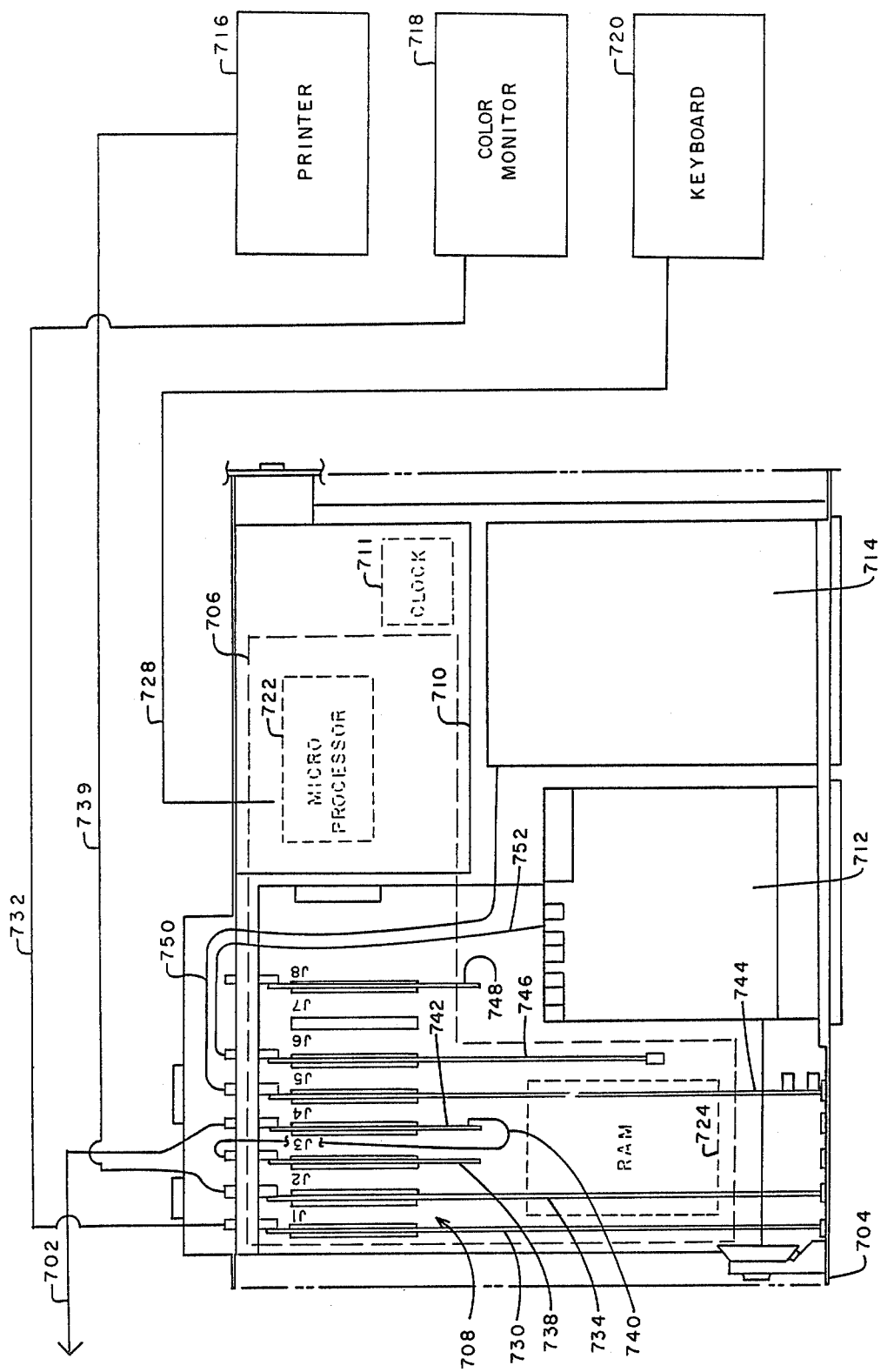
FIG. 13 is a schematic diagram illustrating a second data processing means and related peripheral devices associated with a collating machine serving as an insertion machine according to the embodiment of FIG. 1A.

As illustrated in FIG. 13, the DPS2 700 of the embodiment of FIG. 1A has a housing 704 wherein are located a motherboard (represented by broken lines 706) having a backplane region shown generally as 708; a power supply 710; a clock 711; first storage medium drive means (such as floppy disc drive 712); and, a second storage medium drive means (such as hard disc drive 714). As seen hereinafter, the DPS2 700 is connected to peripheral devices including a printer 716; a video display device such as a cathode ray tube (color monitor 718); and, a keyboard 720.

The configuration of the motherboard 706 and the backplane region 708 is understood by those skilled in the art. In this regard, the motherboard 706 has a microprocessor (shown by broken lines 722) and non-volatile RAM memory (shown generally by broken line 724) mounted thereon. The backplane region 708 comprises card slots J1 through J8. An I/O chip-connected trace on the motherboard 706 is connected by a cable 728 to the keyboard 720.

An enhanced graphics card 730 such as that marketed as Screenware Graphics Adapter by Computer Technology Corporation is mounted in slot J1. The enhanced graphics card 730 is connected via a suitable cable 732 to the monitor 718.

An expanded memory card 734 such as model AST6-PAK marketed by Quadram Corporation is mounted in slot J2. The expanded memory card 734 includes a non-volatile calendar clock.

An input/output (I/O) card 738 such as a 24 bit, parallel I/O card marketed by METRABYTE as model PI012 is mounted in card slot J3. I/O card 738 has a parallel printer interface which is connected by a cable 739 to the pointer 716. A terminal associated with card 738 is connected by a cable 740 to a terminal associated with an I/O interface card 740 mounted in slot J4.

The I/O interface card 740 mounted in slot J4 serves to convert voltage and current levels between the DPS1 100' and the DPS2 700. In this respect, voltage levels in the DPS1 100' (using a TI 9995 microprocessor) are CMOS, while voltage levels in the DPS2 700 are TTL. The shielded, 37-conductor cable 702 connects the I/O interface card with the I/O means comprising the DPS1 100'.

Other cards mounted in the backplane region 708 include a hard disc control card 744 in slot J5; a floppy disc control card 746 in slot J6; and, a communications card 748 in slot J8. Card 744 is connected to the hard disc drive 714 by a cable 750 while card 746 is connected to the floppy disc drive 712 by a cable 752.

As explained more fully hereinafter, the DPS1 100' and DPS2 700 communicate via cable 702 using a handshaking technique whereby the DPS1 100' (also known as the "95" in view of the TI 9995 microprocessor employed in one embodiment) sends 95-TO-PC COMMANDS to the DPS2 700 (also known as the "PC"), and whereby the DPS2 700 sends PC-TO-95 COMMANDS to the DPS1 100'. Each command is in the form of a plurality of bytes of information with the first byte of the command being a command number; and the second byte of the command being a value representative of the total number of bytes comprising the command; all but the last of the remaining bytes of the command being formatted to contain information according to pre-arranged specification which is related to the particular command number (see Charts 1 and 2); and, the last byte of the command containing a checksum value. Thus, the format of each command is generally as follows:

byte 1—command number
byte 2—number of bytes (N)
byte 3—data 1
byte N—data N−2
byte N+1—checksum Some of the PC-TO-95 COMMANDS are used for downloading values for machine operating parameters. These downloading commands are generated essentially in response to user input via keyboard 720 as prompted by hereinafter-described appropriate displays on the monitor 718. In this regard a PC-TO-95 COMMAND 1 is used to download integer values which specify for each of as many as 16 possible standard gripper-type insert stations whether the stations is in the ON mode, OFF mode, SELECT mode, or SELECTIVE MERCHANDISING mode (i.e., contains third party advertising documents). A PC-TO-95 COMMAND 3 is used to download per item weight values for (1) envelopes at the envelope stations; (2) documents stored at each of as many as 16 possible standard gripper-type insert stations; and (3) long and short documents stored at each of as many as six possible system stations (i.e., feeder stations including reading stations which are not standard gripper-type stations). A PC-TO-95 COMMAND 4 is used to download values indicative of the maximum number of documents that are allowed to be fed from various insert processing stations. A PC-TO-95 COMMAND 5 is used to download indications regarding selected modes in which various system stations are to operate (for example, whether the system stations are to be operated in a READ, NON-READ, or OFF mode; and, if in a READ mode, whether a particular sub-mode and a MATCH mode are utilized). A PC-TO-95 COMMAND 7 is used to download timing information values indicative of machine cycle degree points including points (1) at which a system is to start feeding; (2) at which a collector is to deposit or dump its sub-group of documents onto the insert track; (3) at which an OVERRIDE mode can be entered. A PC-TO-95 COMMAND 12 is used to download values indicative of a plurality of miscellaneous switch settings such as, for example, (1) a switch which controls the enablement of a package sealing station; and (2) a switch which determines whether a demand feed is to occur upon the presence or absence of a mark in a particular location in an indicia field on a control document.

Under normal insertion machine operation conditions some of the PC-TO-95 COMMANDS are used to interrogate the DPS1 100' for obtaining therefrom machine-related output data. These interrogating commands are also generated in response to user input via the keyboard 720 as prompted by appropriate hereinafter-described displays on the monitor 718. In this regard, a PC-TO-95 COMMAND 9 requests the DPS1 100' to provide output data relative to a group of documents situated at a specified track location on the insert track. A PC-TO-95 COMMAND 10 requests the DPS1 100' to provide output data relative to a particular specified modular device (such as a cutter, a burster, an accumulator, or a collector) at a specified modular station.

At least one of the 95-TO-PC COMMANDS is used to respond to a PC-TO-95 COMMAND which is of the interrogatory type. In this regard, a 95-TO-PC COMMAND 9 is used to provide the output data (relative to a particular modular device) sought by a PC-TO-95 COMMAND 10.

Some of the 95-TO-PC COMMANDS are generated once every machine cycle. In this regard, the 95-TO-PC COMMAND 1 provides output data relative to the group of documents at two specified track locations, as well as output data relative to (1) whether each of as many as 16 possible standard gripper-type stations fed a document during the current machine cycle; and (2) the number of documents fed from each of as many as six possible reading or system stations during the current machine cycle; and, (3) whether a chargeback was triggered for each of as many as 16 possible standard gripper stations during the current machine cycle. The 95-TO-PC COMMAND 11 is generated possibly as frequently as once each machine cycle to provide output data reflecting whether each of as many as 16 possible standard gripper-type stations were allowed to feed a document during the machine cycle.

Various others of the 95-TO-PC COMMANDS are generated upon the occurrence of a particular condition in the insertion machine. In this regard, a 95-TO-PC COMMAND 2 is generated when the insertion machine stops (i.e. when the concurrent program MMONITOR indicates that machine running line 136 has gone from a low to a high). A 95-TO-PC COMMAND 3 is generated when an insertion machine fault (including such fault types as a read error and a parity error) has been detected. A 95-TO-PC COMMAND 4 is generated to acknowledge that an operator has corrected a condition that prompted the generation of a 95-TO-PC COMMAND 3. A 95-TO-PC COMMAND 12 is generated when the DPS1 100' is powered up; a 95-TO-PC COMMAND 13 is generated when the DPS1 100' crashes. A 95-TO-PC COMMAND 14 is generated every ⅛ second when the insertion machine is not running and provides output data relative to a group of documents at specified insert track location.

Two 95-TO-PC Commands concern an OVERRIDE condition that can occur in the insertion machine. The OVERRIDE condition is entered when it is determined that a system station, some types of which can feed a plurality of documents per machine cycle, requires more than one machine cycle in order to completely feed all documents associated with a group onto the insert track 30. In such a case the rotating main timing shaft and the intermittently rotating shaft are decoupled from the insertion machine motor, thereby permitting the insert track 30 to remain essentially stationary as long as is necessary for the system station to feed all related documents onto the insert track 30 at the location whereat the previously-fed documents belonging to the group are situated. The OVERRIDE condition occurs when a detector or reading device at a insert feeder station such as a control station detects an appropriate indication in indicia on a fed document. When the OVERRIDE condition is entered a 95-TO-PC COMMAND 5 is generated, when the OVERRIDE condition is exited a 95-TO-PC COMMAND 6 is generated.

Two 95-TO-PC COMMANDS concern a DEMAND FEED condition that can occur in the operation of the insertion machine. The DEMAND FEED condition is entered when it is determined that a reading gripper-type station, which feeds one document per machine cycle, requires another machine cycle in order to feed therefrom a second document to be associated with a group currently before the reading gripper station on the insert track 30. In such a case, while the machine's main timing shaft continues to rotate, the insert track is decoupled from its intermittently rotating drive shaft for one machine cycle, thereby permitting the insert track 30 to remain essentially stationary for another machine cycle so that the reading gripper station can feed another document onto the insert track 30 at the location whereat the group is situated. The DEMAND FEED condition occurs when a detector or reading device detects an appropriate indication in indicia on a fed document. Depending upon how a DEMAND FEED switch is set, the DEMAND FEED condition can be triggered upon the detected presence or absence of a mark in a predetermined position in an indicia field. When the DEMAND FEED condition is entered a 95-TO-PC COMMAND 7 is generated. When the DEMAND FEED condition is exited a 95-TO-PC COMMAND 8 is generated.

A 95-TO-PC COMMAND 10 is generated when an ALERT AND CLEAR condition is entered. An ALERT AND CLEAR condition occurs when the control station, which has been feeding documents included in a first job or batch, determines (as by indicia on a control card) that the next documents to be fed therefrom are to be included in a second job or batch. Upon the occurrence of the ALERT AND CLEAR condition the second batch of documents are held up at the control station while the last groups included in the first batch are indexed down the insert track 30. A PC-TO-95 COMMND is generated by the DPS2 700 when an ALERT AND CLEAR RESET condition is entered.

The format of the commands 95-TO-PC COMMANDS 1-15 and PC-TO-95 COMMANDS 1-12 is understood with reference to the following charts:

CHART 1 95-TO-PC COMMANDS

COMMAND 1 - Process bus and status data
| | |
|---|---|
| command no. | 1 |
| number of bytes | 44 |
| data 1 | bus track location |
| data 2 | bus image for location specified at data 1 |
| — | |
| — | |
| — | |
| data 16 | |
| data 17 | bus image for last track location |
| — | |
| — | |
| — | |
| data 31 | |
| data 32 | status, stations env, gripper 1-16 |
| data 33 | status, gripper stations 7-14 |
| data 34 | status, gripper stations 15-16 |
| data 35 | piece count, feeder (system station) 1 |
| — | — |
| — | — |
| — | — |
| data 40 | piece count, feeder (system station) 6 |
| data 41 | chargeback status, stations 1-8 |
| data 42 | chargeback status, stations 9-16 |

COMMAND 2 - Stopped mode
| | |
|---|---|
| command no. | 2 |
| number of bytes | 2 |
| no data | |

Command 3 - Faulted Mode
| | |
|---|---|
| command no. | 3 |
| number of bytes | 13 |
| data 1 | fault type |
| data 2 | station id |
| data 3 | device id |
| data 4 | channel id (1 or 2) |
| data 5 | command 4 required (0=false, 1=true) |
| data 6,7 | (integer 1) |
| data 8,9 | (integer 2) |
| data 10, 11 | (integer 3) |

| Fault Type | Description | Fault Data |
|---|---|---|
| 1 | station-station mismatch | int 1 = track match data<br>int 2 = station match data<br>int 3 = error count |
| 2 | instation mismatch | int 1 = set match<br>int 2 = piece match data |
| 3 | "flashing mismatch" | int 1 = track match data<br>int 2 = station mach data |
| 4 | read error | |
| 5 | parity error | |
| 6 | alert & clear stop | |
| 7 | high count stop | int 1 = piece count |
| 8 | overweight stop | int 1 = weight |
| 9 | override timeout | |
| 10 | mode error | |

COMMAND 4 - Error acknowledge
| | |
|---|---|
| command no. | 4 |
| number of bytes | 5 |
| data 1 | fault type (see above) |
| data 2 | station id |
| data 3 | channel id |

Command 5 - Enter OVERRIDE
| | |
|---|---|
| command no. | 5 |
| number of bytes | 3 |
| data 1 | station id |

COMMAND 6 - Exit OVERRIDE
| | |
|---|---|
| command no. | 6 |
| number of bytes | 3 |
| data 1 | station id |

COMMAND 7 - Enter DEMAND FEED
| | |
|---|---|
| command no. | 7 |
| number of bytes | 3 |
| data 1 | station id |

COMMAND 8 - Exit DEMAND FEED
| | |
|---|---|
| command no. | 8 |
| number of bytes | 3 |
| data 1 | station id |

COMMAND 9 - Device Information
| | |
|---|---|
| command no. | 9 |
| number of bytes | 60 |
| data 1 | device command register image |
| — | — |
| — | — |
| — | — |
| data 56 | |
| data 57 | station id |
| data 58 | device id |

COMMAND 10 - Enter ALERT AND CLEAR State
| | |
|---|---|
| command no. | 10 |
| number of bytes | 3 |
| data 1 | station id |

COMMAND 11 - Station Control Switch Status
| | |
|---|---|
| command no. | 11 |
| number of bytes | 18 |
| data 1 | switch status, station 1 (0=ON, 1=OFF) |
| data 2 | switch status, station 2 |
| — | — |
| — | — |
| — | — |
| data 16 | switch status, station 16 |

COMMAND 12 - 9995 Powered Up
| | |
|---|---|
| command no. | 12 |
| number of bytes | 2 |
| no data | |

COMMAND 13 - 9995 Crashing
| | |
|---|---|
| command no. | 13 |
| number of bytes | 4 |
| data 1 | crash code |
| data 2 | reason code |

COMMAND 14 - Stopped Mode Bus Data
| | |
|---|---|
| command no. | 14 |
| number of bytes | 18 |
| data 1 | bus track location |
| data 2 | first byte of bus image for location specified at data 1 |
| — | — |
| — | — |
| — | — |
| data 16 | last byte of bus image |

COMMAND 15 - Feed Complete Information
| | |
|---|---|
| command no. | 15 |
| number of bytes | 6 |
| data 1 | station id |
| data 2 | device id |
| data 3 | channel |
| data 4 | status (0=false, 1=true) |

CHART 2: PC-TO-95 COMMANDS

COMMAND 1 - Download station control info
| | |
|---|---|
| command no. | 1 |
| number of bytes | 18 |
| data 1 | station 1 (1=OFF, 2=ON, 3=SELECT, 4=SELECTIVE MERCHANDISING) |
| data 2 | station 2 |
| — | — |
| — | — |
| — | — |
| data 16 | station id |

COMMAND 2 - Error Clear
| | |
|---|---|
| command no. | 2 |
| number of bytes | 3 |

-continued

| | |
|---|---|
| data 1 | fault type |
| COMMAND 3 - Download Weighing Info | |
| command no. | 3 |
| number of bytes | 60 |
| data 1,2 | envelope weight |
| data 3,4 | station 1 weight |
| — | — |
| — | — |
| data 33,34 | station 16 weight |
| data 35,36 | feeder 1 weight |
| — | — |
| data 45,46 | feeder 6 weight |
| data 47,48 | feeder 1 longcheck weight |
| — | — |
| data 57,58 | feeder 6 longcheck weight |
| COMMAND 4 - Download System Piece Counts (TWLs) | |
| command no. | 4 |
| number of bytes | 12 |
| data 1 | count 1 |
| data 2 | count 2 |
| — | — |
| — | — |
| data 10 | count 10 |
| COMMAND 5 - Download System Mode Info | |
| command no. | 5 |
| number of bytes | 5 |
| data 1 | system mode (4=READ, 2-NON-READ 1=OFF) |
| data 2 | system submode (1, 2, 4, 8, 16, etc.) |
| data 3 | match mode (0=OFF, 1=ON) |
| COMMAND 6 - System Clear Entered | |
| command no. | 6 |
| number of bytes | 2 |
| no data | |
| COMMAND 7 - Download Timing Info | |
| command no. | 7 |
| number of bytes | 5 |
| data 1 | feeder start time (degree/10) |
| data 2 | collector dump time (degree/10) |
| data 3 | override time (degree/10) |
| COMMAND 8 - Hard Fault Machine | |
| command no. | 8 |
| number of bytes | 2 |
| no data | |
| COMMAND 9 - Download Track Location (for display) | |
| command no. | 9 |
| number of bytes | 3 |
| data 1 | track location |
| COMMAND 10 - Download Modular Device id | |
| command no. | 10 |
| number of bytes | 4 |
| data 1 | station id |
| data 2 | device id |
| COMMAND 11 - Alert and Clear Reset Entered | |
| command no. | 11 |
| number of bytes | 2 |
| no data | |
| COMMAND 12 - Misc. Switch Status | |
| command no. | 12 |
| number of bytes | 12 |
| data 1 | switch 1 status |
| — | — |
| — | — |
| data 10 | switch 10 status |

In order to permit the DPS1 100' to generate the 95-TO-PC COMMANDS and to interpret and respond to the PC-TO-95 COMMANDS, the collection of concurrent programs executed by the DPS1 100' of the embodiment of FIG. 1A differs in several primary respects from the collection executed by the DPS 100 of the embodiment of FIG. 1. As a first difference, the collection executed by the DPS1 100' includes the additional concurrent process IBM—PC, and several concurrent processes (the most notable of which are PC—INT; PC—PERIOD; and PC—OPR).

Figure 15:
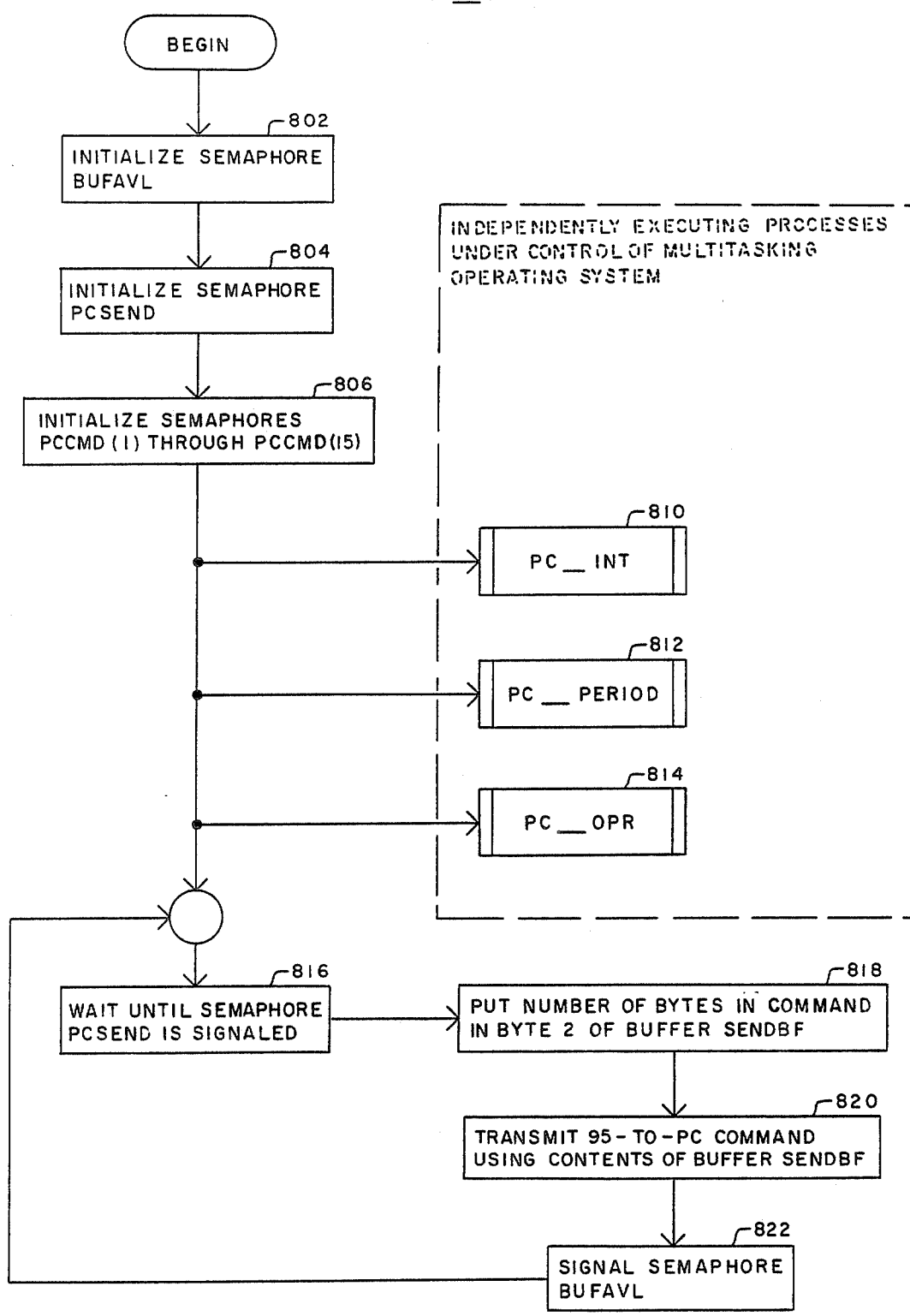
FIG. 15 is a schematic diagram illustrating execution operations associated with a concurrent program IBM_PC.
Figure 16:
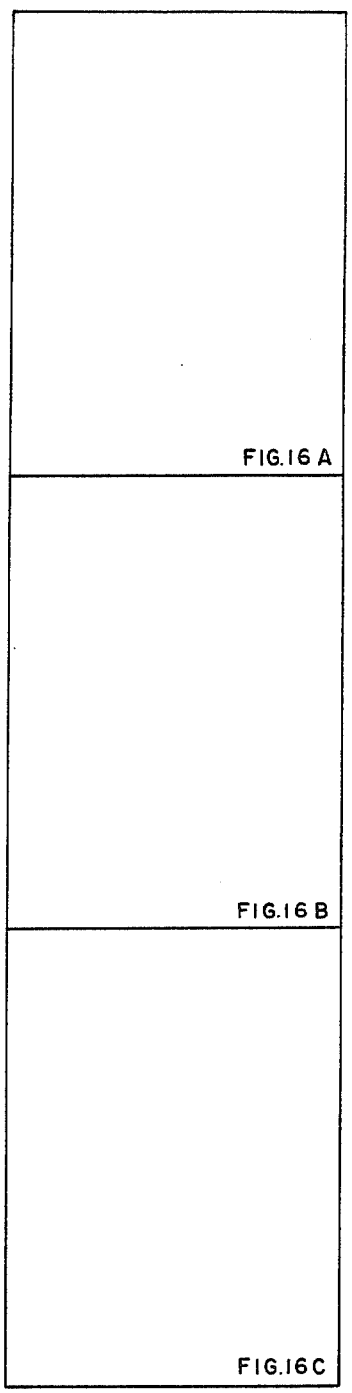
FIG. 16 is a schematic diagram illustrating the relationship or FIGS. 16A, 16B, and 16C.
Figure 16A:
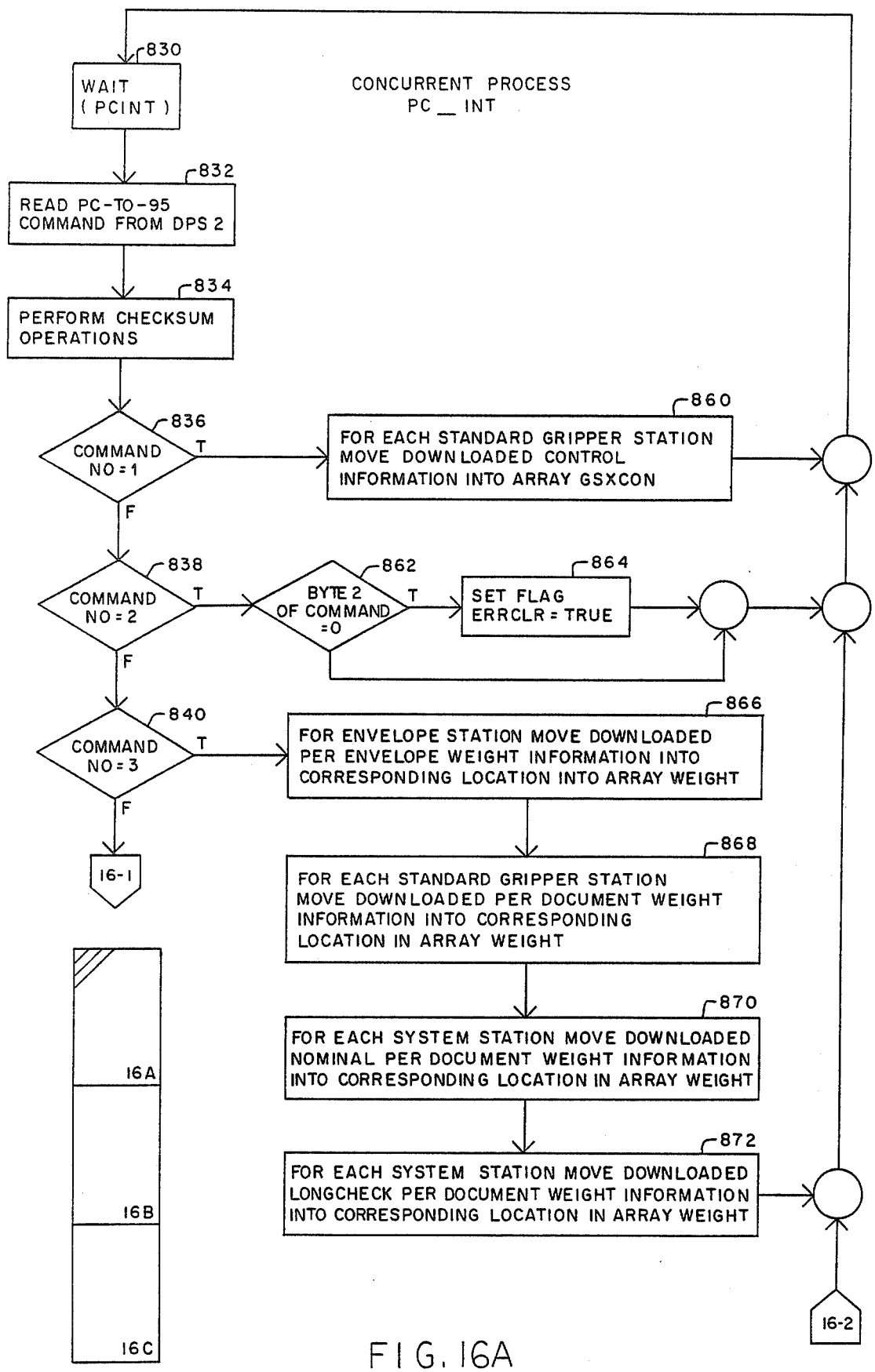
Figure 16B:
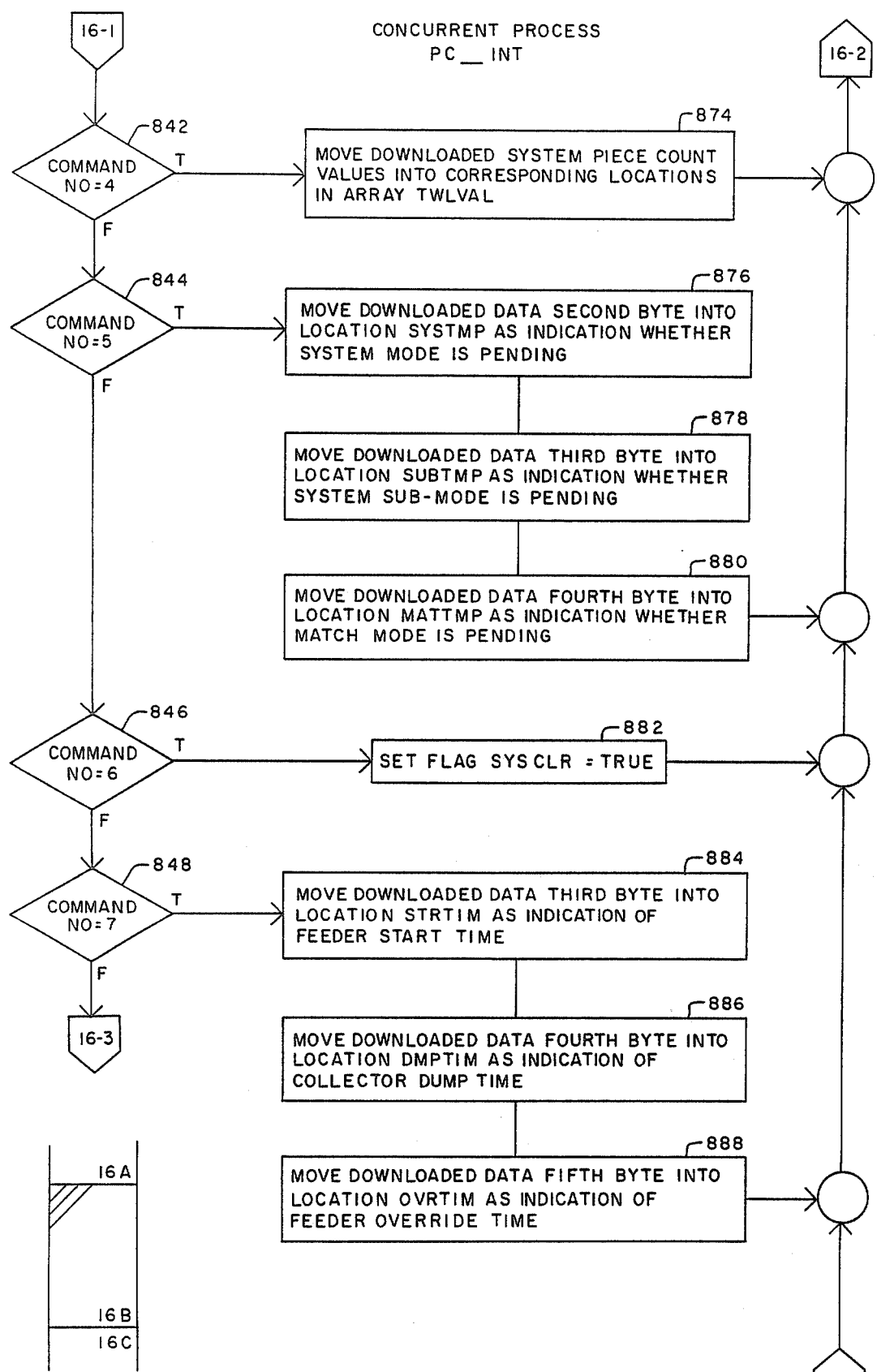

As seen hereinafter with respect to FIG. 15, concurrent process IBM—PC (including even-numbered execution steps 802-822) essentially initializes several semaphores (steps 802-806); starts the concurrent execution of the processes PC—INT; PC PERIOD; and PC—OPR (steps 810-814); and, transmits a 95-TO-PC command including data in an output buffer SENDBF when a semaphore PCSEND is signalled (step 820). As seen hereinafter with respect to FIG. 16, concurrent process PC—INT (including even-numbered execution steps 830-902) essentially manages the receipt and handling of the PC-TO-95 COMMANDS. As seen hereinafter with respect to FIG. 18, the concurrent process PC—PERIOD (including even-numbered execution steps 910-932) is used to generate various 95-TO-PC COMMANDS whose generation is dependent upon insertion machine timing. As seen hereinafter with respect to FIG. 17, the concurrent process PC—OPR (including even-numbered execution steps 940-980) is used to generate various other 95-TO-PC COMMANDS.

Figure 14:
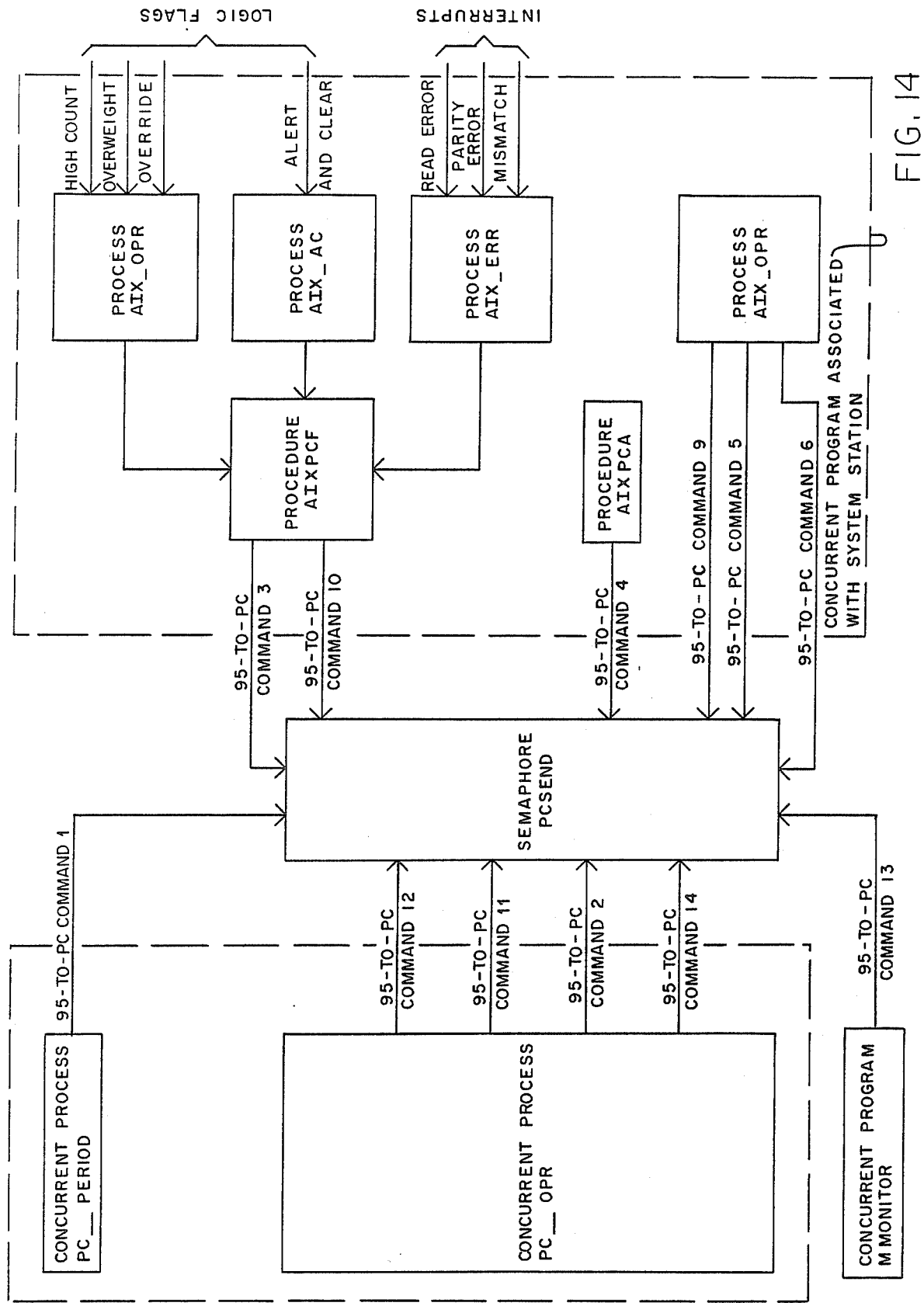
FIG. 14 is a schematic diagram showing various programs, processes, and procedures included in the customized software system for the embodiment of FIG. 1A which signal a semaphore PCSEND in connection with the generation of 95-TO-PC COMMANDS.

Upon the generation of their 95-TO-PC COMMANDS, the concurrent processes PC—PERIOD and PC—OPR, as well as other processes and procedures described herein, signal the semaphore PCSEND, thereby enabling program IBM—PC to transmit the 95-TO-PC COMMANDS to the DPS2 700. FIG. 14 shows the concurrent programs which signal the semaphore PCSEND in order to initiate transmission of 95-TO-PC COMMANDS and the particular 95-TO-PC COMMAND numbers associated therewith. It should be understood that in other embodiments the semaphore PCSEND is signalled by other concurrent programs. For example, although the FIG. 1A embodiment has only one system station (i.e. station 42), in other embodiments having a plurality of system stations each system station has associated therewith a concurrent program with procedures and concurrent processes which signal the semaphore PCSEND in like manner as that shown in FIG. 14. Likewise, in an embodiment having reading gripper stations, in connection with the DEMAND FEED mode a concurrent program associated with the reading gripper station signals the semaphore PCSEND in connection with the generation of 95-TO-PC COMMAND 7 and 95-TO-PC COMMAND 8.

A second difference in the collection of concurrent programs executed by the DPS1 100' of the embodiment of FIG. 1A as compared to the DPS 100 of the embodiment of FIG. 1 is the inclusion of additional instructions in the concurrent programs and processes associated with various processing stations at which processing events of interest occur. These additional instructions are essentially configured to load machine-related diagnostic data of interest into the output buffer SENDBF and to signal the semaphore PCMMD and PCSEND. Signalling the semaphore PCSEND enables the concurrent program IBM—PC to transmit an appropriate 95-TO-PC COMMAND as described above.

A third difference in the collection of concurrent programs executed by the DPS1 100' is the allocation of additional memory workspace locations in RAM memory for use in connection with the logic implemented as a result of the inclusion of additional concurrent programs and the inclusion of additional instructions to other concurrent programs. A chart of variable identifier names including names which corresponding to various RAM memory locations referenced in the ensuing discussion of operation follows as Chart 3.

| CHART 3 | |
|---|---|
| IDENTIFIER | USAGE/TYPE |
| ACREST | Alert and Clear Reset Entered - Boolean |
| CBCNTS | Chargeback Count - Array (32 elements) |
| DEVID | Modular Device Id - Integer |
| DMPTIM | Collector Dump Time - Integer |
| ERRCLR | All Errors Cleard by PC - Boolean |
| FDRCNT | Feeder Count of Documents Fed - Array (6 elements) |
| GSXCHG | Station Programmed Control Array Change Flag - Boolean |
| GSXCON | Station Program Control - Array (18 elements) |
| LASTTRAK | Last Track Positin on Insert Track - Integer |
| MATTMP | Match Mode Pending - Integer |
| OVRTIM | Feeder Override Time - Integer |
| RUNNIN | Machine Running Flag - Boolean |
| SENDBF | Command Output Buffer Array - (32 elements) |
| STAID | Station Id - Integer |
| STAT | Station Status Array - (12 elements) |
| STRTIM | Feeder Start Time - Integer |
| SUBTMP | System Sub-Mode Pending - Integer |
| SWVAL | Switch Values Array - (10 elements) |
| SYSTMP | System Mode Pending - Integer |
| TRKLOC | Selected Track Position on insert Track - Integer |
| TWLVAL | Station Piece Counts Array (10 elements) |
| WEIGHT | Station Weight - Array |

Figure 19:
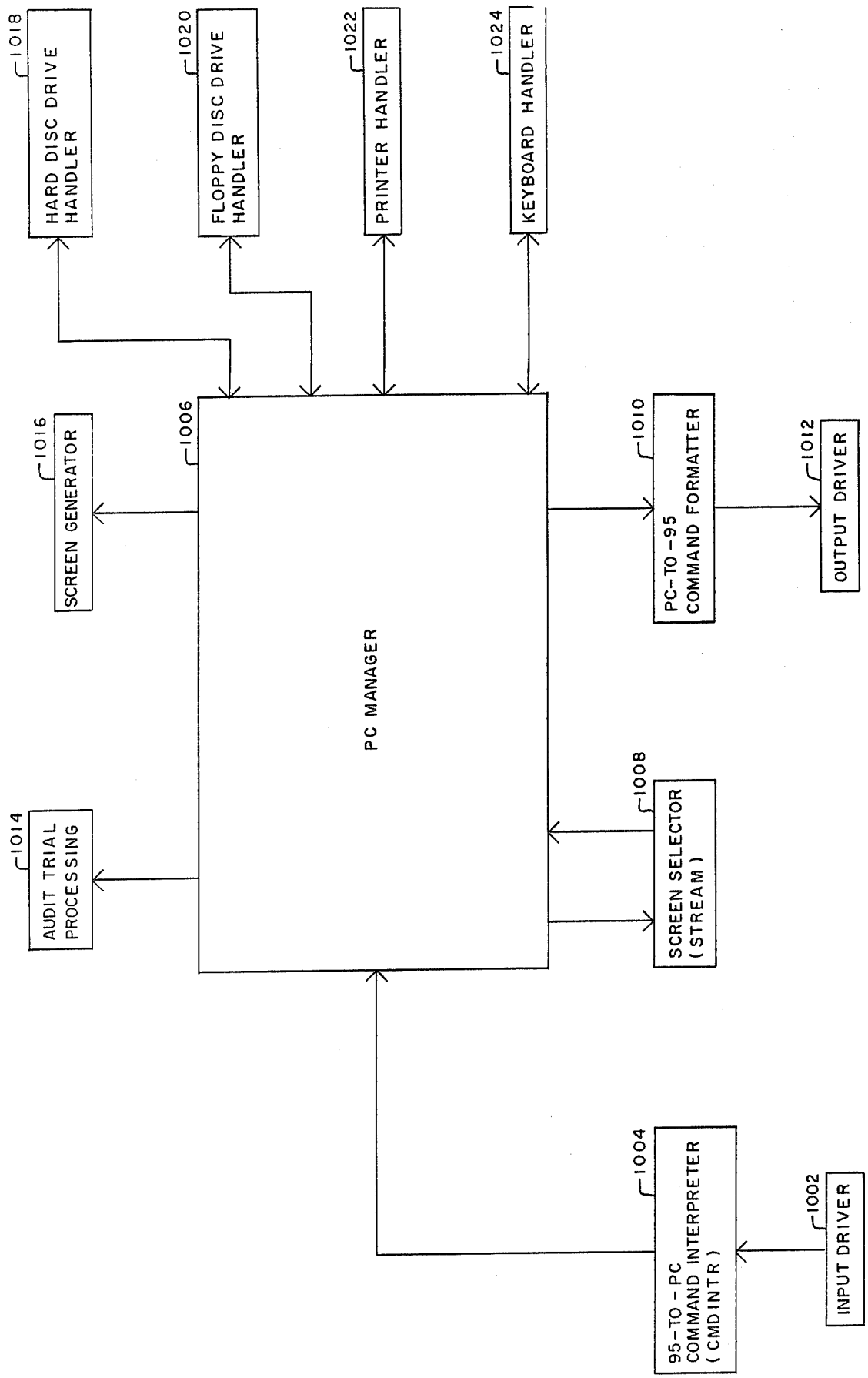
FIG. 19 is a schematic diagram illustrating the interrelationship between a program PC Manager and subroutines executed by the second data processing means of the embodiment of FIG. 1A.
Figure 20:
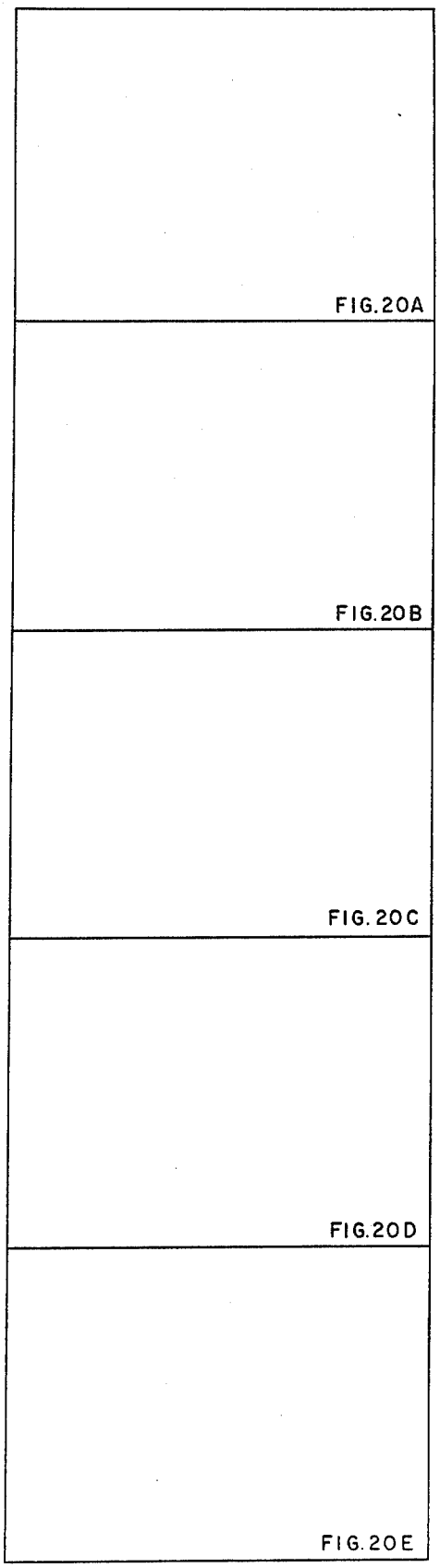
FIG. 20 is a schematic diagram illustrating the relationship of FIGS. 20A, 20B, 20C, and 20D.
Figure 20B:
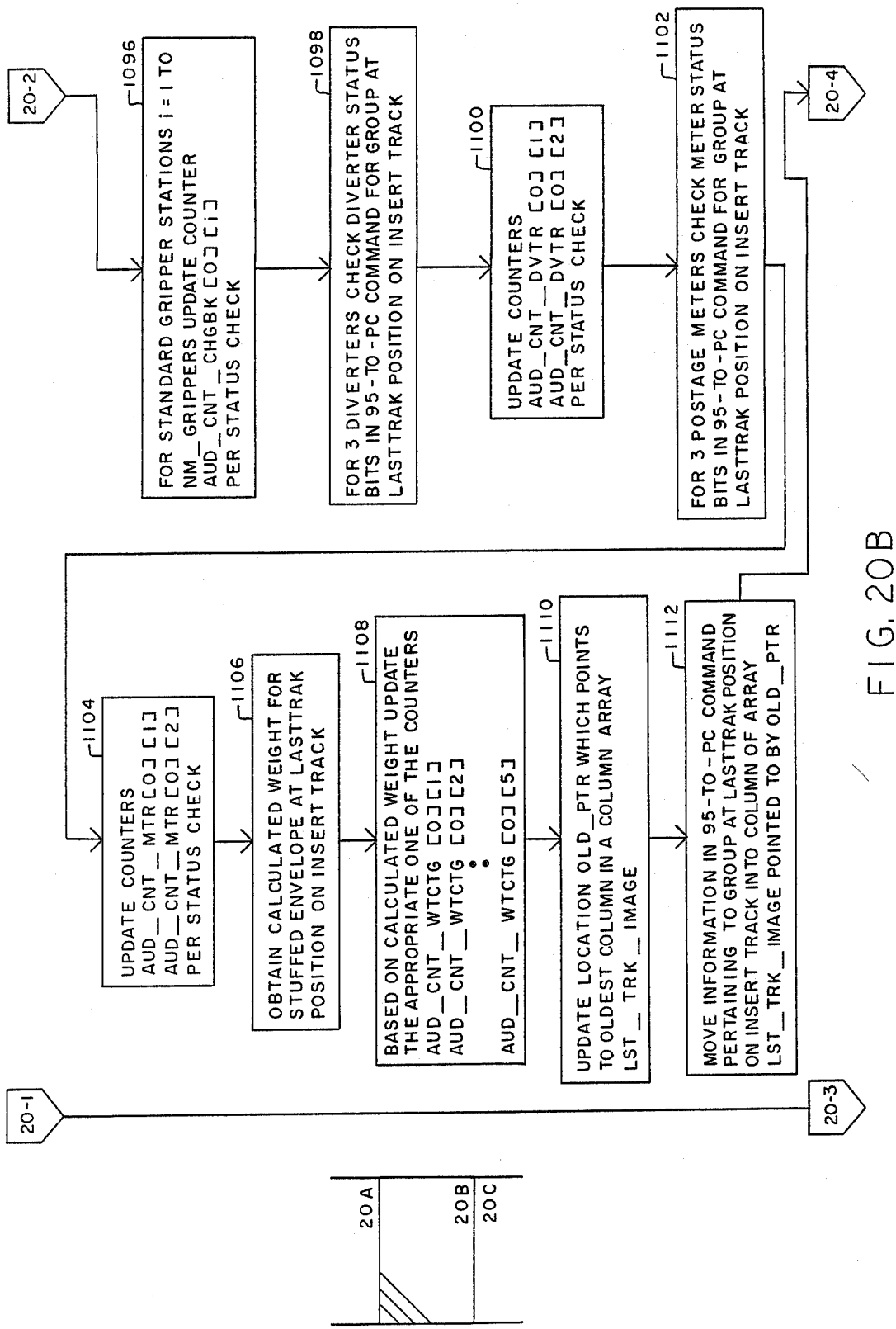
FIGS. 20A, 20B, 20C, and 20D are schematic diagrams illustrating execution operations associated with a subroutine CMDINTR of the embodiment of FIG. 1A.
Figure 20C:
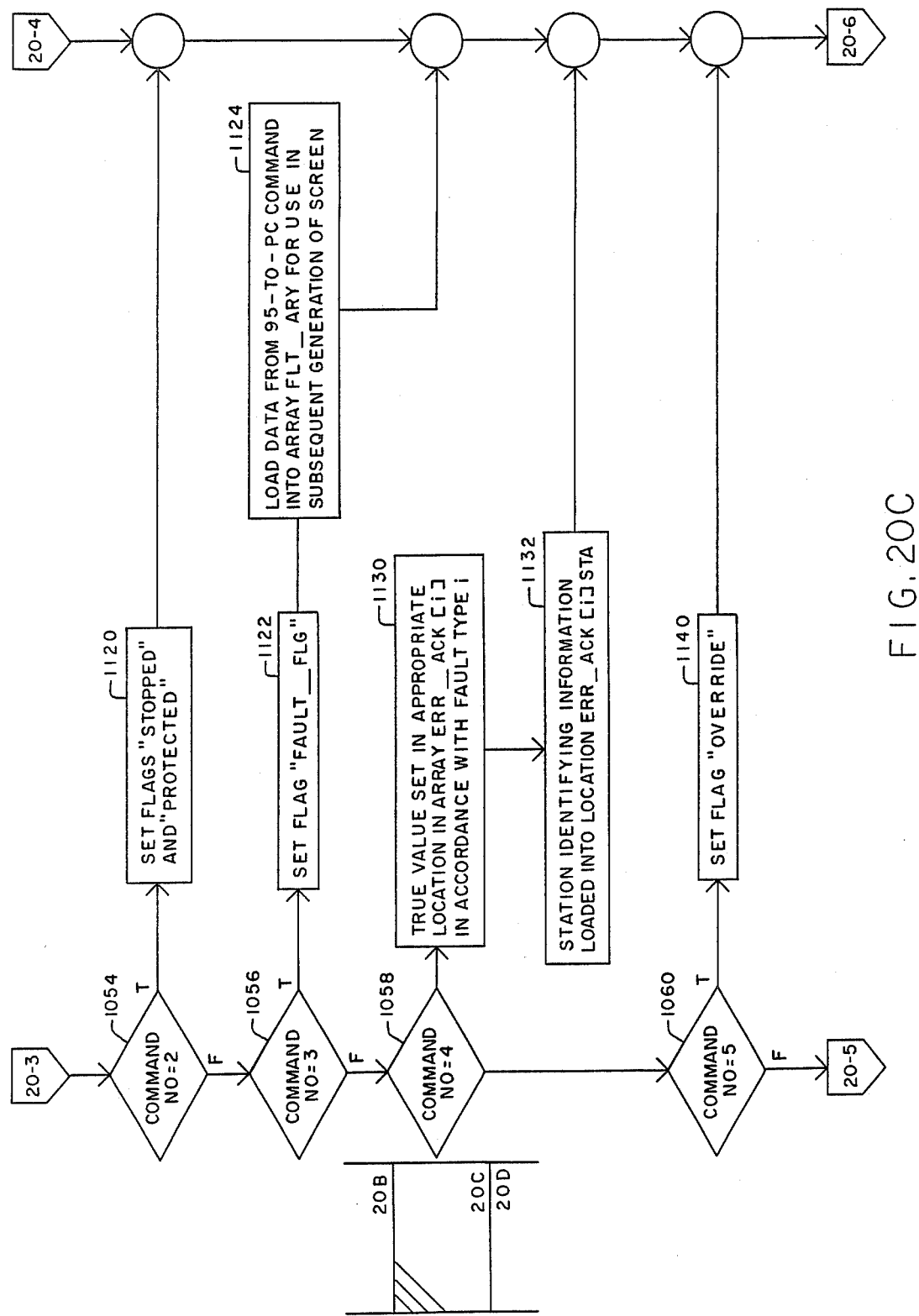
Figure 20D:
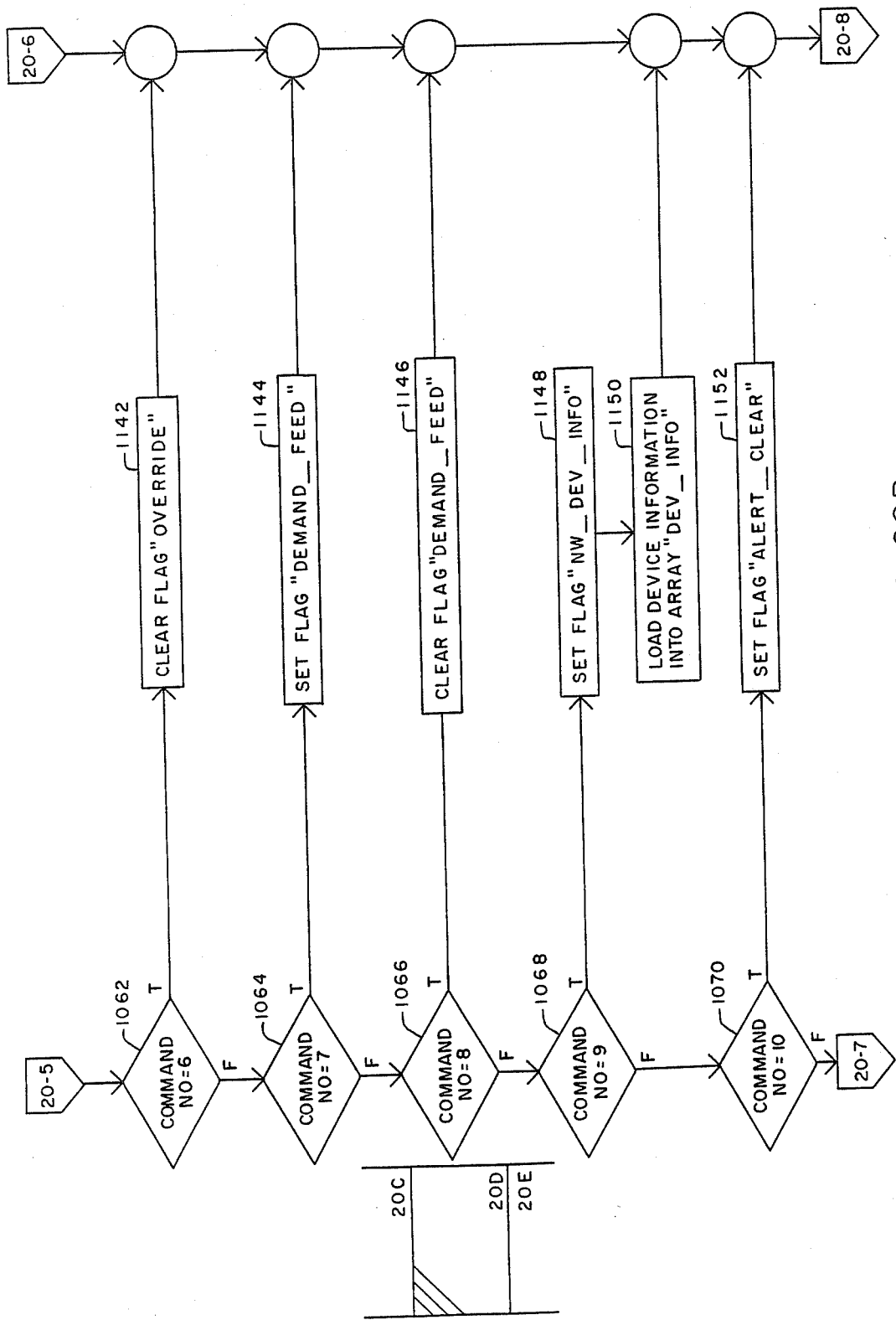
Figure 20E:
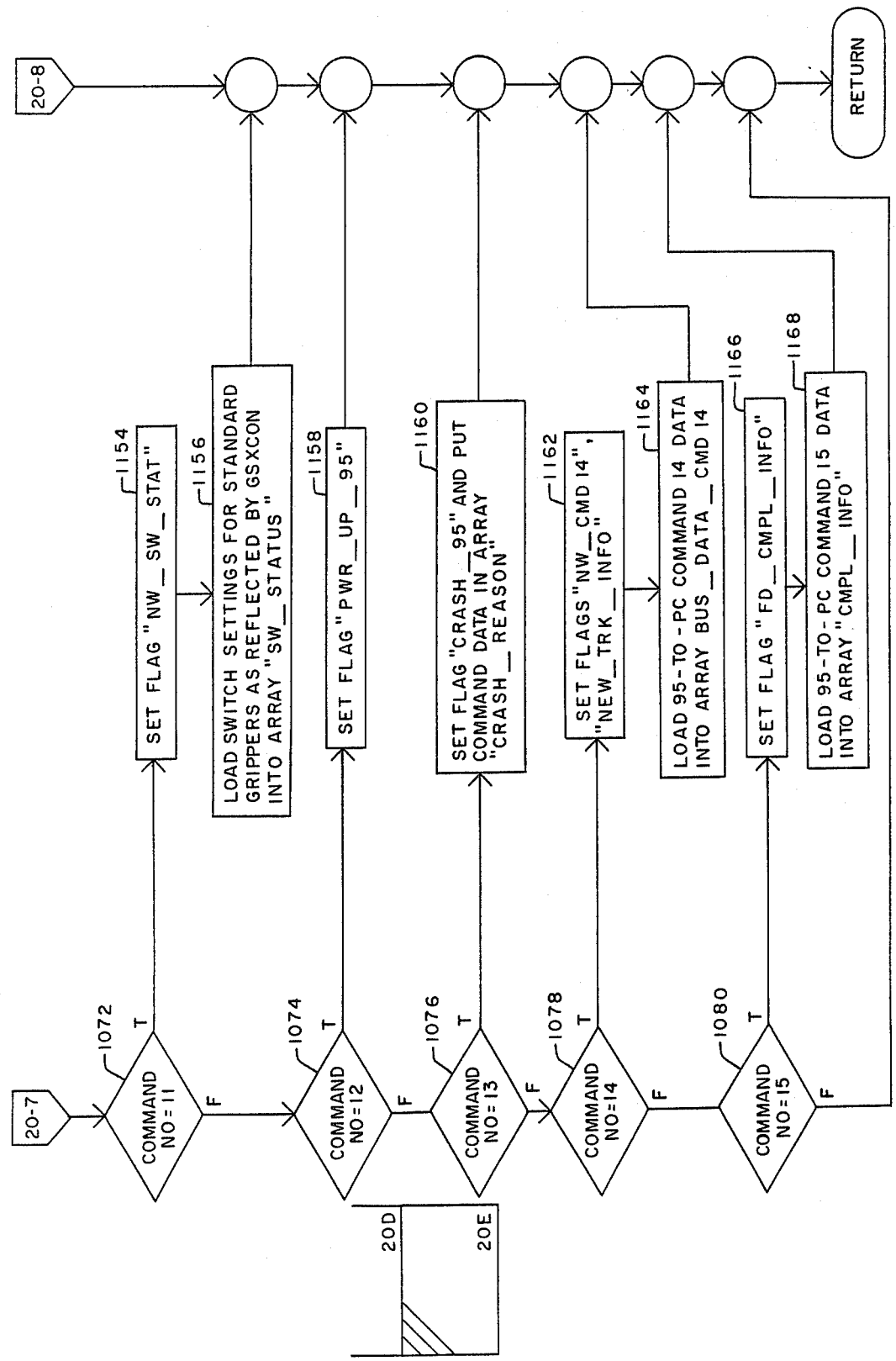

The DPS2 700 has stored on the hard disc in disc drive 714 a program PC Manager 1006 and a plurality of associated subroutines whereby the DPS2 700 executes operational steps. The primary subroutine included in the program residing on the hard disc are shown in FIG. 19 as including an Input Driver 1002; 95-TO-PC COMMAND Interpreter 1004 (also known as CMDINTR); a PC Manager File 1006; Screen Selector 1008 (also known as STREAM); PC-95-TO Command Formatter 1010; Output Driver 1012; and AUDIT_TRAIL_PROCESSING 1014; Screen Generator 1016; Hard Disc Drive Handler 1018; Floppy Disc Drive Handler 1020; Printer Handler 1022; and, Keyboard Handler 1024. In the illustrated embodiment the program residing on the hard disc in drive 714 is in the "C" programming language. FIG. 20 illustrates the execution steps 1050-1168 associated with the 95-TO-PC COMMAND Interpreter 1004.

Associated with the program PC Manager 1006 are a plurality of global identifiers used as AUDIT TRAIL counters and AUDIT TRAIL timers. The nature of the audit timers for the embodiment of FIG. 1A are essentially of FIG. 1. Among the AUDIT TRAIL counters maintained by the DPS2 700 for the insertion machine configuration of embodiment of FIG. 1A are those set forth on Chart 4:

| CHART 4 | |
|---|---|
| AUD_CNT_ENV[X] | # of envelopes fed |
| AUD_CNT_STA[X][1] | # of documents fed from 1st standard gripper |
| . | . |
| . | . |
| . | . |
| AUD_CNT_STA[X][6] | # of documents fed from 6th standard gripper |
| AUD_CNT_FDR[X][1] | # of documents fed from control station |
| AUD_CNT_CHGBK[X][1] | # of chargeback documents 1st standard gripper |
| AUD_CNT_CHGBK[X][6] | # of chargeback documents 6th standard gripper |
| AUD_CNT_DVTR[X][1] | # of documents diverted by 1st diverter |
| AUD_CNT_DVTR[X][2] | # of documents diverted by 2nd diverter |
| AUD_CNT_MTR[X][1] | # of envelopes metered by 1st meter |
| AUD_CNT_MTR[X][2] | # of envelopes metered by 2nd meter |
| AUD_CNT_WTCTG[X][1] | # of documents in first weight category |
| . | . |
| . | . |
| . | . |
| AUD_CNT_WTCTG[X][5] | # of documents in fifth weight category |

In Chart 4 with X=0 corresponds to a "temporary" counter for the current work shift; X=1 corresponds to an actual counter for the current work shift.

With further reference to Chart 4, it should be understood tha the number of standard gripper stations and the number of system stations varies from configuration to configuration. Although the number of system stations and the number of standard gripper stations shown in the configuration of FIG. 1A are 1 and 6, respectively, as many as 6 system stations and 16 gripper stations can be included in an embodiment. In view of the particular configuration of FIG 1A, the value of a memory location NM_GRIPPERS (representing the number of standard gripper stations) is set equal to "6"; the value of a memory location NM_FEEDERS (representing the number of system stations) is set equal to "1".

Figure 21:
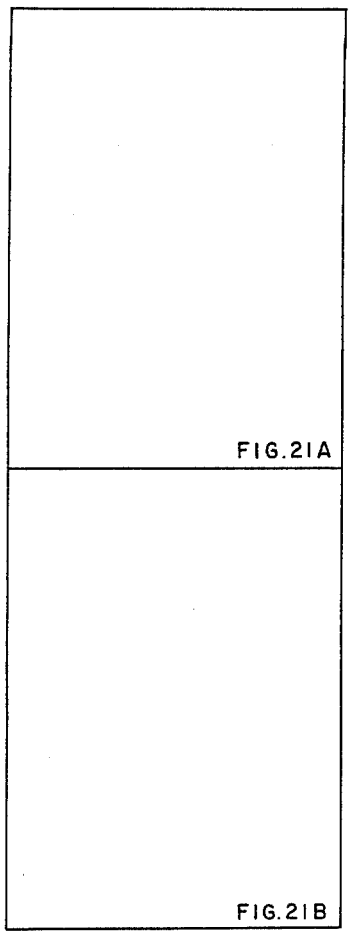
FIG. 21 is a schematic diagram illustrating the relationship of FIGS. 21A and 21B.
Figure 21A:
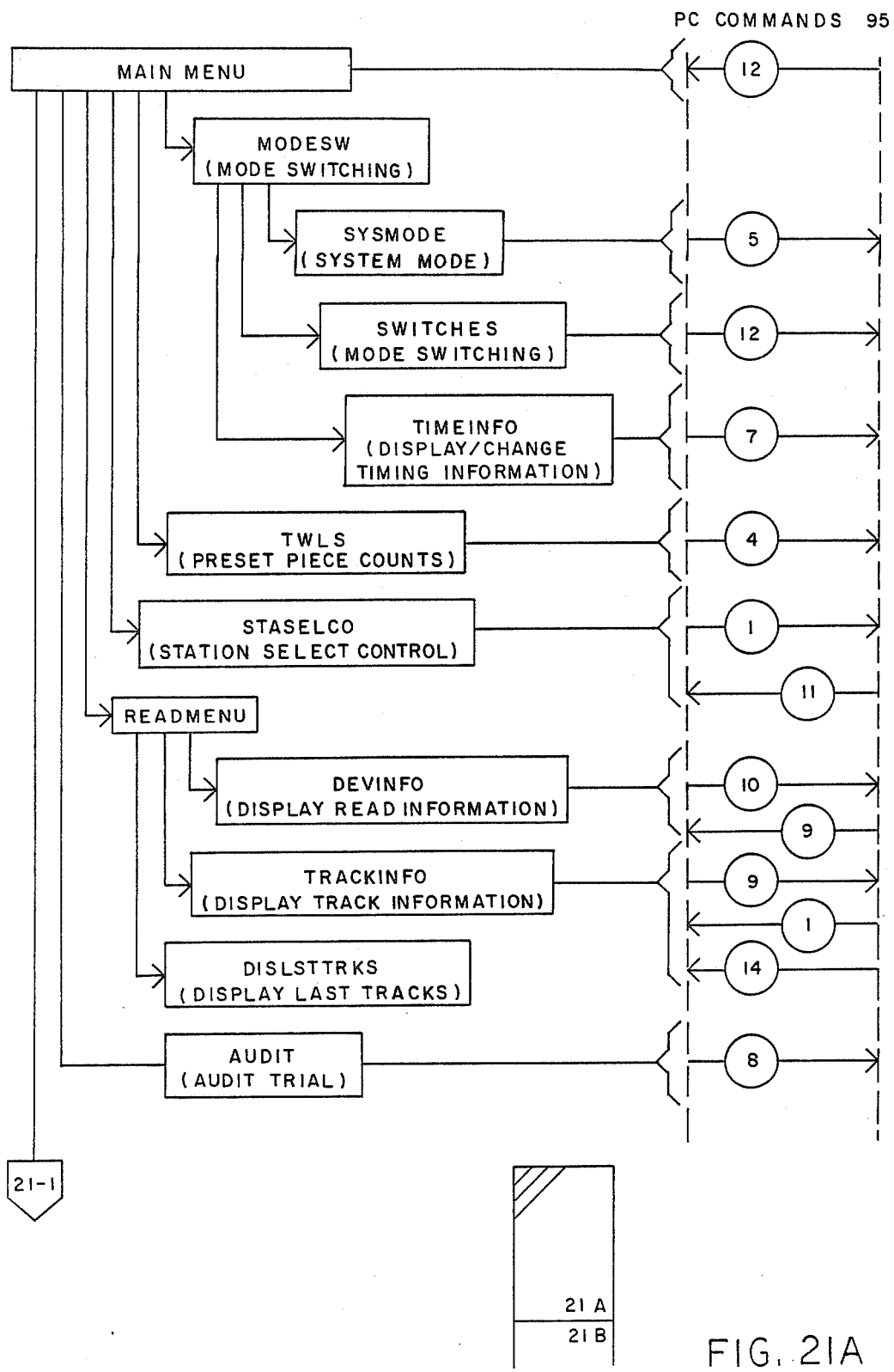
FIGS. 21A and 21B are schematic diagrams illustrating the interrelationships between screen displays displayable on a monitor, as well as the 95-TO-PC COMMANDS which prompt generation of the screen displays and/or the PC-TO-95 COMMANDS generated in response to keyboard input prompted by the screen displays.
Figure 21B:
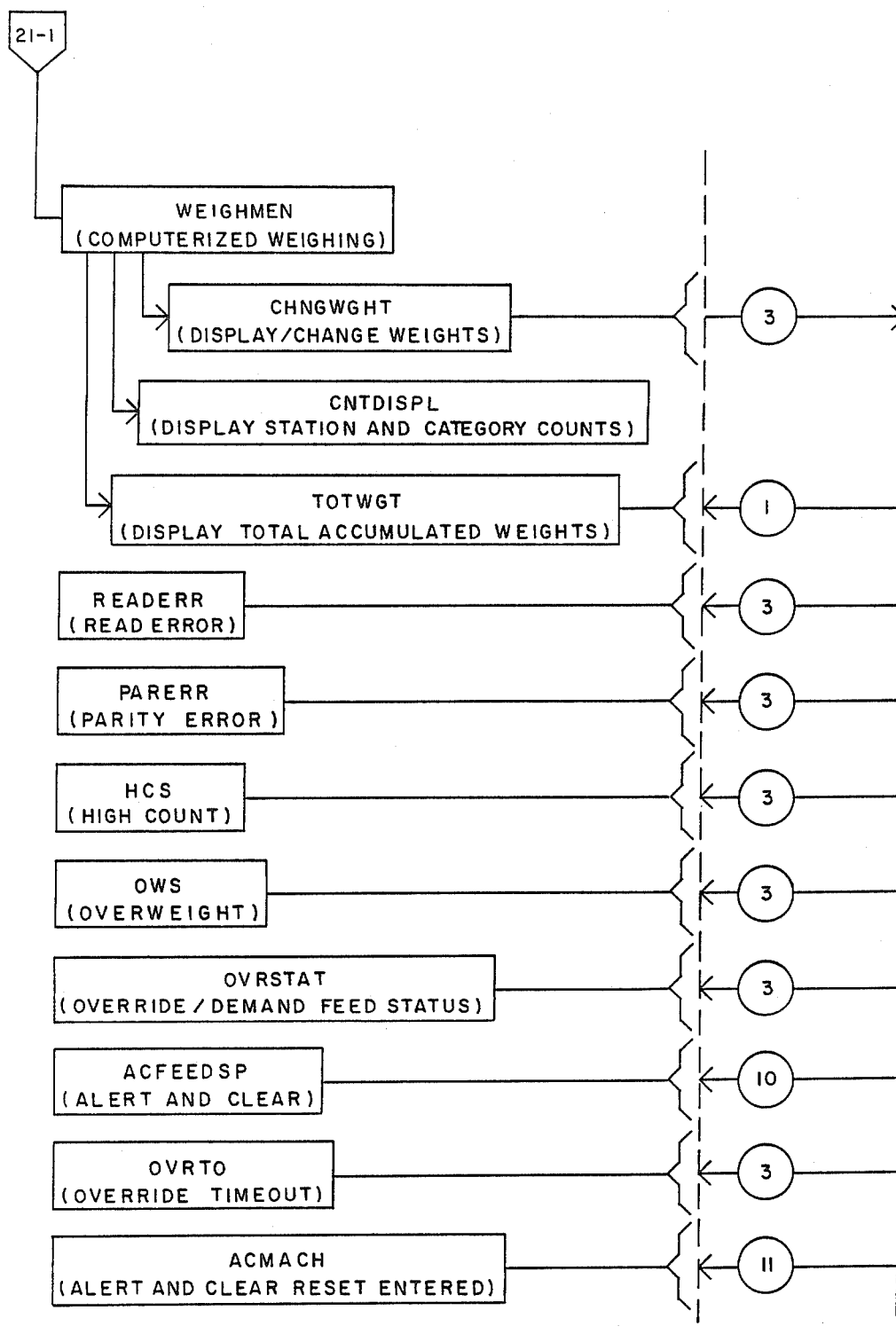

Under the control of the PC Manager 1006 the Screen Generator 1016 generates a plurality of screen displays on monitor 718 including those having names shown in the rectangular symbols of FIG. 21. FIG. 21 further illustrates the 95-PC-95 COMMANDS which prompt generation of the screen displays and/or the PC-TO-95 COMMANDS generated in response to input (via keyboard 720) prompted by the screen displays. FIG. 22 depicts the appearance of various ones of the screen displays which are displayed on monitor 718.

Figure 24:
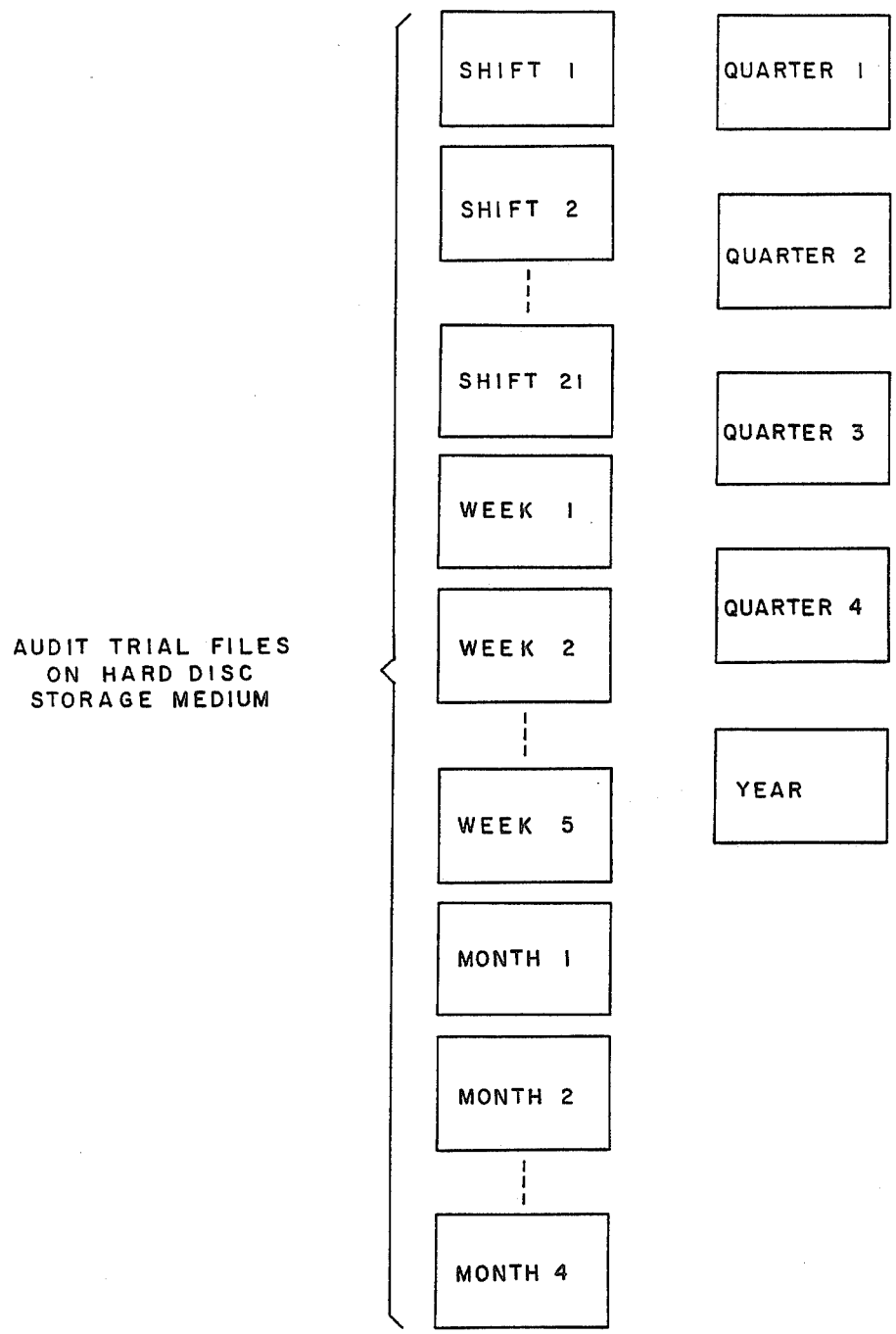

Coded instructions included in the PC Manager 1006 and the hard disc handler subroutine 1018 are configured to permit the DPS2 700 to manage a plurality of AUDIT TRAIL files maintained on the hard disc in disk drive 714. The AUDIT TRAIL files maintained on the hard disc are shown in FIG. 24 and include twenty one "shift" files named SHIFT1, SHIFT2, ... SHIFT 21; five "week" files named WEEK1, WEEK2, ... WEEK5; four "month" files named MONTH1, MONTH2, ... MONTH4; four "quarter" files named QUARATER1, QUARTER2, ... QUARTER4; and, a "year" file named YEAR. Also maintained on the nonvolatile hard disc are pointers which point to the appropriate ones of the AUDIT TRAIL files being utilized at any given moment. These pointers are SHIFT_FILE_POINTER; WEEK_FILE_POINTER; MONTH_FILE_POINTER; and, QUARTER_FILE_POINTER.

Second Embodiment Operation

Six sequential steps are followed to start-up the insertion machine system of the embodiment of FIG. 1A. It is assumed that, prior to these steps, the appropriate documents have been loaded into hoppers associated with the feeder stations and gripper-type insert stations, and that appropriate evenelopes have been loaded into the envelope hopper associated with the envelope station 50.

As a first step, the DPS2 700 is powered up with the hard disc drive handler 1018 utilized to load the program on the hard disc into the RAM memory 724. In this respect, the instructions loaded into RAM 724 include at least portions of the program PC Manager 1006 and its subroutines as shown in FIG. 19. As the program PC Manager begins execution, several initializing steps occur. Included in the initialization process are several initializing steps which pertain to the AUDIT TRAIL mode. As a first such step, the clock 711 is initialized at the time currently indicated by the non-volatile calendar clock on the expanded memory card 734. As a second such step, the AUDIT TRAIL "temporary" counters which will be used for maintaining statistical counts during the forthcoming batch or run are initialized. The "temporary" counters are those which are dimension "[0]", and whose contents are loaded into corresponding counters dimensioned as "[1]" when AUDIT TRAIL output operations (such as display, accumulation, or report generation) are requested with reference to the current work shift.

As a second step in the start up of the insertion machine system, both the insertion machine and the DPS1 100' are powered up so that the DPS1 100' can execute the collection of concurrent programs included in its software system.

Describing now in further detail some of the processing steps which occur shortly after powering up the DPS1 100', a concurrent program GENESIS similar to that described in the embodiment of FIG. 1 is initially executed. In addition, the execution of the concurrent program IBM_PC begins. Upon beginning execution the concurrent program IBM_PC initializes the semaphore BUFAVL (step 802); the semaphore PCSEND (step 804); and, the semaphores PCCMD(1), PCCMD(2), ... PCCMD(15) (step 806). The semaphore BUFAVL is used to indicate whether an output buffer SENDBF is available for loading with data. The semaphore PCSEND is signalled when one of the concurrent programs, processes, or procedures shown in FIG. 14 has prepared a 95-TO-PC COMMAND for transmission to the DPS2 700. The semaphores PCCMD(1) through PCCMD(15) are associated with respective 95-TO-PC COMMANDS 1 through 15, with in appropriate one of the semaphores being signalled when its corresponding command has been prepared.

In addition to initializing semaphores, during its initial execution the concurrent program IBM_PC at steps 810, 812, and 814 starts the execution of the three concurrent processes PC_INT; PC_PERIOD; and, PC_OPR. After being started, these three concurrent processes, along with the concurrent program IBM_PC and other concurrent programs and processes such as those described with reference to the embodiment of FIG. 1, are independently executing under the control of the multitasking operating system of DPS1 100'.

As a third step in the start-up of the insertion machine, the DPS1 100' transmits a 95-TO-PC COMMAND 12 to the DPS2 700. In this regard, the concurrent process PC_OPR, which was started at step 814 of the concurrent program IBM_PC, begins its execution at step 940 by signalling the semaphore PCCMD(12) to indicate the start up of the DPS1 100'. At step 942 the semaphore PCSEND is signalled. The concurrent process PC_OPR then suspends its execution by the delay step 944. Signalling of the semaphore PCSEND causes the concurrent program IBM_PC to resume its execution inasmuch as such a signal had been awaited at step 816. The concurrent program IBM_PC at step 818 puts the number of bytes associated with a 95-TO-PC COMMAND 12 into byte 2 of the buffer SENDBF. At step 820 the concurrent program IBM_PC supervises the transmission of the PC-TO-95 COMMAND 12 using the contents of the buffer SENDBF. In this respect, a conventional handshaking transmission of the command occurs from the DPS1 100' to the DPS2 700. Subsequent to transmission, at step 822 the semaphore BUFAVL is signalled to indicate that the output buffer is available.

Figure 22A:
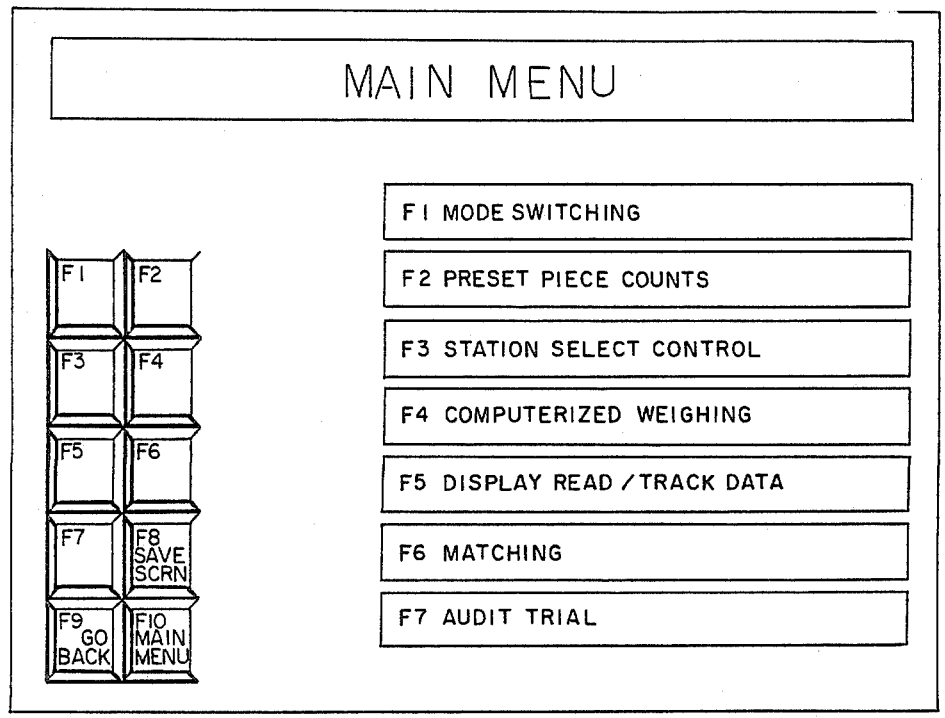
FIGS. 22A through 22G are front views of differing screen displays displayable on display monitor means of the embodiment of FIG. 1A.

As a fourth step in the start-up of the insertion machine, upon receipt of the 95-TO-PC COMMAND 12 the DPS2 700 displays the screen display MAINMENU of FIG. 22A on the monitor 718. In this regard, upon receipt of the 95-TO-PC- COMMAND 12 by the input driver 1002 of the DPS2 700, the command interpreter (CMDINTR) 1004 obtains the command number (at step 1050) and, using its switch instruction, sets a flag PWR_UP_95 at step 1158. Under the control of the PC Manager 1006 the screen selecter (STREAM) 1008 determines that the screen display MAINMENU should be displayed. Accordingly, under the control of the PC Manager 1006, the screen generator 1016 generates the display shown as FIG. 22A.

As a fifth step in the start-up of the insertion machine, various types of operating input parameters are downloaded from the DPS2 700 to the DPS1 100'. In general, to download input operating parameters the screen display MAINMENU (FIG. 22A) is used to select for display on monitor 718 an appropriate screen display associated with the parameter-to-be-downloaded. The screen display associated with the parameter prompts the user to supply via the keyboard 720 an appropriate input value or setting as the operating parameter. Supervising the keyboard handler 1022 as well as the formatter 1010 and the output driver 1012, the PC Manager 1006 causes the output driver 1012 to generate an interrupt and, using the keyboard input data, a PC-TO-95 COMMAND of the downloading type. In this respect, the PC manager instructs the PC-TO-95 command formatter 1010 to prepare a new PC-TO-95 COMMAND which includes indicative of the keyboard input. The PC manager directs the output driver 1012 to transmit to the DPS1 100' an interrupt; a data available signal; and, when the DPS1 100 is ready, the PC-TO-95 COMMAND. The DPS1 100' awaits the interrupt (by the signalling of semaphore PCINT at step 830) in accordance with conventional handshaking techniques. As governed by the concurrent process PC_INT, the command number is used in connection with a Microprocessor Pascal TM language "CASE" instruction (even numbered steps 836 through 858) to determine how the 95-TO-PC command is to processed.

A first type of insertion machine input parameter downloaded from the DPS2 700 to the DPS1 100' is control information for each of the standard gripper-type stations, such as stations 52 through 57. For each such gripper station the DPS1 100' must know whether the gripper stations is in the ON mode, the OFF mode, the SELECT mode, or the SELECTIVE MERCHANDISING mode. In this respect, the DPS1 100' has in its RAM memory an array GSXCON with each standard gripper station having a corresponding associated location in the array GSXCON. The value stored in the corresponding location in array GSXCON for a gripper station determines the mode in which the gripper station operates. In this respect, a "1" value is indicative of the OFF mode; a "2" value is indicative of the ON mode; a "3" value is indicative of the SELECT mode; and, a "4" value is indicative of the SELECTIVE MERCHANDISING mode. It should be understood that an insertion machine may include in its configuration a smaller number of standard gripper-type arm stations than that for which the array GSXCON is dimensioned, and accordingly that some element locations in the array GSXCON may not be utilized for such configurations.

Figure 22B:
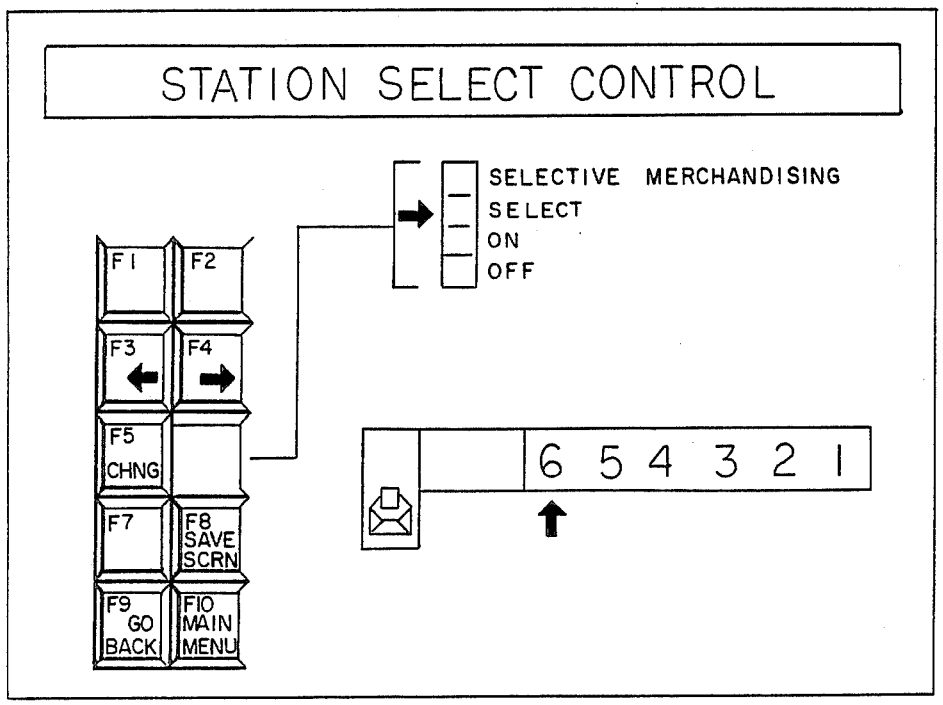

In order to download the station control information, the operator (viewing on the color of monitor 700A the display screen MAINMENU of FIG. 22A) presses the "F3" key on the keyboard 720. Actuation of a key on the keyboard 720 is noted by the keyboard handler 1024 which, under control of the PC Manager 1006, transmits an indication of the key pressed to the PC Manager 1006. On the basis of the pressing of the "F3" key, the PC Manager 1006 instructs the screen generator 1016 to display the screen display STASELCO which is shown in FIG. 22B. It is henceforth understood that changes of various screen displays in response to input on the keyboard 720 is accomplished by similar steps.

The screen display STASELCO of FIG. 22B permits the user to indicate for each standard gripper station (such as stations 52 through 57) in an insertion machine configuration whether the station is in the ON mode, the OFF mode, the SELECT mode, or the SELECTIVE MERCHANDISING mode. In this respect, the particular screen display STASELCO of FIG. 22B concerns an embodiment in which six gripper stations are provided, and wherein keys "F3" and "4" are utilized to determine which of the gripper stations is affected while the key "F6" is used to scroll through the mode settings.

With reference to the screen display STASELCO of FIG. 22B, two actions are taken each time a key on the keyboard 720 is pressed. As a first action, a value indicative of the mode to which the mode arrow of FIG. 22B points (whether a "1" value [OFF mode], a "2" value [ON mode], etc) for the station pointed to by the station arrow is stored in RAM 724. As a second action, the PC Manager 1006 instructs the formatter 1010 to prepare a new PC-TO-95 COMMAND 1 using the stored values. The new PC-TO-95 COMMAND 1 is output from the DPS2 700 via the output driver 1012 which handles the handshaking and downloading to DPS1 100'. The operator uses screen display STASELCO in this manner in order to download input-parameters for each of the gripper-type stations included in the particular insertion machine configuration.

The interrupt associated with the PC-TO-95 COMMAND 1 causes the concurrent program PC_INT to resume its execution (since the concurrent process PC_INT had been waiting on the interrupt at step 830). After reading the PC-TO-95 COMMAND from the DPS2 700 at step 832, the concurrent process PC_INT determines the command number and branches to an appropriate instruction adress in accordance with the command number. Thus, having determined at step 836 that a PC-TO-95 COMMAND 1 was received, at step 860 the concurrent process PC_INT loads the downloaded control information for each gripper station included in the PC-TO-95 COMMAND 1 into the array GSXCON. In this manner, as a plurality of PC-TO-95 COMMANDS 1 are received, an appropriate location in the array GSXCON is eventually filled with an operator-input value indicative of the control mode for that gripper station for the forthcoming batch. After receipt of each PC-TO-95 COMMAND 1 the current process PC_INT then loops back to await a further interrupt process at step 830.

Figure 22C:
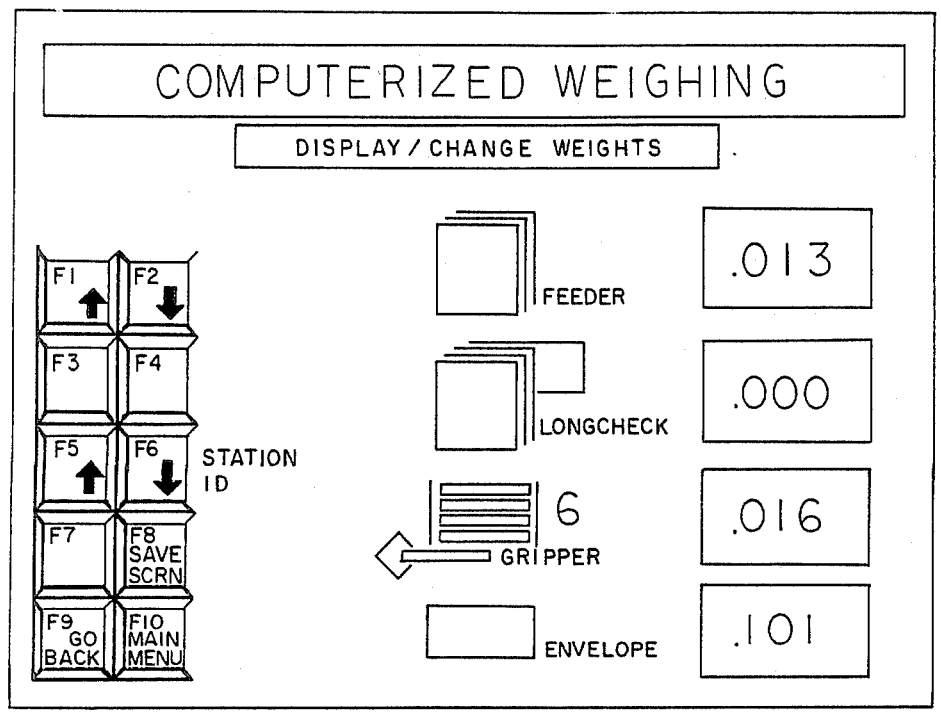

Another type of operating input parameter that must be downloaded from the DPS2 700 to the DPS1 100' is the per document weight of documents at each insert feeding station (both gripper-type stations and system stations), as well as the per envelope weight for envelopes at the envelope station 50. In order to download these per document weights when viewing the screen display MAINMENU on the monitor 718, the operator selects the key "F4" on the keyboard 720. In response to the "F4" key input the PC Manager 1006 causes screen generator 1016 to generate a display screen WEIGHMEN on the monitor 718. Although not illustrated herein, the display screen WEIGHMEN is understood to be a menu which allows the operator to select one of three further screens: display screen CHANGWGHT (shown in FIG. 22C); display screen CNTDISPL (shown in FIG. 22D); and, display screen TOTWGT (unillustrated).

Using the menu of screen WEIGHMEN the operator presses a key on keyboard 720 which ultimately causes the screen generator 1016 to generate display screen CHNGWGHT on the monitor 720. Using these function keys on the keyboard 720 as designated by the screen display CHNGWGHT, the operator can select a station (either a system station, a standard gripper-type station, or the envelope station) for which a per document weight is to be entered. In this respect, it is understood that the operator can enter a per document weight for each station on a station-by-station basis. In this respect, for each system feeder station two per document weights can be entered—a nominal (i.e. short document per document weight for a document type having a first weight-influencing characteristic and a "long check" weight for a document type having a second weight-influencing characteristic. The per document weights are input using a numeric pad portion of the keyboard 720 with keys 0 through 9.

Each time a numeric key is pressed while CHANGWGHT is being displayed, two actions are taken. First, a new numeric value for the station being displayed is entered into RAM 724. Second, the PC Manager 1006 instructs the formatter 1010 to prepare a PC-TO-95 COMMAND 3 which, as understood with reference to Chart 2 provided above, includes the per document weights for all stations as currently stored in the RAM 724. In a manner understood from the preceeding discussion, the PC-TO-95 COMMAND 3 and its associated interrupt are transmitted by the output driver 1012 to the DPS1 100'.

Upon receipt of the interrupt associated with the PC-TO-95 COMMAND 3, the concurre process PC_INT at step 830 resumes its execution and reads the PC-TO-95 COMMAND 3 from the DPS2 700. Using its "CASE" instruction at step 840 the concurrent process PC_INT branches to an appropriate instruction location depending on the command number. For this command, the execution jumps to step 866. At step 866 the downloaded per envelope weight information is moved into a corresponding location in an array WEIGHT. It is understood that memory locations for the array WEIGHT are located in RAM and resemble locations 389 through 396 as described in the embodiment of FIG. 1. At step 868 the downloaded per document weight information for each standard gripper-type station is moved into a corresponding location in the array WEIGHT. At step 870 the nominal (i.e., short document) per document weight information is loaded into a corresponding location in the array WEIGHT for each system feeder station. Likewise, at step 872 the downloaded longcheck per document weight information for each feeder station is moved into a corresponding location in the array WEIGHT. Thereafter, the concurrent process PC_INT resumes waiting at step 830 upon the next signalling of semaphore PCINT.

Another type of operating input parameter that must be downloaded from the DPS2 700 to the DPS1 100' is a value to be stored in location TRAKLOC as a designation as to which physical track location along the insert track 30 is to serve as a track locator reference point. As is explained in U.S. patent application Ser. No. 707,124 filed Feb. 28, 1985, each processing station along the insert track 30 is assigned a position location number relative to an origin-serving processing station. As will be seen hereinafter, 95-TO-PC COMMANDS 1 are generated every machine cycle, each 95-TO-PC COMMAND 1 including therein data including portions of two records from SBUS. The two records in SBUS for which data is included in a PC-TO-PC COMMANDS contain data relative to groups of documents being processed at that moment at two physical locations on the insert track 30. In response to a prompt seen on the screen display TRACKINFO, the operator can enter on the numeric pad of keyboard 718 a value which represents the first of the two physical track locations of insert track 30 for which data from a record in SBUS is to be included in a 95-TO-PC COMMAND 1. Upon the pressing of a numeric key in response to the prompt of display TRACKINFO, the PC Manager 1006 requires the command formatter 1010 to generate a PC-TO-95 COMMAND 9 containing in its third byte the value to be downloaded into memory location TRKLOC of the DPS1 100'. Upon transmission of the PC-TO-95 COMMAND 9 the concurrent process PC_INT at step 892 stores the downloaded third byte of the command into location TRKLOC. In the example under discussion for the embodiment of FIG. 1A, it is assumed that the PC-TO-95 COMMAND 9 downloads a "1" value into location TRKLOC.

Other types of operating input parameters include parameters which dictate the points in the machine cycle at which various operations occur. In this regard, as prompted by display screen TIMEINFO the operator presses numeric keys on the keyboard 720 one or more PC-TO-95 COMMANDS 7 are generated and transmitted in the manner described above to DPS1 100'. Upon receipt of a PC-TO-95 COMMAND 7 the concurrent process PC_INT of DPS1 100' loads downloaded data values into memory locations STRTIM (feeder start time i.e., the point in each machine cycle at which system stations are to feed documents), DMPTIM (collector dump time i.e., the point in each machine cycle at which a collector associated with a system station is to dump documents into insert track 30), and OVRTIM (feeder override time (i.e., the point in a machine cycle at which an OVERRIDE condition is to be entered) at steps 884, 886, and 888, respectively.

Other types of operating input parameters are downloaded from the DPS2 700 to the DPS1 100' in a similar manner as that described above. In this respect, as prompted by screen display TWLS, a PC-TO-95 COMMAND 4 is transmitted by the DPS2 700 to download input values indicative of the maximum number of documents which can be fed (i.e. a preset piece count) for any group from certain stations. After waiting upon the signalling of semaphore PCINT and branching in accordance with the command number, the concurrent process PC_INT at step 874 moves the downloaded system piece count values and to corresponding locations in an array TWLVAL. Similarly, the display screen SYSMODE prompts the operator to designate whether the system feeder stations are in a reading or a non-reading mode, and whether a MATCHING mode is in effect. In the MATCHING mode a comparision is made either between (1) indicia on documents fed from different system stations; or (2) an actual count of the number of documents fed from a system station and an indication of the expected number of documents to be fed (the indication being provided elsewhere as in the control indicia, for example). Operator responses via keyboard 720 as prompted by display screen SYSMODE is used in the preparation of the PC-TO-95 COMMAND 5. When transmitted to the DPS1 100', the PC-TO-95 COMMAND 5 is used by concurrent process PC_INT to determine whether the flags SYSTEMP, SUBTEMP, and MATTMP should be set. In this respect, for a PC-TO-95 COMMAND 5 the concurrent process PC_INT at step 876 moves the downloaded data second byte into the location SYSTMP as an indication whether a system mode is pending. At step 878 the downloaded data third byte is moved into location SUBTMP as an indication whether a system sub-mode is pending. At step 880 the downloaded data fourth byte is moved into location MATTMP as an indication whether a MATCH mode is pending.

Other types of downloaded operating parameters include various switch settings, such as a switch which determines how a DEMAND FEED mark is to be recognized. A DEMAND FEED can be initiated by either the presence or absence of a mark in a specified position in the control indicia. As described above, a DEMAND FEED condition essentially serves to stop the insert track 30 for a machine cycle so that a reading-type gripper station can feed a second document onto the insert track 30 for a group. The switch settings such as the DEMAND FEED switch are illustrated on a display screen SWITCHES. Operator input via keyboard 720 in response to display scrren SWITCHES ultimately result in the generation of a PC-TO-95 COMMAND 12 which is transmitted to the DPS1 100'. Upon receipt of the PC-TO-95 COMMAND 12 the concurrent process PC_INT branches via decision 858 to step 900 whereat downloaded data bytes included in the PC-TO-95 COMMAND 12 are moved into corresponding locations in the array SWVAL.

As a sixth step in the start-up of the insertion machine system, and after the operational parameters are downloaded in the manner described above, the operator commences mechanical start up of the insertion machine by pressing an unillustrated START button on the machine control panel. Upon pressing of the start button the drive motor of the insertion machine is actively coupled to the rotating shafts discussed hereinbefore, including the incrementing rotational shafts which serve to advance the insert track indexing chain 30 and the envelope track indexing chain 48. Each rotation of the continuously rotating main timing shaft is referred to as a machine cycle.

During the first machine cycle, one or more documents included in a first group is deposited on the insert track 30 at a physical location thereof corresponding to the value stored in memory location TRKLOC. At the 280 degree point of the machine cycle, the semaphore SDEG(28) is signalled and the concurrent process PC_PERIOD, which was waiting on the signalling of semaphore SDEG(28) at step 910, resumes its execution. In connection with the generation of its 95-TO-PC COMMAND the concurrent process PC_PERIOD essentially functions to load into the output buffer SENDBF data including (1) portions of the SBUS record for the subgroup at the physical location on insert track 30 corresponding to the value of memory location TRKLOC; (2) the SBUS record for the group which is at the last physical position on track 30 (a position corresponding to the value in memory location LAST-TRAK); and, (3) stations status flags from array STAST, feeder piece counts, and chargeback station flags.

Figure 18:
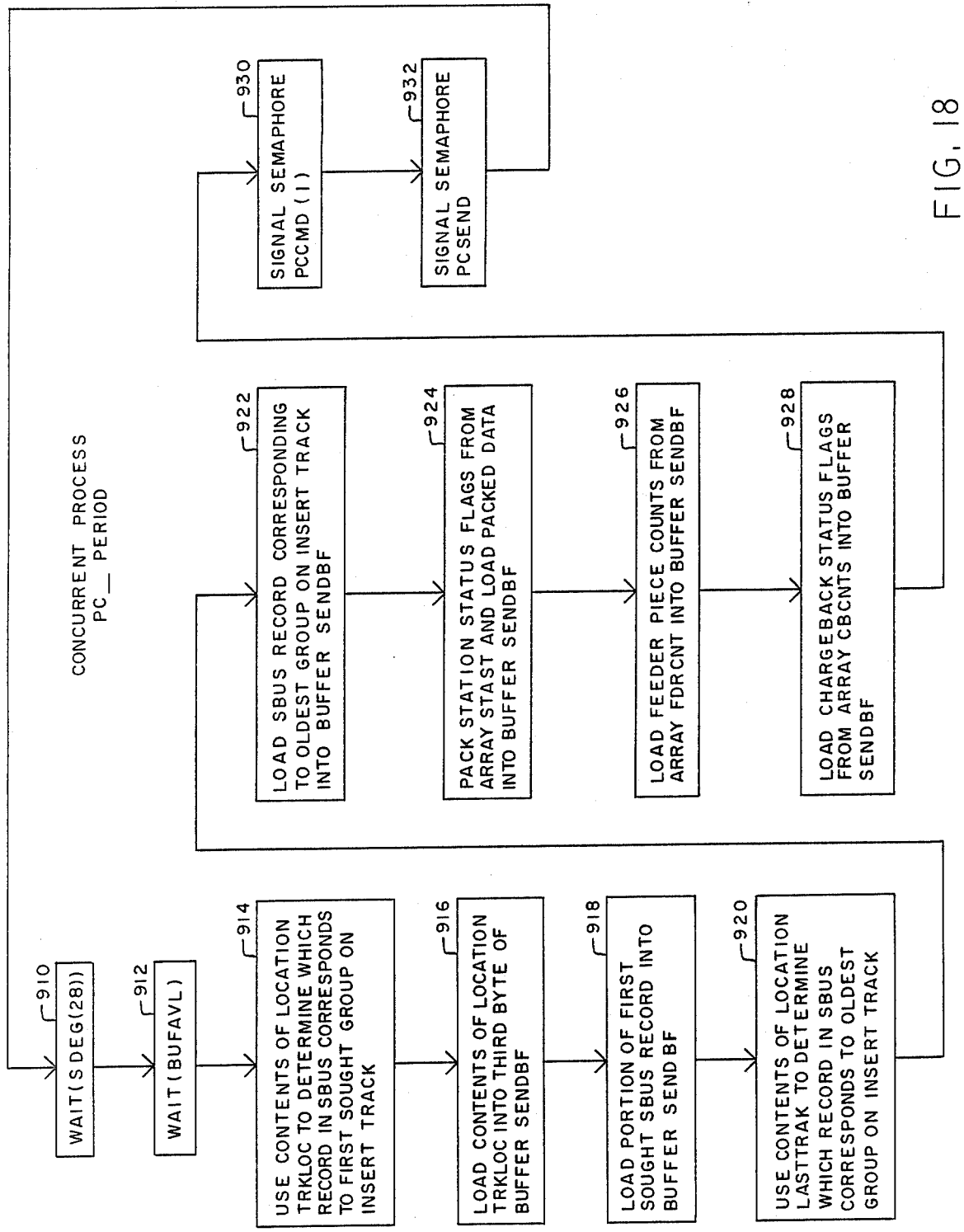
FIG. 18 is a schematic diagram illustrating execution operations associated with a concurrent process PC_PERIOD.

FIG. 18 describes in more detail the steps associated with the execution of the concurrent process PC_PERIOD. At step 914 the contents of the location TRKLOC is used to determine which record in SBUS correspond to the first sought group on the insert track 30. In this respect, for the embodiment shown in FIG. 1A, the value in location TRKLOC is "1". Thus, for the particular embodiment shown in FIG. 1A, the location TRKLOC is indicative of the track position at which subgroups of documents are deposited on to the insert track by the control station 42.

Inasmuch as the concurrent process PC_PERIOD prepares a 95-TO-PC COMMAND in the output buffer SENDBF at step 912, the concurrent process PC_PERIOD must wait until the semaphore BUFAVL has been signalled before doing so. At step 914 the contents of the location TRKLOC is used to determine which record in SBUS corresponds to the first sought group on the insert track 30. In this respect, it will be recalled that the value in location TRKLOC is an integer constant representing the physical position along the insert track 30 at which a control document for a group is deposited on the insert track 30. In order to determine the record in SBUS which corresponds to the group at that physical location on the insert track, the pointer BINDEX is consulted. At step 916 the contents of location TRKLOC are loaded into the third byte of buffer SENDDF. At step 918 a portion of the first sought SBUS record (the SBUS record corresponding to the group just deposited by the control station on the insert track) is loaded in appropriate locations in buffer SENDBF. In particular, the portion of SBUS loaded into the buffer SENDBF includes bits 1 through 38 of the packed Boolean array portion of each record.

Having loaded a portion of the record in SBUS corresponding to the newest group of documents deposited on the insert track 30, the concurrent process PC_PERIOD then loads into the buffer SENDBF the SBUS record corresponding to the oldest group of documents on the insert track 30. In connection with this load, the process PC_PERIOD uses the contents of location LASTTRAK to determine the oldest group on the track (steps 920, 922). At step 924 the station status flags from array STAST are packed and loaded into buffer SENDBF in a position corresponding to bytes 34-36 of the 95-TO-PC COMMAND 1. The station status flags from array STAST indicate whether a document was actually fed from each of the standard gripper stations and whether an envelope was actually fed from the envelope station. At step 926 the feeder piece counts from the array FDRCNT are loaded into buffer SENDBF bytes 37 through 42. At step 928 the chargeback status flags from array CBCNTS are loaded into bytes 41 through 42 of the buffer SENDBF.

With the concurrent process PC_PERIOD having loaded appropriate data into the buffer SENDBF, the semaphore PCCMD(1) is singalled to indicate that a 95-TO-PC COMMAND 1 has been prepared (step 930). At step 932 the semaphore PCSEND is signalled to indicate that the 95-TO-PC COMMAND 1 is ready for tranmission.

The signalling of the semaphore PCSEND causes the concurrent program IBM_PC to resume its execution (having awaited a signal at step 816). At step 818 the program IBM_PC, nowing that semaphore PCCMD(1) was the most recently signalled of the PCCMD semaphores, uses a directory look-up to determine the number of bytes associated with the most recently signalled PCCMD semaphore and puts that number of bytes into the second byte location in output buffer SENDBF. For a 95-TO-PC COMMAND 1, the number inserted into byte 2 is "44". At step 820 the concurrent program IBM_PC supervises the transmission of the 95-TO-PC COMMAND 1 to DPS2 700 using conventional handshaking techniques. Thereafter (step 822) the semaphore BUFAVL is signalled.

As mentioned above, when the insertion machine is operating normally, a 95-TO-PC COMMAND 1 is generated every machine cycle at the 280 degree point. The receipt of the 95-TO-PC COMMAND 1, as are all 95-TO-PC commands, is handled by the input driver 1002 and interpreted by the command Interpreter 1004.

As shown in FIG. 20, at step 1050 the command interrpreter (CMDINTR) 1004 obtains the command number (from byte 1 of the 95-TO-PC COMMAND) Using a "SWITCH" instruction (represented by even numbered steps 1052 through 1080), the subroutine CMDINTR branches to appropriate instruction locations depending upon the command number. In the case of a 95-TO-PC COMMAND 1, the subroutine CMDINTR branches to step 1081. In connection with steps 1081 through 1112 it is seen in FIG. 20 that the subroutine CMDINTR basically (1) transfers data related to the group on the insert track at the location TRKLOC (generally the newest group on the track) into an array BUS_DATA_CMD1; (2) updates various counters used in the generation of statistical reports (i.e. used in the AUDIT TRAIL mode); and (3) transfers data relative to the group at the insert track location LASTRAK—the location on the insert track 30 at which the oldest group of documents resides—into an array LST_TRK_IMAGE. The array LST_TRK_IMAGE contains data for the last seven groups which have left the insert track 30 for further downstream processing.

Describing now at greater detail steps 1081 through 1112 of the subroutine CMDINTR, if this is the first 95-TO-PC COMMAND 1 the calendar start time from the clock 711 is consulted and stored at step 1081. At step 1082 the TRKLOC value from the 95-TO-PC COMMAND 1 is obtained and loaded into array BUS_DAT_CMD1. At step 1083 the remaining data items from the 95-TO-PC COMMAND 1 are obtained and loaded into appropriate locations in the array BUS_DATA_CMD1.

Having loaded the data from the 95-TO-PC COMMAND 1 into the array BUS_DATA_CMD1, the subroutine CMDINTR proceeds to update various counters which are used in the AUDIT TRAIL mode. In this regard, at step 1084 a check is made to determine whether the envelope status bit from the 95-TO-PC COMMAND 1 (i.e. command byte 34, bit 7) was set. If so, at step 1085 the counter AUD_CNT_ENV[0] is incremented.

At step 1086 the gripper status bits in bytes 34 through 36 of the 95-TO-PC COMMAND 1 are checked to determine whether each standard gripper station fed a document during the machine cycle. For the standard gripper stations which actually fed documents during associated this machine cycle, the counter AUD_CNT_STA[0][i] is updated. In this respect, it is understood that step 1086 and, if appropriate, step 1088 is executed for each gripper station i, where i ranges from 1 to NM GRIPPERS (the actual number of gripper stations employed in the given configuration).

In the same manner as described above for the gripper stations the system station piece count bytes (bytes 37 through 42 of the 95-TO-PC COMMAND 1) are checked to determine the number of documents fed from each system station during this machine cycle. In accordance with the status check, at step 1092 the counter AUD_CNT_FDR [0][i] is updated for each feeder station i, it being understood that the feeder station numbers i range from 1 to NM_FEEDERS.

At step 1094 the chargeback status bits in bytes 43 and 44 of the 95-TO-PC COMMAND 1 are checked with respect to each standard gripper station to determine whether a chargeback occurred in connection with those stations during this machine cycle. At step 1096 the counter AUD_CNT_CHGBK[0][i] is updated in accordance with the status check.

At step 1098 the diverter status bits from the 95-TO-PC COMMAND 1 (bits 1 and 0 of byte 22 and bit 7 of byte 23) are checked to determine the status of the diverters, the status checks being made relative to the group on the insert track positioned at the "LASTTRAK" position. In accordance with the status check, at step 1100 the counters AUD_CNT_DDTR[0][1] and AUD_CNT_DVTR[0][2] are updated.

In like manner as with the diverters, at step 1102 the postage meter status bits in the 95-TO-PC COMMAND 1 (bits 5, 4, and 3 of byte 24) are checked relative to the group of documents at the "LASTTRAK" position on the insert track 30. In accordance with the status check, at step 1104 the counters AUD_CNT MTR[0][1] and AUD_CNT_MTR[0][2] are updated.

At step 1106 the value stored in bytes 32 and 33 the 95-TO-PC COMMANDS 1 are checked as an indication of the calculated weight of the stuffed envelope located at the "LASTTRAK" position on the insert track 30. These bytes correspond to the integer BWGHT stored in SBUS for the sutffed envelope at the "LASTTRAK" position. The integer BWGHT is a representation of the projected weight of the stuffed envelope as calculated by the concurrent program CW, also known as computer weighing. Based on the calculated weight of the stuffed envelope at the "LAST-TRAK position, at step 1108 an appropriate one of the weight category counters AUD_CNT_WTCTG[0][1] through AUD_CNT_WTCTG[0][5] is incremented. In this respect, counter AUD_CNT WTCTG[0][1] is kept for the number of stuffed envelopes weighing 1 ounce or less, counter AUD_CNT_WTCTG[0][2] is kept for the number of stuffed envelopes weighing 2 ounces or less (but more than 1 ounce), and so forth.

Having updated the counter used in the AUDIT TRAIL mode, the subroutine CMDINTR updates the location OLD_PTR which points to the oldest column in the 7-column array LST_TRK_IMAGE. At step 1112 the information in bytes 19 through 33 of the 95-TO-PC COMMAND 1 pertaining to the group at the "LASTTRK" position on the insert track 30 are moved into the column of the array LST_TRK_IMAGE pointed by location OLD_PTR.

The just-described steps 1076 through 1112 of the subroutine CMDINTR are executed upon the receipt of each 95-PC-COMMAND 1. Thus, the AUDIT TRAIL counters mentioned during those steps are updated each machine cycle by the DPS2 700 in accordance with the results of the various status checks. In this respect, when it is noted that the checked conditions occur, the appropriate AUDIT TRAIL counters are incremented. Thus, the AUDIT TRAIL counter serve as continuously tallying work spaces for the current work shift.

As in the embodiment of FIG. 1, the insertion machine of the embodiment of FIG. 1A is capable of monitoring insertion machine operations over a plurality of time frames. In this respect, each of the files illustrated in FIG. 24 has memory locations that correspond to each of the actual AUDIT TRAIL counters listed in Chart 4. Thus, it is understood that AUDIT TRAIL counters are maintained over a plurality of time bases, with only the temporary counters associated with the current shift being incremented during normal operation of the insertion machine. Upon entry of the AUDIT TRAIL mode the contents of the temporary counters (i.e., the "[0]" dimensioned counters) for the current shift are copied into the permanent counters (i.e., the "[1]" dimensioned counters).

As described above, a 95-TO-PC COMMAND 1 is generated every machine cycle when the insertion machine is running. A 95-TO-PC COMMAND 11 can be generated as frequently as once every machine cycle. THE 95-TO-PC COMMAND 11 is used to transmit from the DPS1 100' to the DPS2 700 values indicative of the control switch status for the standard gripper stations as the status is reflected in array GSXCON. In this respect, after waiting ⅛ second at step 944 the concurrent process PC_OPR checks at step 946 a flag GSXCHG to determine whethe the contents of array GSXCON have been changed during the current machine cycle. If the contents of GSXCON have been changed, PC_OPR generates a new 95-TO-PC COMMAND 11 reflecting the change by (1) waiting for the buffer SENEB available (step 952); (2) clearing the flag GSXCHG (step 954); loading the buffer SENDBF with values indicative of the control switch status for the standard gripper stations (step 956); and, signalling the semaphores PCCMD(11) and PCSEND at steps 958 and 960, respectively. Clearing the flag GSXCHG at step 954 prevents the generation of more than one 95-TO-PC COMMAND 11 per machine cycle.

As the insertion machine continues to run, the operator has the option of viewing on the monitor 718 certain ones of the display screens shown in FIG. 21. The display screens may be viewed in order to observe thereon certain values, including previously-downloaded operating input parameters and/or machine-related operating output data which has been transmitted from the DPS1 100' to the DPS2 700 in a 95-TO-PC COMMAND.

In the above regard, as the insertion machine continues to operate, the operator may wish to check the previously-downloaded per document weight value for a certain standard gripper station. To do so when viewing the display screen MAINMENU of FIG. 22A on the monitor 718, the operator presses the key "F4" on the keyboard 720, which results in the generation and display of screen display WEIGHMEN. Using a menu displayed on screen display WEIGHMEN, the operator presses a key which results in the generation of the screen display CHNGWGHT shown in FIG. 22C. Using the function keys "F5" and "F6" on the keyboard 720 the operator can scroll through the various feeder stations and envelope station included in the configuration of the insertion machine and obtain corresponding per document displays associated with these stations. In the particular display of CHNGWGHT shown in FIG. 22C, the downloaded per document weights for the control station 42, the sixth standard gripper station 57, and the envelope station 50 of the embodiment of FIG. 1A are being viewed. However, the operator cannot change the per document weight values while the insertion machine is running.

Figure 22D:
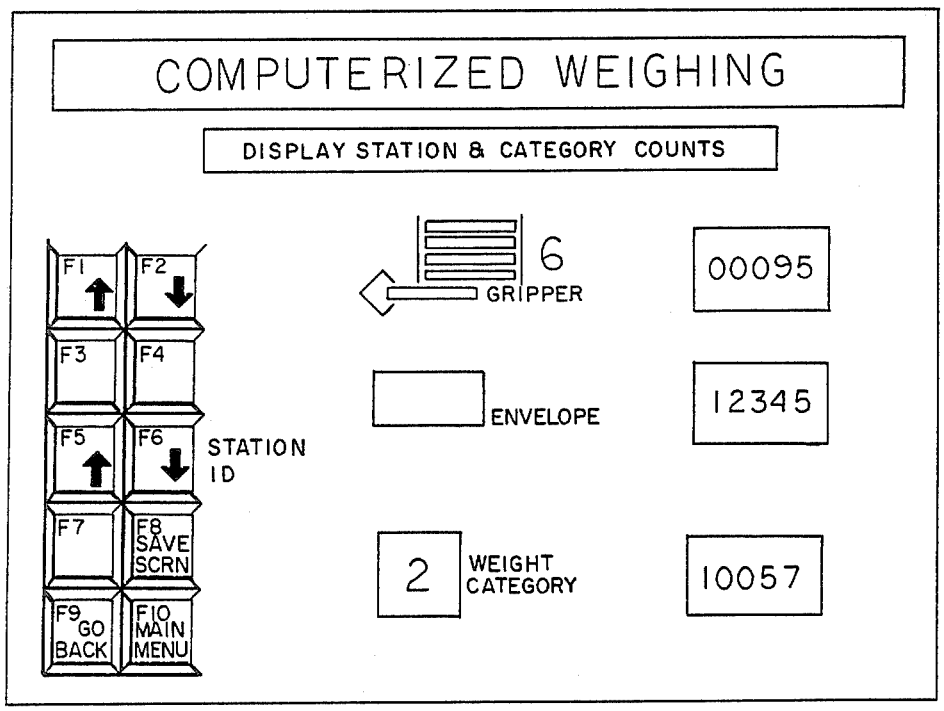

An example of the viewing of insertion machine-related operating output data is seen with reference to the display screen CNTDISPL of FIG. 22D. The screen display CNTDISPL allows the operator to observe the number of documents actually fed thus far from each standard gripper station and the envelope station 50, as well as the number of documents which have been assigned each weight category. As the operator selects the station for which the operator desires to observe the number of documents fed, the PC Manager 1006 supplies the screen generator 1016 with the current numerical count in the appropriate one of the audit counters. For example, if the operator wishes to observe the number of documents fed from the sixth gripper station (i.e. station 57) for the current shift, the PC Manager 1006 supplies the screen generator 1016 with the current value stored in the counter AUD_CNT_STA[0][6]. Likewise, should the operator wish to see the number of groups of documents thus-far classified into weight category 2, the PC Manager 1006 supplies the screen generator 1016 with the current value of the audit counter AVD_CNTD WTCTG[0][2]. The operator is also able to see the current value of the audit counter AUD_CNT_ENV[0], which contains the number of envelopes actually fed during the current shift.

Figure 22E:
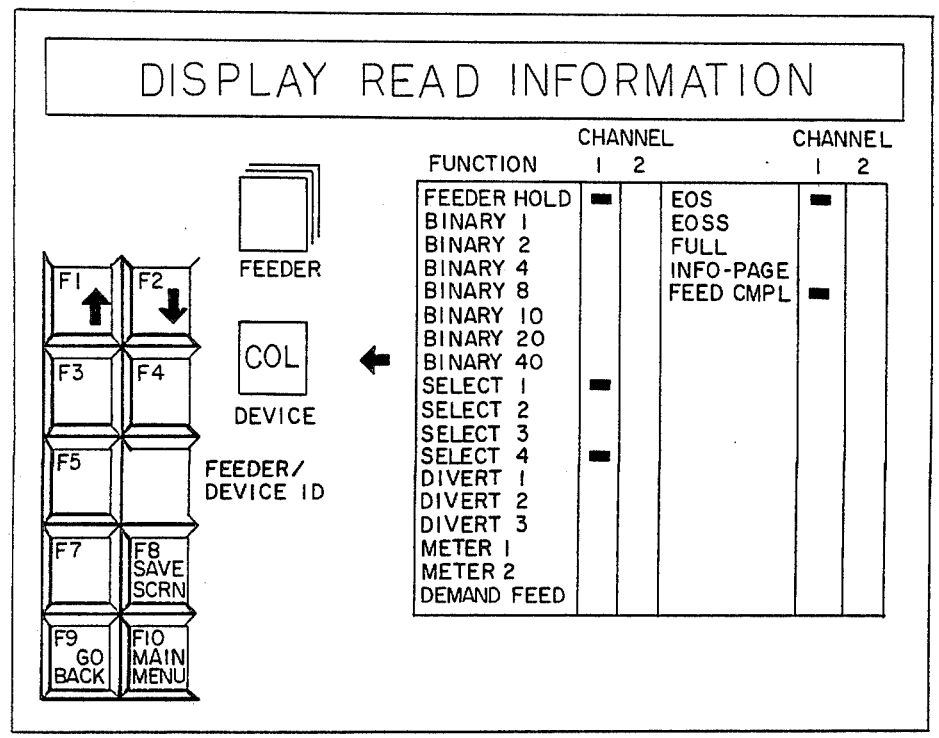

Another example wherein an operator can view insertion machine-related operating output data is provided with reference to display screen DEVINFO of FIG. 22E. The generation of display screen DEVINFO is prompted by the pressing of appropriate keys on keyboard 720 upon the viewing of the display screen MAINMENU and READMENU. Using either the function key "F1" or "F2" when viewing screen DEVINFOR the operator can select the device for which information (such as read indicia information) is to be displayed on the display screen DEVINFO.

In the above regard, it will be recalled that certain system stations can comprise a plurality of devices, and that each device for a given system station has associated therewith a device number. For example, the system control station 42 shown in the embodiment of FIG. 1A and illustrated in the display screen DEVINFO of FIG. 22E has a feeder device 42A and a collector device 42B. Thus, using the function keys "F1" and "F2", the operator can indicate whether it is desired to view information related to the indicia of the group currently in the collector 42B or of the group currently in the feeder 42A. Upon the pressing of either the "F1" or "F2" key on the keyboard 720 a new PC-TO-95 COMMAND 10 is generated. The PC-TO-95 COMMAND 10 is used to download to the DPS1 100' the station identification number and device identification number for the device for which the operator wishes to observe the indicia-related information on the documents currently being handled by that device. The PC Manager 1006 thus instructs the PC-TO-95 COMMAND formatter 1010 to prepare the PC-TO-95 COMMAND 10 which is transmitted via the output drive 1012 to the DPS1 100'.

Upon receiving the PC-TO-95 COMMAND 10 by the DPS1 100', the concurrent process PC_INT resumes its execution and branches to step 894 at which the third byte of the command is moved into memory location STAID. Likewise, at step 896 the fourth byte of the PC-TO-95 COMMAND 10 is moved into memory location DEVID. The two locations STAID and DEVID are periodically checked by numerous concurrent processes associated with the system stations included in a configuration. Each device comprising a system station has a corresponding data buffer in memory in which data including indicia-read data for the group currently being handled by the device is stored. As a group of document is transferred from one device to another, the information from the transferring device's buffer is copied into the transferred device's buffer. The concurrent process associated with each device monitors the contents of the locations STAID and DEVID and, when the contents of those locations match the station number and device number of a selected device, the concurrent process associated with the selected device copies its associated buffer into the buffer SENDBUF; signals the semaphore PCCMD(9); and, signals the semaphore PCSEND. Upon the signalling of semaphore PCSEND the concurrent program IBM_PC executes for the 95-TO-PC COMMAND and the steps 818 and 820 shown in FIG. 15, resulting in the transmission of the 95-TO-PC COMMAND 9 to the DPS2 700. In the illustrated embodiment a 95-TO-PC COMMAND 9 is generated for the collector of the control station 42 by a concurrent processes AIX_OPR.

Upon receipt of the 95-TO-PC COMMAND 9 by the input driver 1002 of the DPS2 700, the subroutine CMDINTR branches to step 1068 at which the contents of bytes 3 through 60 of the 95-TO-PC COMMAND 9 are loaded into memory locations DEV_INFO. The PC Manager 1006 makes the data and memory location DEV_INFO available to the screen generator 1016 and causes the screen generator 1016 to generate the display screen DEVINFO of FIG. 22E on the monitor 718. As seen in FIG. 22E, marks for the respective indicia fields for the group at the device specified by the user are shown by a rectangular block associated with the described indicia field.

In the operation of an insertion machine a DEMAND FEED condition can occur. As mentioned before, the demand feed condition is entered when it is determined that a reading gripper station requires another machine cycle in order to feed therefrom a second document to be associated with a group currently before the reading gripper station on the insert track 30. In such a case the insert track 30 is decoupled from its intermittently rotating drive shaft for one machine cycle, thereby permitting the Insert track 30 to remain essentially stationary for another machine cycle so that the reading station can feed another document onto the insert track 30 at the location where the group is situated. Upon the detection of a DEMAND FEED condition, as by an interrupt from a reading device, a 95-TO-PC COMMAND 7 is generated by the concurrent program associated with the reading gripper station with both semaphores PCCMD(7) and PCSEND being signalled. In the manner described above the concurrent program IBM_PC supervises the transmission of the 95-TO-PC COMMAND 7 to the DPS2 700.

Upon receipt of the 95-TO-PC COMMAND 7, the command interpreter 1004 of the DPS2 700 sets a flag DEMAND_FEED at step 1144. While the flag DEMAND_FEED is set a screen display OVRSTAT appears on the monitor 718 The next 95-TO-PC COMMAND 1 generated by the DPS1 100' concerns the machine cycle in which the DEMAND FEED condition is in effect. The 95-TO-PC COMMAND 1 generated during the DEMAND FEED mode is handled by the CMDINTPR of DPS2 700 in the same manner as are all other 95-TO-PC COMMANDS 1, it being understood that, with the exception of data in the 95-TO-PC COMMAND 1 which relates to the reading gripper station, the data in the 95-TO-PC COMMAND 1 is essentially blank and has no effect upon the audit counters. The audit counter for the reading gripper station is, of course, incremented. When the DEMAND FEED condition is cleared, a 95-TO-PC COMMAND 8 is generated and transmitted by the concurrent program IBM_PC. Receipt of the 95-TO-PC COMMAND 8 results in the clearing of the flag DEMAND_FEED at step 1146 of the subroutine CMDINTR.

In the operation of an insertion machine an OVERRIDE condition can also occur. The OVERRIDE condition is entered when a device associated with a system station other than a reading gripper station determines that more than one machine cycle is required in order to completely feed all documents belonging to a subgroup onto the insert track 30. The concurrent process included in a concurrent program associated with the system station notes the existence of the OVERRIDE condition and prepares a 95-TO-PC COMMAND 5 upon entry of the OVERRIDE condition. Upon entry of the OVERRIDE condition the main timing shaft and intermittent shaft of the insertion machine become stopped at the point in the machine cycle indicated by the value of the downloaded input parameter OVRTIM, which is preferably at about 140 degrees of machine cycle. In the process of preparing the 95-TO-COMMAND 5 the concurrent process associated with the system station also signals the semaphores PCCMD(5) and PCSEND, thereby enabling the concurrent program IBM_PC to transmit the 95-TO-PC COMMAND 5 to the DPS2 700.

Upon receipt of the 95-TO-PC COMMAND 5 the CMDINTR 1004 of DPS2 700 sets a flag OVERRIDE (at step 1140) which is used by the PC Manager 1006 to direct the screen generator 1016 to generate a display screen OVRSTAT on the monitor 718. As long as the downloaded parameter OVRTIM indicates an OVERRIDE entry point in the machine cycle prior to 280 degrees, no 95-TO-PC COMMANDS 1 are generated during the OVERRIDE condition, and the audit counters are not affected (nor should they be since the value of FDRCNT for the previous machine cycle included the number of documents fed during the OVERRIDE condition). While the flag OVERRIDE is set in the DPS2 700, the operator is precluded from downloading any machine operating input parameters, even though the insertion machine is technically stopped. Upon exit of OVERRIDE, the concurrent process (such as concurrent process AIX_OPR) associated with the affected system station generates a 95-TO-PC COMMAND 6 and signals the semaphores PCCMD(6) and PCSEND. Concurrent program IBM_PC transmits the 95-TO-PC COMMAND 6 to the DPS2 700, whereat CMDINTR 1004 clears the flag OVERRIDE (at step 1142) to rid monitor 718 of the display screen OVRSTAT.

When an ALERT AND CLEAR condition occurs documents belonging to a second batch are held up at a collector device or the like comprising the control station while the last groups included in the first batch are indexed down the insert track 30. An ALERT AND CLEAR condition is entered when a concurrent process associated with a device such as the collector 42B of the control station 42 detects the indication of the ALERT AND CLEAR condition (as by indicia on a control card) and prompts the generation of a 95-TO-PC COMMAND 10 by signalling the semaphore PCCMD(10) and the semaphore PCSEND. As described in connection with other commands the concurrent program IBM_PC supervises the transmission of the 95-TO-PC COMMAND 10 to the DPS2 700.

Upon receipt of the 95-TO-PC COMMAND 10 the DPS2 700 by its command interpreter 1004 sets a flag ALERT_CLEAR. The setting of the flag ALERT_CLEAR prompts the generation of a screen display ACFEEDSP. During the ALERT AND CLEAR condition, subsequent 95-TO-PC COMMANDS 1 generated during the ALERT AND CLEAR have essentially empty data fields and have no affect upon the audit counters of DPS2 700. The flag ALERT_CLEAR is set until the operator hits a designated key on the keyboard 720 in response to the prompt of screen ACFEEDSP to clear the ALERT AND CLEAR condition. Upon pressing of the appropriate key on the keyboard 720 to clear the ALERT AND CLEAR condition, the PC Manager 1006 instructs the PC-TO-95 command formatter 1010 to generate a PC-TO-95 COMMAND 11, which informs the DPS1 100' that the ALERT AND CLEAR condition has been removed. In addition, pressing of the appropriate key as prompted by the screen display ACFEEDSP clears the flag ALERT_CLEAR so that the subsequent 95-TO-PC COMMAND 1 is not ignored.

If a procedure or concurrent process associated with a system station detects the occurrence of a "fault" at the system station, the insertion machine enters a FAULT mode. The detected faults can be of various types, the fault types being understood with reference to the 95-TO-PC COMMAND 3 of Chart 1. For example, if the concurrent process associated with a system station determines that the system station is expected to feed a number of documents which exceeds a preset maximum limit (the present maximum limit having been downloaded by a PC-TO-95 COMMAND 4 into array TWLVAL), a fault of type 7 (known as a high count fault) occurs.

Upon the detection of a fault such as a type 7 (high count) fault when buffer SENDBF is available the associated procedure or concurrent process prepares a 95-TO-PC COMMAND 3 by (1) filling buffer SENDBF with data (as described with reference to the 95-TO-PC COMMAND 3 format of Chart 1); (2) signalling semaphore PCCMD(3); and (3) signalling semaphore PCSEND. For a fault type 7 occurring in the configuration of embodiment FIG 1A, for example, concurrent process AIX OPR associated with control station 42 instructs procedure AIX_PCF to generate a 95-TO-PC COMMAND 3. In preparing the command, procedure AIX_PCF inter alia puts a "7" in the third byte of the command as an indication of the fault type; puts the ID number of station 42 in the fourth byte of the command to indicate the station whereat the fault occurred; puts a number in the fifth byte of the command to indicate at what device (either the collector device 42B or the feeder device 42A) the fault occurred; puts an indication in the seventh byte of the command whether the DPS1 100' must generate a 95-TO-PC COMMAND 4 (to acknowledge recovery of the fault); and, puts the prohibited number of documents which the station would have then attempted to feed into the eighth and ninth bytes of the command. As described hereinbefore in connection with other commands, the signalling of semaphore PCSEND ultimately results in the transmission of the 95-TO-PC COMMAND 3 by the concurrent program IBM PC to the DPS2 700.

Upon receipt of the 95-TO-PC COMMAND 3 by the DPS2 700, the CMDINTR 1004 branches to step 1122 of FIG. 20 whereat flag FAULT_FLG is set. At step 1124 the data included in the 95-TO-PC COMMAND 3 is loaded into an array FLT ARY. The PC Manager 1006 uses the data in the array FLT ARY including data indicative of the fault type to direct the screen generator 1016 to generate an appropriate display on monitor 718. For example, for the fault type 7 the display screen HCS as shown in FIG. 22G occurs on monitor 718. The names of other display screens displayable on monitor 718 as a result of the occurrence of fault types (understood with reference to the 95-TO-PC COMMAND 3 format of Chart 1) are shown in FIG. 21.

For some fault types the operator need merely press a key on keyboard 718 to confirm that the operator has taken whatever action is necessary in order to remedy the fault. For some fault types sensors associated with the system station must sense an indication of the remedial action. In the latter case, upon receiving an indication of the remedial action a procedure cr concurrent process associated with the system station generates a 95-TO-PC COMMAND 4 and signals the semaphores PCCMD(4) and PCSEND. In like manner as described before in connection with other commands, the 95-TO-PC COMMAND 4 is transmitted by concurrent program IBM_PC to the DPS2 700.

Upon receipt of the 95-TO-PC COMMAND 4, the CMDINTR 1004 of DPS2 700 performs steps 1130 and 1132 of FIG. 20 which make it possible for the operator to press a key on keyboard 720 to confirm that the operator has taken the necessary action to remedy the fault. Once the key is pressed, the DPS2 700 generates a PC-TO-95 COMMAND 2 to notify the DPS1 100' that all fault errors have been cleared.

Figure 17:
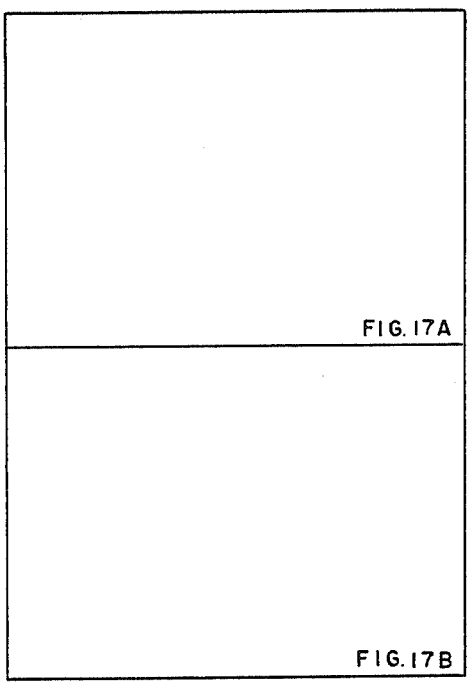
FIG. 17 is a schematic diagram illustrating the relationship of FIGS. 17A and 17B.
Figure 17A:
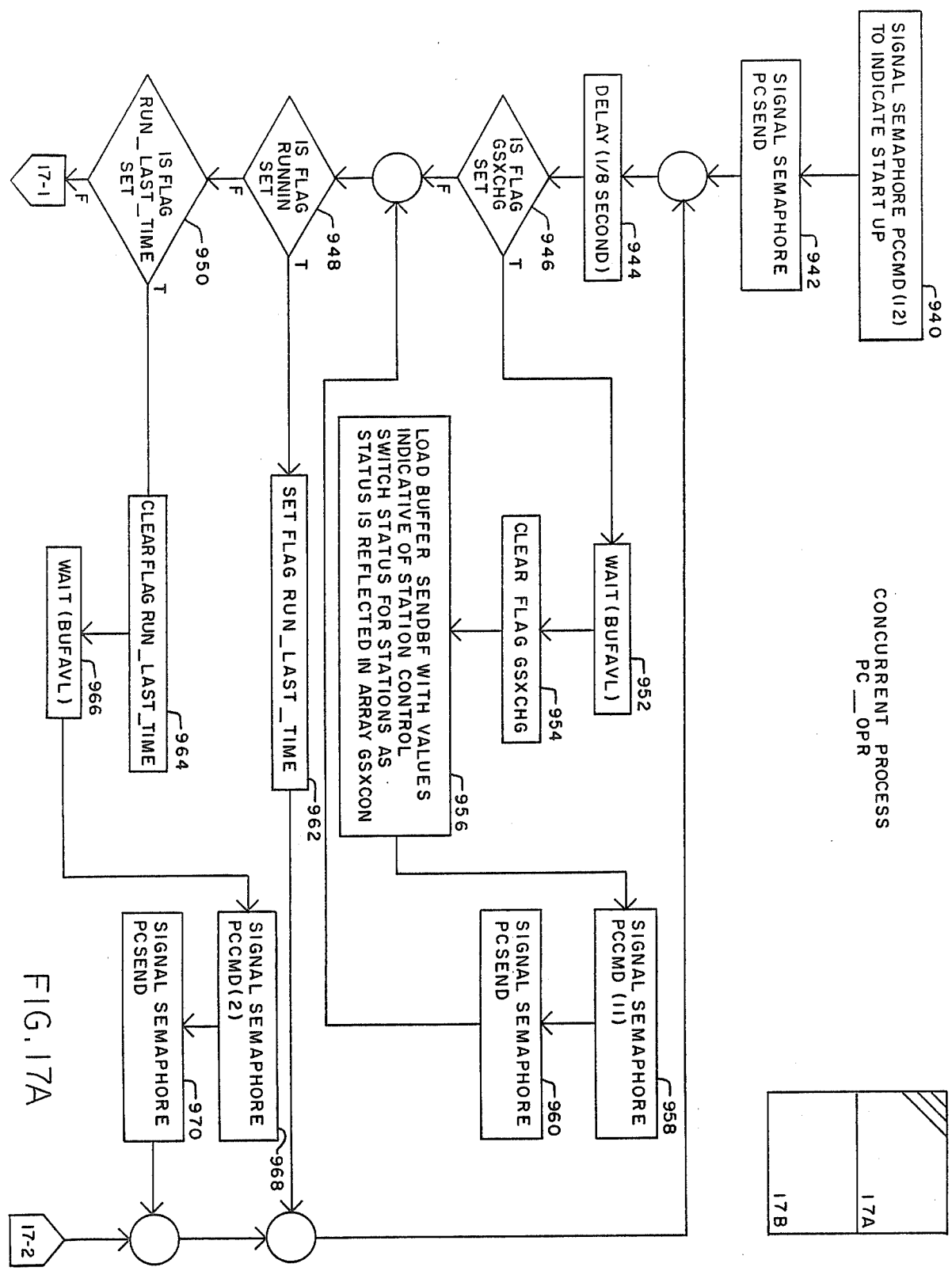
FIGS. 17A and 17B are schematic diagrams illustrating execution operations associated with a concurrent process $PC_{13}$ OPR.
Figure 17B:
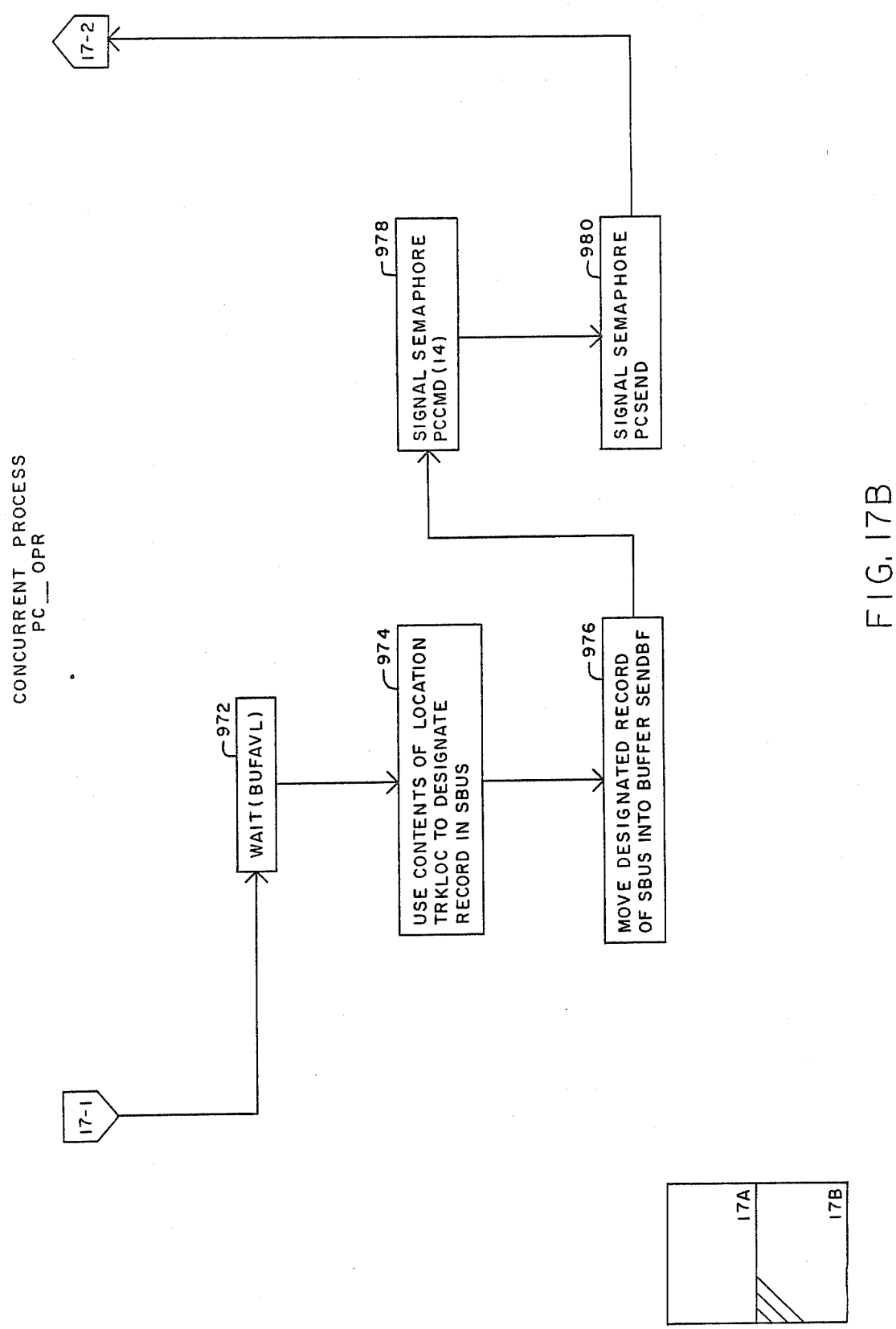

As the insertion machine runs, the signal on line 136 in the machine cycle detection circuit 114 (see FIG. 3) is continually monitored by the concurrent program MMONITOR. As long as the main timing shaft is rotating, the program MMONITOR keeps a flag RUNNIN in a set condition. If the main timing shaft stops rotating, the flag RUNNIN is cleared. As is shown in FIG. 17, every $\frac{1}{8}$ second the concurrent process PC_OPR checks the status of flag RUNNIN (step 948). As long as the flag RUNNIN remains set, a flag RUN_LAST_TIME remains set.

Should the insertion machine timing shaft stop rotating (as occurs during a fault, for example), and the flag RUNNIN accordingly be cleared, process PC OPR branches to step 950. Upon the first execution of step 950 the flag RUN_LAST_TIME will still be set, indicating that a 95-TO-PC COMMAND 2 must be generated. To generate a 95-TO-PC COMMAND 2, flag RUN LAST_TIME is cleared and, when the buffer SENDBF is available, the semaphores PCCMD(2) and PCSEND are signalled in sequence. In the manner described before in conjunction with other commands, the program IBM_PC then transmits the 95-TO-PC COMMAND 2 to the DPS2 700.

Upon receipt of the 95-TO-PC COMMAND 2, the CMDINTR 1004 of DPS2 700 branches to step 1120 of FIG. 20 whereat flag STOPPED is set. When the PC Manager 1006 notes that the flag STOPPED has been set, the PC Manager (1) determines the actual run time elapsed since the most recent machine start; (2) adds the elapsed actual run time to the FRAME1 running time audit timer; and (3) stores the calendar clock time of the stop for future access and comparison.

After preparing its 95-TO-PC COMMAND 2, the concurrent process PC_OPR loops back to step 944. After a $\frac{1}{8}$ second delay, if the flag RUNNIN is still cleared (i.e., the machine timing shaft is still stopped), the status of flag RUN_LAST_TIME is checked at step 950. With the flag RUN_LAST_TIME having been cleared at step 964 during the preceding loop of PC OPR, process PC_OPR realizes that a 95-TO-PC COMMAND 2 has already been prepared and that a 95-TO-PC COMMAND 14 should be generated. As is understood with reference to Chart 1, the 95-TO-PC COMMAND 14 partially resembles the data included in a 95-TO-PC COMMAND 1 in that a portion of the SBUS record for the group located at position "TRKLOC" is included in the command. To prepare the 95-TO-PC COMMAND 14, PC OPR executes the following steps: (1) awaits availability of buffer SENDBF (step 972); (2) uses the contents of location TRKLOC to determine what record in SBUS is to be utilized (step 974); (3) moves a portion of the designated record of SBUS into the buffer SENDBF (step 976); and (4) signals the semaphores PCCMD(14) and PCSEND. In the manner described hereinbefore with reference to other commands, program IBM PC transmits the 95-TO-PC COMMAND 14 to the DPS2 700.

Upon receipt of the 95-TO-PC COMMAND 14, the CMDINTR 1004 of DPS2 700 branches to steps 1162 and 1164 whereat appropriate flags are set and whereat the bus image data from the command is loaded into an array BUS_DATA_CMD14. At the direction of the PC Manager 1006 the screen generator 1016 can, when requested, use the data in array BUS_DATA_CMD14 to generate the display screen TRACKINFO.

When the insertion machine is again started after being stopped, the DPS2 700 knows of the start by virtue of the receipt of a new 95-TO-PC COMMAND 1. When the DPS2 700 realizes that the insertion machine has again been started, the PC Manager 1006 executes the following steps: (1) obtains the "start" calendar time from clock 711; (2) subtracts the last previously-referenced calendar time from the first-obtained start calendar time; (3) adds the subtraction result of (2) to the fault time audit timer; and (4) stores the just-obtained start calendar time as the last referenced calendar time.

Figure 22F:
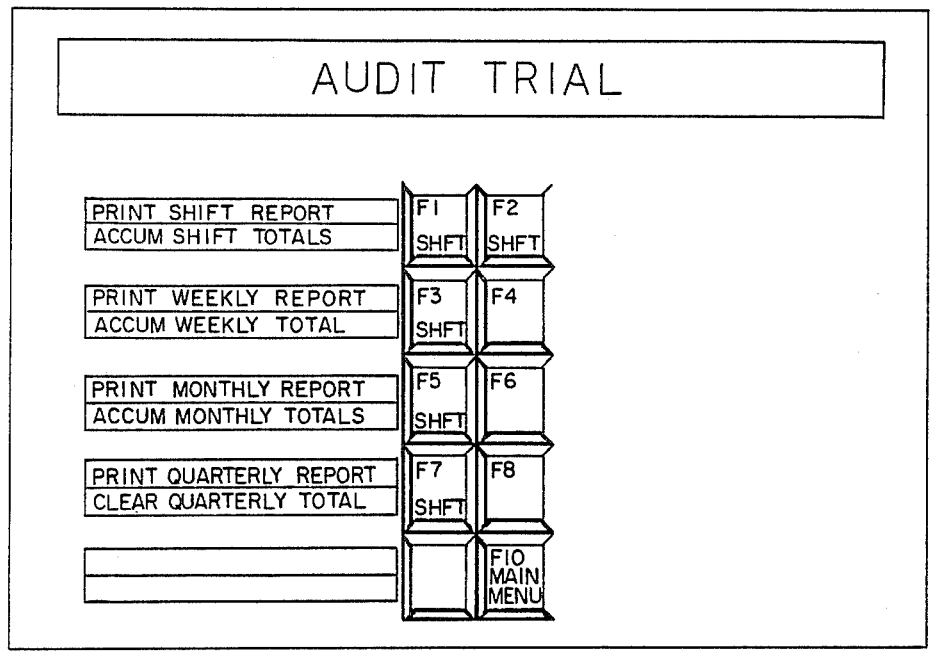
Figure 22:
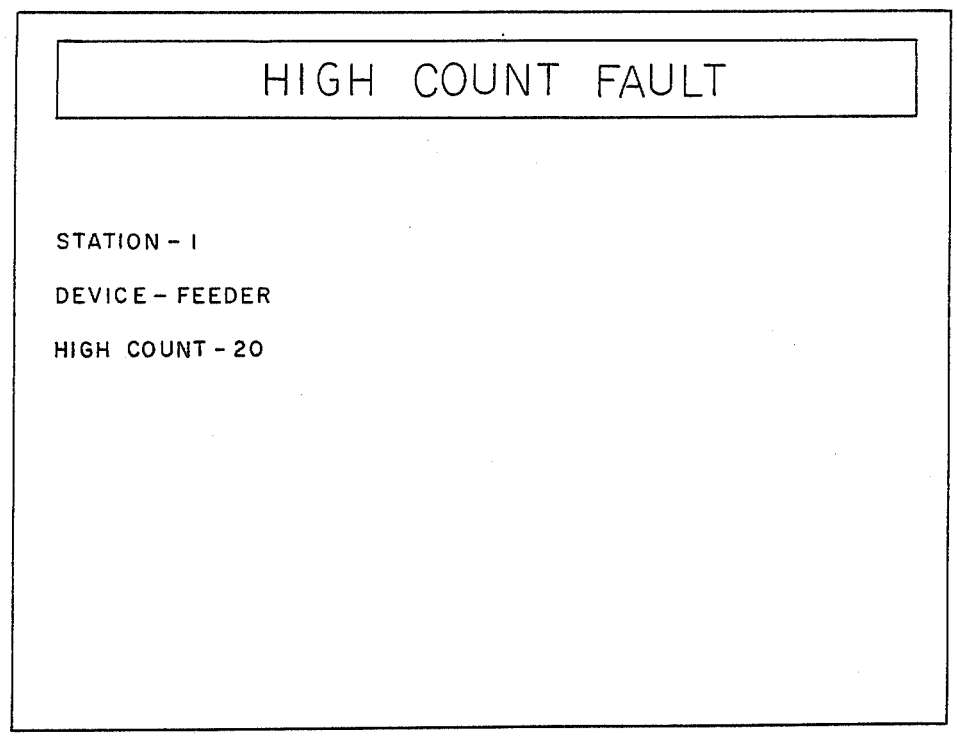

FIG. 22F shows the screen display AUDIT which is selectively displayable on the monitor 718. As prompted by the display AUDIT, the operator can provide input via keyboard 720 to direct the PC Manager 1006 to enter the AUDIT TRAIL mode. As seen hereinafter, the operator can provide input on keyboard 720 as to result in the generation of a printed report or to accumulate values in the various audit counters. When a function key other than "F10" is pressed on keyboard 720, program PC Manager 1006 calls subroutine 1014 (AUDIT TRAIL_PROCESSING) and provides to subroutine AUDIT TRAIL_PROCESSING an indication as to whether a printout or accumulation is required, and for what time frame the printout or accumulation is required.

Figure 23:
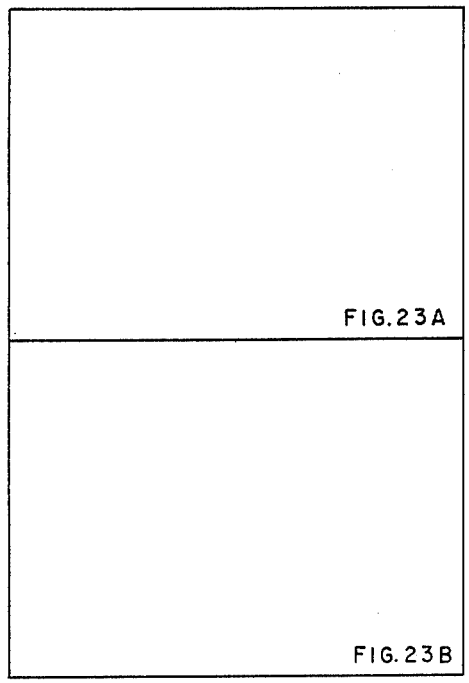
FIG. 23 is a schematic diagram showing the relationship between FIGS. 23A and 23B.
Figure 23A:
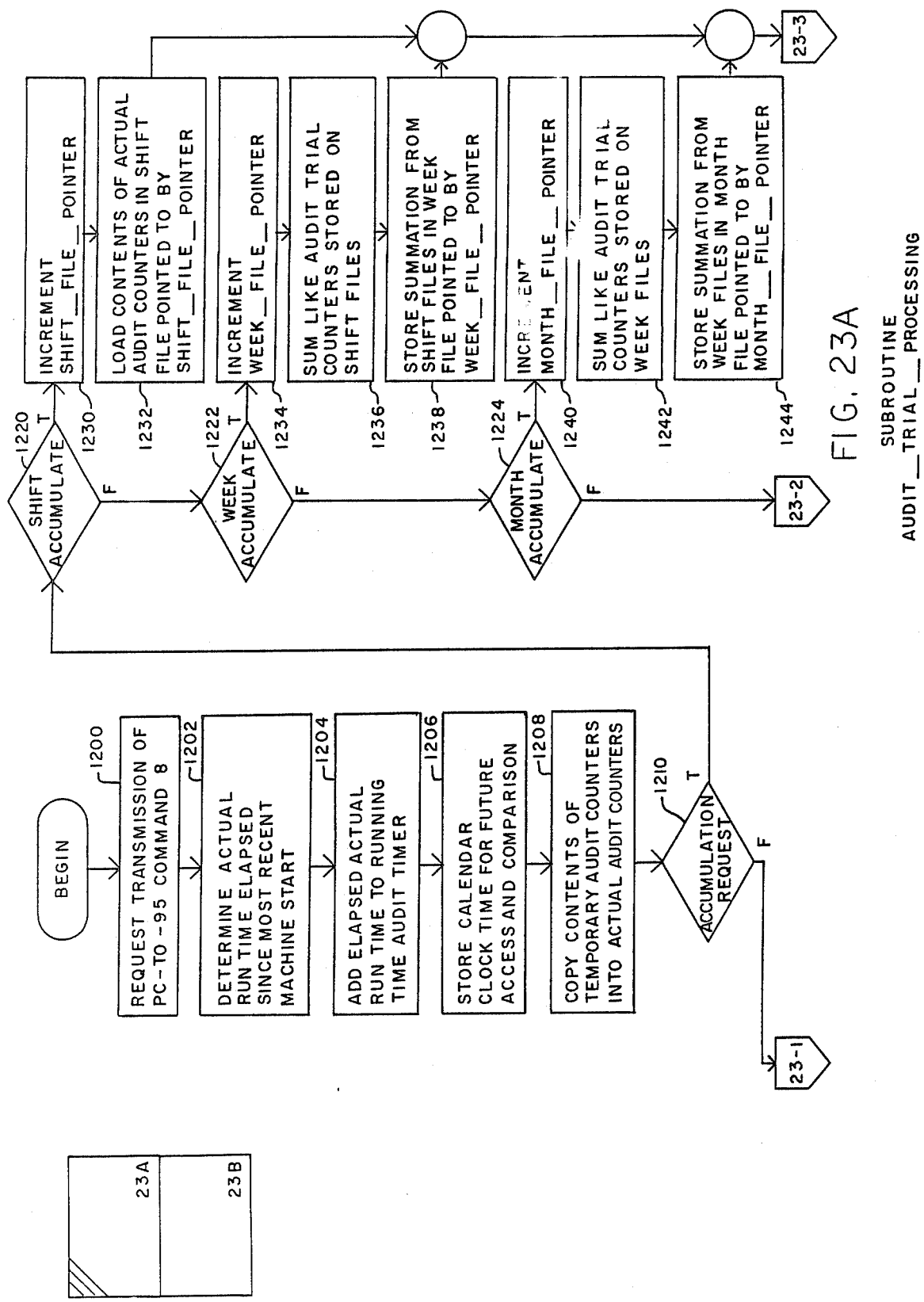
FIGS. 23A and 23B are schematic diagrams illustrating execution operations associated with a subroutine AUDIT_TRAIL_PROCESSING of the embodiment of FIG. 1A; and, FIG. 24 is a schematic diagram depicting various files included on a hard disc storage medium associated with the embodiment of FIG. 1A.
Figure 23B:
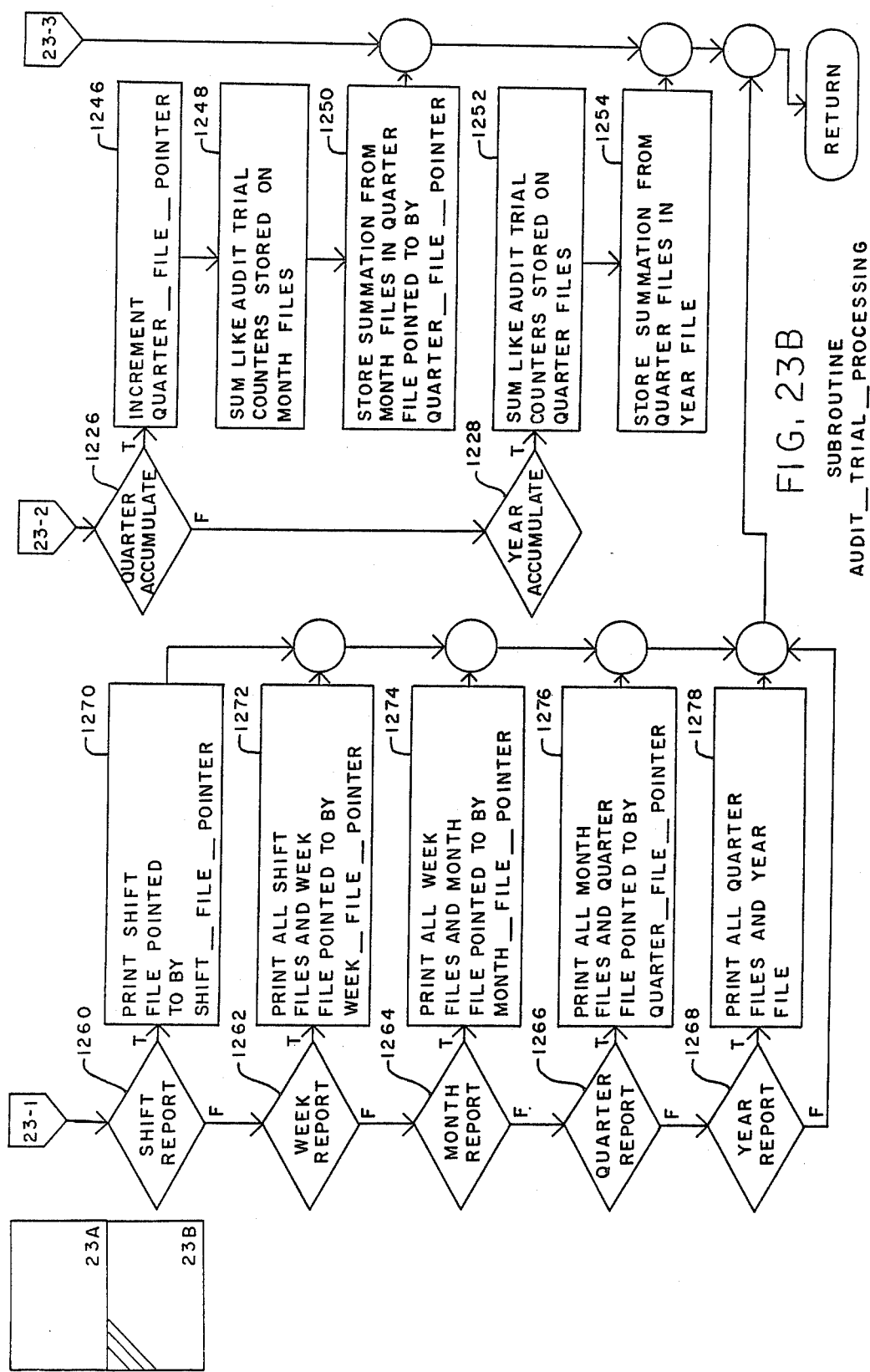

FIG. 23 shows steps executed by the subroutine AUDIT_TRAIL_PROCESSING. At step 1200 the subroutine requests the PC Manager 1006 to direct the Command Formatter 1010 and the Output Driver 1012 to prepare and transmit a PC-TO-95 COMMAND 8 to the DPS1 100'. Upon receipt of the PC-TO-95 COMMAND 8, the concurrent process PC_INT clears flag ERRCLR, which causes a hard fault of the insertion machine (stopping the rotating main timing shaft). In this respect, the insertion machine must be stopped while AUDIT_TRAIL processes are performed lest continuing machine operations go uncounted.

After effectively hard faulting the insertion machine, the subroutine AUDIT_TRAIL_PROCESSING (1) determines the actual run time elapsed since the most recent machine start (step 1202); (2) adds the elapsed actual run time to the running time audit time (Step 1204); and (3) stores the calendar clock time of the stop for future access and comparison (step 1206).

At step 1208 the subroutine AUDIT_TRAIL PROCESSING copies the contents of the temporary AUDIT TRAIL counters into the actual counters. For example, the contents of AUD_CNT_ENV[0] is copied into counter AUD_CNT_ENV[1]. Similar copies are made with respect to each of the audit counters listed in Chart 4.

At step 1210 a determination is made whether an accumulate function or printout function has been requested with respect to the AUDIT TRAIL mode. If an accumulate function has been requested a logical determination is made (steps 1220, 1222, 1224, 1226, and 1228) regarding the type of AUDIT TRAIL file (i.e., shift file, week file, month file, quarter file, or year file) for which the accumulation is to occur.

If it is determined at step 1220 that the accumulation is for a shift file, pointer SHIFT_FILE POINTER is incremented (at step 1230) and the contents of the actual audit counters are loaded into corresponding locations in the shift file pointed to by the contents of SHIFT_FILE_POINTER (step 1232). If, on the other hand, it is determined at step 1222 that the accumulation is for a week file, the pointer WEEK_FILE POINTER is incremented at step 1234. Then, at step 1236, the contents of like AUDIT TRAIL counters stored on the shift files are summed. As an example, values representing the number of envelopes fed for each shift are summed for each shift beginning with SHIFT1 and ending with SHIFTX (where X=the contents of SHIFT_FILE POINTER). Thereafter, at step 1238, the summation from step 1236 is stored in the week file pointed to by WEEK FILE_POINTER. From FIG. 23 it is seen that comparable steps are executed with respect to a month accumulate request (steps 1240, 1242, and 1244); a quarter accumulate request (steps 1246, 1248, and 1250); and, a year accumulate request (steps 1252 and 1254). During the accumulate request the PC Manager 1006 supervises the interaction of the AUDIT_TRAIL_PROCESSING subroutine 1014 and the hard disc handler 1018.

If an AUDIT TRAIL printout is requested as determined at step 1210, the PC Manager 1006 supervises the generation by the printer handler 1022 of a statistical report. In this respect the numerical contents of the audit trail counters of Chart 4 are printed in association with appropriate printed label text. The computation and printing of the number of envelopes per hour, the number of envelopes per actual running hour and the average machine cycle speed essentially resemble even numbered steps 562 through 572 of FIG. 10.

In generating its statistical report the subroutine AUDIT_TRAIL_PROCESSING determines at steps 1260, 1262, 1264, 1266, and 1268, whether the requested report is for a shift, week, month, quarter, or year, respectively. If the requested report is for a shift, at step 1270 the PC Manager 1006 is requested to direct the printer handler 1022 to print the shift file pointed to by the location SHIFT_FILE_POINTER. If the requested report is for a week, at step 1272 the PC Manager 1006 is requested to direct the printer handler 1022 to print all the shift files (as separate reports) and the week file pointed to by location WEEK_FILE_POINTER. Similar steps are executed upon a month report request (step 1274); a quarter report request (step 1276); and a year report request (step 1278).

While the invention has been particularly shown and described with reference to the preferred embodiments thereof, it will be understood by those skilled in the art that various alterations in form and detail may be made therein without departing from the spirit and scope of the invention.

The embodiments of the invention in which an exclusive property or privilege is claimed are defined as follows:

1. A method of monitoring a plurality of operations performed by a machine of the type in which a plurality of feed stations selectively feed documents onto an insert track for inclusion with a group of related documents, said method comprising the steps of:
    establishing an initiation time for a first time base during which said plurality of operations are to be monitored;
    counting, over said first time base, the number of events associated with each of said plurality of operations;
    establishing at least a temporary termination time for said first time base at which said count is at least temporarily terminated; and, averaging the number of events counted over said first time base to obtain an indication with respect to one of said operations of the number of events occurring per unit of time.

2. A method of monitoring a plurality of operations performed by a machine of the type in which a plurality of feed stations selectively feed documents onto an insert track for inclusion with a group of related documents, said method comprising the steps of:
- establishing an initiation time for a first time base during which said plurality of operations are to be monitored;
- counting, over said first time base, the number of events associated with each of said plurality of operations;
- establishing at least a temporary termination time for said first time base at which said count is at least temporarily terminated; and,
- providing an indication of the number of events counted over said first time base with respect to each of said plurality of operations, and wherein said plurality of operations includes a stoppage of said machine.

3. A method of operating a machine of the type wherein, in accordance with a machine cycle, a plurality of feed stations selectively feed documents onto an insert track for inclusion with a group of documents, said method comprising the steps of:
- (a) determining the number of documents fed from one of said feed stations;
- (b) determining a machine cycle speed at which said machine is operating;
- (c) providing an indication of the determinations made in steps (a) and (b); and,
- (d) using said indications in order to adjust said machine cycle speed to a preferred speed.

4. A method of operating a document handling machine of the type in which a plurality of types of processing stations perform processing events in coordinated manner to associate related documents in a group and to at least partially prepare said group of documents for shipment, said plurality of types of processing stations comprising (1) insert processing stations which perform the processing event of feeding documents onto an insert track for inclusion with appropriate groups of documents; and (2) a packaging station which performs the processing event of enveloping a group of documents on said insert track into a packaging medium;
said machine further being of the type in which first data processing means manages the operation of said processing stations, said first data processing means comprising (1) first processor means for executing coded instructions including coded instruction suitable for use in controlling the operation of said processing stations; (2) first memory means for storing data and coded instructions; and , (3) first I/O means for facilitating input and output operations with respect to said first data processing means, said method comprising the steps of:
providing a data bus in said first memory means, said data bus comprising a number N of data records related to a number of groups of documents movable on said insert track, each data record comprising record elements for storing informational data relative to processing events performable by various ones of said processing stations with respect to the group of documents associated with its data record,
configuring said instructions executed by said first data processing means to load machine-related output data into an output buffer included in said first memory means;
loading into said output buffer at a predetermined point in a given machine cycle at least a portion of the informational data included in a record in said data bus then associated with a predetermined physical position on said insert track;
loading into said output buffer at said predetermined point in said given machine cycle information indicative of whether certain processing stations performed their respective processing event during the given machine cycle;
providing a second data processing means for processing said machine-related output data loaded into said output buffer of said first data processing means, said second data processing means comprising second processor means for executing coded instructions, second memory means for storing data and coded instructions including coded instructions suitable for processing said machine-related output data loaded into said output buffer of said first data processing means, and second I/O means for facilitating input and output operations with respect to said second data processing means;
using data transmission means to connect said first I/O means and said second I/O means in a manner whereby said machine-related output data in said output buffer of said first data processing means is transmittable to said second data processing means; and,
using said second data processing means to perform arithmetic operations with respect to portions of the machine-related output data loaded into said output buffer and transmitted to said second data processing means over said data transmissions means, said portions of said machine-related output data including (1) informational data included in said record in said data bus then associated with said predetermined physical position on said insert track, and (2) said information indicative of whether certain processing stations performed their respective processing events during said given machine cycle.

5. The method of claim 4, wherein said arithmetic operations performed by said second data processing means include the counting over a first time frame of the number of indications received by said second data processing means of the number of processing events performed by said certain processing stations.

6. The method of claim 4, wherein said predetermined physical positions on said insert track is a downstream-most position.

7. The method of claim 6, further comprising the steps of:
providing locations in said second memoroy means for storing at least a portion of the informational data in said output buffer transmitted to said second data processing means for a plurality M of transmissions;
loading at least a portion of the informational data in said output buffer transmitted to said processing means into one of said locations; and,
maintaining said portion of said informational data in said output buffer for a predetermined number of machine cycles after the group associated with said record from whence said informational data was obtained has left the insert track.

8. The method of claim 7, further comprising the step of providing an indication on indicator means connected to said second data processing means of the contents of said locations whereat said informational data is maintained after the group associated with said record from whence said informational data was obtained has left the insert track.

9. A document handling machine comprising:
insert track means for transporting documents in timed relation to a machine cycle;
a plurality of types of processing stations which perform processing events in coordinated manner to associate related documents in a group and to at least partially prepare said group of documents for shipment, said plurality of types of processing stations comprising:
insert processing stations which perform the processing event of feeding documents onto said insert track means for inclusion with appropriate groups of documents; and,
a packaging station which performs the processing event of enveloping a group of documents on said insert track means into a packaging medium;
first data processing means for managing the operation of said processing stations, said first data processing means comprising first processor means for executing coded instructions including coded instruction suitable for use in controlling the operation of said processing stations, first memory means for storing data and coded instructions, and first I/O means for facilitating input and output operations with respect to said first data processing means, said first data processing means being configured to manage the operation of said processing stations by executing said coded instructions and to load machine-related output data into an output buffer included in said first memory means;
second data processing means for processing said machine-related output data loaded into said output buffer of said first data processing means, said second data processing means comprising second processor means for executing coded instructions, second memory means for storing data and coded instructions including coded instructions suitable for processing said machine-related output data loaded into said output buffer of said first data processing means, and second I/O means for facilitating input and output operations with respect to said second data processing means;
data transmission means for connecting said first I/O means and said second I/O means and whereby said machine-related output data in said output buffer of said first data processing means is transmitted to said second data processing means; and,
indicator means connected to said second data processing means for providing an indication of said machine-related output data.

10. The machine of claim 9, further comprising:
machine cycle detector connected to said first I/O means of said first data processing means and means positioned with respect to said document handling machine for detecting the reaching of certain points in said machine cycle, said certain points in said machine cycle being related to the desired timing of the processing events performable by various ones of said processing stations, and wherein said machine-related output data is loaded into said output buffer at a predetermined point in said machine cycle.

11. The machine of claim 10, further comprising:
a data bus included in said first memory means, said data bus comprising a number N of data records related to a number of groups of documents movable on said insert track, each data record comprising record elements for storing informational data relative to processing events performable by various ones of said processing stations with respect to the group of documents associated with its data record, and wherein at said predetermined point in said machine cycle at least a portion of the informational data included in a record in said data bus then associated with a first predetermined physical position on said insert track is loaded into said output buffer.

12. The machine of claim 11, wherein at said predetermined point in said machine cycle informational data included in a record in said data bus then associated with a second pre-determined physical position on said insert track is also loaded into said output buffer.

13. The machine of claim 9, further comprising a fault detector connected to said first I/O means of said first data processing means and positioned with respect to an associated processing station included in said document handling machine for detecting the occurrence of a faulty processing event at said associated processing station, and wherein machine-related output data indicative of said faulty processing event is loaded into said output buffer upon the detection by said fault detector of said faulty occurrence.

14. The machine of claim 13, further comprising a plurality of fault detectors connected to said first I/O means of said first data processing means, said plurality of fault detectors being positioned with respect to a plurality of types of correspondingly associated processing stations included in said document handling machine for detecting the occurrence of a plurality of types of faulty processing events, and wherein said machine-related output data indicative of a faulty processing event which occurred at a faulty processing station is loaded into said output buffer upon the detection of said faulty occurrence by said fault detector associated with said faulty station 15. The machine of claim 26, wherein said machine-related output data loaded into said ouput buffer includes an indication of the type of fault detected and the processing station at which the fault was detected.

16. The machine of claim 21, wherein said machine-related output data is loaded into said output buffer included in said first memory means in response to a machine-related input command generated by said second data processing means and transmitted to said first data processing means over said data transmission means.

17. The machine of claim 16, further comprising data entry means connected to said second data processing means for enabling said second data processing means to generate said machine-related input command.

18. The machine of claim 9, wherein said second data processing means performs an arithmetic operation with respect to at least a portion of the machine-related output data loaded into said output buffer and transmitted to said second data processing means over said data transmission means.

19. The machine of claim 18, wherein said machine-related output data loaded into said output buffer includes an indication to which one of a plurality of postage classifications a group of documents belongs, and wherein said arithmetic operation performed by said second data processing means includes the counting of the number of groups of documents belonging to each postage classification.

20. The machine of claim 18 further comprising:
means for detecting a specified condition associated with a group of documents;
means for diverting from said insert track said group of documents in connection with which said specified condition was detectced;
wherein said machine-related output data loaded into said output buffer includes an indication of the detection of said specified condition; and,
wherein said arithmetic operation performed by said second processing means includes the counting of the number of groups of documents for which said specified condition is detected.

21. The machine of claim 18, wherein said machine-related output data loaded into said output buffer includes an indication of whether a processing event was performed by a given processing station for a group of documents, and wherein said arithmetic operation performed by said second data processing means includes tne counting of the number of groups of documents for which the given processing station has performed its processing event.

22. The machine of claim 18, further comprising a storage medium connected to said second data processing means to which is written information indicative of the result of said arithmetic operation performed by said second data processing means.

23. The machine of claim 22, wherein said information indicative of the result of said arithmetic operation is periodically written to a non-volatile storage medium.

24. The machine of claim 18, further comprising data entry means connected to said second data processing means for entering a directive to said second data processing means, wherein in response to a particular directive said second data processing means causes information indicative of said arithmetic operation performed by said second data processing means to be written to said storage medium, and wherein said second data processing means generates a stop command which is transmitted to said first data processing means by said data transmission means whereby processing events cannot be performed at least while said information indicative of said arithmetic operation is being written to said storage medium.

25. A document handling machine comprising:
insert track means for moving groups of documents in timed relation to a machine cycle;
a plurality of types of processing stations which perform processing events in coordinated manner to associated related documents in a group and to at least partially prepare said group of documents for shipment, said plurality of types of processing stations comprising:
insert processing stations which perform the processing event of feeding documents onto said insert track means for inclusion with appropriate groups of documents; and,
a packaging station which performs the processing event of enveloping a group of documents on said insert track means into a packaging medium;
first data processing means for managing the operation of said processing stations of said document handling machine, said first data processing means comprising first processor means for executing coded instructions including coded instructions suitable for use in controlling the operation of said processing stations, first memory means for storing coded instructions and data including downloaded input parameters, and first I/O means for facilitating input and output operations with respect to said first data processing means, said data processing means being configured to manage the operation of said processing stations by executing said coded instructions;
second data processing means for downloading said machine-related input parameters to said first data processing system, said second data processing means comprising second processor means for executing coded instructions, second memory means for storing data and coded instructions, and second I/O means for facilitating input and output operations with respect to said second data processing means; and,
data transmission means connecting said first I/O means and said second I/O means whereby said machine-related input parameters are transmitted from said second data processing means to said first data processing means;
data entry means connected to said second data processing means for entering said machine-related input parameters into said second memory means.

26. The machine of claim 25, wherein said machine-related input parameters downloaded from said second data processing means to said first data processing means includes a parameter that influences the selective feeding of documents from one of said insert processing stations.

27. The machine of claim 26, wherein said machine-related input parameters downloaded from said second data processing means to said first data processing means includes a parameter that specifies that an insert processing station which performs the processing event of feeding documents into said insert track means is to selectively feed a document therefrom for inclusion with a related group of documents in accordance with sensed indicia provided on a control document belonging to said group.

28. The machine of claim 26, wherein said machine-related input parameters downloaded from said second data processing means to said first data processing means includes a parameter that specifies that an insert processing station which performs the processing event of feeding documents onto said insert track may feed a document therefrom for inclusion with a related group of documents if the feeding of said document will not increase the weight of said group of documents sufficiently to change the postal weight classification of said group of documents.

29. The machine of claim 25, wherein said machine-related input parameters downloaded from said second data processing means to said first data processing means includes a parameter which is indicative of the per document weight of documents stored at one of said insert processing stations, and wherein said per document weight parameter is stored in said first memory means and utilized by said first data processing means in the calculation of a projected weight of a group of documents.

30. The machine of claim 25, wherein said machine-related input parameters downloaded from said second data processing means to said first data processing means includes a parameter which is indicative of a maximum number of documents which one of said insert processing stations is permitted to feed with respect to any one group of documents.

31. The machine of claim 25, wherein one of said insert processing stations which performs the processing event of feeding documents onto said insert track means has sensing means associated therewith for sensing information relative to at least one document fed therefrom, and wherein said machine-related input parameters downloaded from said second data processing means to said first data processing means includes a parameter indicative of whether said sensing means is to be utilized to sense said information.

32. The machine of claim 31, wherein said first data processing means is configured to determine whether information sensed by said sensing means with respect to a document fed for inclusion with a particular group corresponds to information provided on a control document also belonging to said group.

33. The machine of claim 25, further comprising detector means positioned with respect to said insertion machine for detecting the reaching of certain points in said machine cycle, said certain points in said machine cycle being related to the desired timing of the processing events performable by various ones of said processing stations, and wherein said machine related input parameters downloaded from said second data processing means to said first data processing means includes a parameter indicative of a point in said machine cycle at which it is desired for a processing station to perform its processing event.

34. The machine of claim 25, further comprising output means connected to said second data processing means, and wherein coded instructions executed by said second data processing means cause the generation of a request via said output means for the entry of information indicative of a machine-related input parameter through said data entry means.

35. A method of operating a document handling machine of the type in which a plurality of types of processing stations perform processing events in coordinated manner to associate related documents in a group and to at least partially prepare said group of documents for shipment, said plurality of types of processing stations comprising (1) insert processing stations which perform the processing event of feeding documents onto an insert track for inclusion with appropriate groups of documents; and (2) a packaging station which performs the processing event of enveloping a group of document on said insert track in a packaging medium;
said machine further being of the type in which first data processing means manages the operation of said processing stations, said first data processing means comprising (1) first processor means for executing coded instructions including coded instruction suitable for use in controlling the operation of said processing stations; (2) first memory means for storing data and coded instructions; and (3) first I/O means for facilitating input and output operations with respect to said first data processing means, said method comprising the steps of:
configuring said instructions executed by said first data processing means to load machine-related output data into an output buffer included in said first memory means;
providing a second data processing means for processing said machine-related output data loaded into said output buffer of said first data processing means, said second data processing means comprising second processor means for executing coded instructions, second memory means for storing data and coded instruction including coded instructions suitable for processing said machine-related output data loaded into said output buffer of said first data processing means, and second I/O means for facilitating input and output operations with respect to said second data processing means;
using data transmission means to connect said first I/O means and said second I/O means in a manner whereby said machine-related output data in said output buffer of said first data processing means is transmittable to said second data processing means; and,
providing an indication of said machine-related output data on indicator means connected to said second data processing means.

36. The method of claim 9, further comprising the steps of:
connecting a machine cycle detector to said first I/O means of said first data processing means for detecting the reaching of certain points in a machine cycle, said certain points in said machine cycle being related to the desired timing of the processing events performable by various ones of said processing stations; and,
loading said machinerelated output data into said output buffer at a predetermined point in said machine cycle.

37. The method of claim 36, wherein a data bus is included in said first memory means, said data bus comprising a number N of data records related to a number of groups of documents movable on said insert track, each data record comprising record elements for storing informational data relative to processing events performable by various ones of said processing stations with respect to the group of documents associated with its data record, and wherein said method further comprises the step of:
loading into said output buffer at said predetermined point in said machine cycle at least a portion of the informational data included in a record in said data bus then associated with a first predetermined physical position on said insert track.

38. The method of claim 37, further comprising the step of: enveloping a group of documents on said insert track into a packaging medium;
said machine further being of the type in which first data processing means manages the operation of said processing stations, said first data processing means comprising (1) first processor means for executing coded instructions including coded instruction suitable for use in controlling the operation of said processing stations; (2) first memory means for storing data and coded instructions; and, (3) first I/O means for facilitating input and output operations with respect to said first data processing means, said method comprising the steps of:
configuring said instructions executed by said first data processing means to load machine-related output data into an output buffer included in said first memory means;

providing a second data processing means for processing said machine-related output data loaded into said output buffer of said first data processing means, said second data processing means comprising second processor means for executing coded instructions, second memory means for storing data and coded instructions including coded instructions suitable for processing said machine-related output data loaded into said output buffer of said first data processing means, and second I/O means for facilitating input and output operations with respect to said second data processing means;

using data transmission means to connect said first I/O means and said second I/O means in a manner whereby said machine-related output data in said output buffer of said first data processing means is transmittable to said second data processing means; and, also loading into said output buffer at said predetermined point in said machine cycle the informational data included in a record in said data bus then associated with a second pre-determined physical position on said insert track.

39. The method of claim 35, further comprising the steps of:

connecting a fault detector to said first I/O means of said first data processing means and positioning said fault detector with respect to an associated processing station included in said document handling machine for detecting the occurrence of a faulty processing event at said associated processing station; and, loading machine-related output data indicative of said faulty processing event into said output buffer upon the detection by said fault detector of said faulty occurrence.

40. The method of claim 39, further comprising the steps of:

connecting a plurality of fault detectors to said first I/O means of said first data processing means, said plurality of fault detectors being positioned with respect to a plurality of types of correspondingly associated processing stations included in said document handling machine for detecting the occurrence of a plurality of types of faulty processing events; and, loading said machine-related output data indicative of a faulty processing event which occurred at a faulty processing station into said output buffer upon the detection of said faulty occurrence by said fault detector associated with said faulty station.

41. The method of claim 40, wherein said machine-related output data loaded into said ouput buffer includes an indication of the type of fault detected and the processing station at which the fault was detected.

42. The method of claim 35, wherein said machine-related output data is loaded into said output buffer included in said first memory means in response to a machine-related input command generated by said second data processing means and transmitted to said first data processing means over said data transmission means.

43. The method of claim 42, further comprising the step of:

connecting data entry means to said second data processing means for enabling said second data processing means to generate said machine-related input command.

44. The method of claim 35, further comprising the step of:

using said second data processing means to perform an arithmetic operation with respect to at least a portion of the machine-related output data loaded into said output buffer and transmitted to said second data processing means over said data transmission means.

45. The method of claim 44, wherein said machine-related output data loaded into said output buffer includes an indication to which one of a plurality of postage classifications a group of documents belongs, and wherein said arithmetic operation performed by said second data processing means includes the counting of the number of groups of documents belonging to each postage classification.

46. The method of claim 44 further comprising:

detecting a specified condition associated with a group of documents;

diverting from said insert track said group of documents in connection with which said specified condition was detected;

including in said machine-related output data loaded into said output buffer an indication of the detection of said specified condition; and, including in said arithmetic operation performed by said processing means the counting of the number of groups of documents for which said specified condition is detected.

47. The method of claim 44, wherein said machine-related output data loaded into said output buffer includes an indication of whether a processing event was performed by a given processing station for a group of documents, and wherein said arithmetic operation performed by said second data processing means includes the counting of the number of groups of documents for which the given processing station has performed its processing event.

48. The method of claim 44, further comprising the step of connecting a storage medium to said second data processing means to which is written information indicative of the result of said arithmetic operation performed by said second data processing means.

49. The method of claim 48, wherein said information indicative of the result of said arithmetic operation is periodically written to a non-volatile storage medium.

50. The method of claim 44, further comprising the steps of:

connecting data entry means to said second data processing means for entering a directive to said second data processing means, wherein in response to a particular directive said second data processing means causes information indicative of said arithmetic operation performed by said second data processing means to be written to said storage medium; and, using said second data processing means to generate a stop command which is transmitted to said first data processing means by said data transmission means whereby processing events cannot be performed at least while said information indicative of said arithmetic operation is being written to said storage medium.

51. A method of operating a document handling machine of the type in which a plurality of types of processing stations perform processing events in coordinated manner to associate related documents in a group and to at least partially prepare said group of documents for shipment, said plurality of types of processing stations comprising (1) insert processing stations which perform the processing event of feeding documents onto an insert track for inclusion with appropriate groups of documents; and (2) a packaging station which performs the processing event of enveloping a group of documents on said insert track into a packaging medium;

said machine further being of the type in which first data processing means manages the operation of said processing stations, said first data processing means comprising (1) first processor means for executing coded instructions including coded instruction suitable for use in controlling the operation of said processing stations; (2) first memory means for storing data and coded instructions; and, (3) first I/O means for facilitating input and output operations with respect to said first data processing means, said method comprising the steps of:

providing second data processing means for downloading machine-related input parameters to said first data processing system, said second data processing means comprising second processor means for executing coded instructions, second memory means for storing data and coded instructions, and second I/O means for facilitating input and output operations with respect to said second data processing means; and, using data transmission means to connect said first I/O means and said second I/O means whereby said machine-related input parameters are transmittable from said second data processing means to said first data processing means; and, entering said machine-related input parameters into said second memory means using data entry means connected to said second data processing means.

52. The method of claim 51, wherein said machine-related input parameters downloaded from said second data processing means to said first data processing means includes a parameter that influences the selective feeding of documents from one of said insert processing stations.

53. The method of claim 52, wherein said machine-related input parametrs downloaded from said second data processing means to said first data processing means includes a parameter that specifies that an insert processing station which performs the processing event of feeding documents into said insert track means is to selectively feed a document therefrom for inclusion with a related group of documents in accordance with sensed indicia provided on a control document belonging to said group.

54. The method of claim 52, wherein said machine-related input parameters downloaded from said second data processing means to said first data processing means includes a parameter that specifies that an insert processing station which performs the processing event of feeding documents onto said insert track may feed a document therefrom for inclusion with a related group of documents if the feeding of said document will not increase the weight of said group of documents sufficiently to change the postal weight classification of said group of documents.

55. The method of claim 51, wherein said machine-related input parameters downloaded from said second data processing means to said first data processing means includes a parameter which is indicative of the per document weight of documents stored at one of said insert processing stations, and wherein said per document weight parameter is stored in said first memory means and utilized by said first data processing means in the calculation of a projected weight of a group of documents.

56. The method of claim 51, wherein said machine-related input parameters downloaded from said second data processing means to said first data processing means includes a parameter which is indicative of a maximum number of documents which one of said insert processing stations is permitted to feed with respect to any one group of documents.

57. The method of claim 51, further comprising the step of:

providing sensing means at one of said insert processing stations which performs the processing event of feeding documents onto said insert track, said sensing means be adapted to for sense information relative to at least one document fed from said insert processing station, and wherein said machine-related input parameters downloaded from said second data processing means to said first data processing means includes a parameter indicative of whether said sensing means is to be utilized to sense said information.

58. The.method of claim 57, wherein said first data processing means is configured to determine whether information sensed by said sensing means with respect to a document fed for inclusion with a particular group corresponds to information provided on a control document also belonging to said group.

59. The method of claim 51, further comprising the steps of:

positioning detector means with respect to said insertion machine for detecting the reaching of certain points in said machine cycle, said certain points in said machine cycle being related to the desired timing of the processing events performable by various ones of said processing stations; and, including in said machine related input parameters downloaded from said second data processing means to said first data processing means a parameter indicative of a point in said machine cycle at which it is desired for a processing station to perform its processing event.

* * * * *